(12) United States Patent
Callant et al.

(10) Patent No.: US 8,178,282 B2
(45) Date of Patent: *May 15, 2012

(54) HEAT-SENSITIVE IMAGING ELEMENT

(75) Inventors: Paul Callant, Edegem (BE);
Hieronymus Andriessen, Beerse (BE);
Alexander Williamson, Mortsel (BE);
Christel Geukens, Mortsel (BE); Jos Louwet, Merksem (BE)

(73) Assignee: Agfa Graphics NV, Mortsel (BE)

( * ) Notice: Subject to any disclaimer, the term of this patent is extended or adjusted under 35 U.S.C. 154(b) by 1122 days.

This patent is subject to a terminal disclaimer.

(21) Appl. No.: 11/993,113

(22) PCT Filed: Jun. 20, 2006

(86) PCT No.: PCT/EP2006/063327
§ 371 (c)(1),
(2), (4) Date: Dec. 19, 2007

(87) PCT Pub. No.: WO2006/136543
PCT Pub. Date: Dec. 28, 2006

(65) Prior Publication Data
US 2010/0040976 A1    Feb. 18, 2010

Related U.S. Application Data

(60) Provisional application No. 60/694,226, filed on Jun. 27, 2005.

(30) Foreign Application Priority Data

Jun. 21, 2005  (EP) ..................................... 05105440

(51) Int. Cl.
*G03F 7/00* (2006.01)
*G03F 7/26* (2006.01)
*B41N 1/00* (2006.01)
*B41F 7/00* (2006.01)

(52) U.S. Cl. .................. 430/302; 430/270.1; 430/270.2; 101/450.1; 101/453; 101/463.1

(58) Field of Classification Search ............... 101/450.1, 101/454; 430/270.1, 302
See application file for complete search history.

(56) References Cited

U.S. PATENT DOCUMENTS

| | | |
|---|---|---|
| 5,948,600 A | 9/1999 | Roschger et al. |
| 5,972,838 A | 10/1999 | Pearce et al. |
| 6,008,350 A | 12/1999 | Roschger et al. |

(Continued)

FOREIGN PATENT DOCUMENTS

EP   350 026 A2   1/1990

(Continued)

OTHER PUBLICATIONS

Callant et al.; "Heat-Sensitive Imaging Element"; U.S. Appl. No. 11/993,105; filed Dec. 19, 2007.

(Continued)

*Primary Examiner* — Cynthia Kelly
*Assistant Examiner* — Chanceity Robinson
(74) *Attorney, Agent, or Firm* — Keating & Bennett, LLP

(57) ABSTRACT

A heat-sensitive imaging element includes an IR dye, and more particularly a heat-sensitive lithographic printing plate precursor includes the IR dye. A method for making the lithographic printing plate produces a print-out image of high contrast upon exposure to IR-radiation or heating.

19 Claims, 1 Drawing Sheet

U.S. PATENT DOCUMENTS

| | | | |
|---|---|---|---|
| 6,210,871 B1 * | 4/2001 | Ishii et al. | 430/584 |
| 2003/0068575 A1 | 4/2003 | Yanaka | |
| 2004/0175649 A1 | 9/2004 | Nakamura | |
| 2006/0199874 A1 * | 9/2006 | Bhatt | 522/6 |
| 2007/0105041 A1 * | 5/2007 | Loccufier et al. | 430/270.1 |

FOREIGN PATENT DOCUMENTS

| | | |
|---|---|---|
| EP | 0 419 095 A2 | 3/1991 |
| EP | 0 897 134 A2 | 2/1999 |
| EP | 0 925 916 A1 | 6/1999 |
| EP | 1 300 241 A2 | 4/2003 |
| EP | 1 428 676 A2 | 6/2004 |
| EP | 1 502 736 A2 | 2/2005 |
| EP | 1 508 440 A | 2/2005 |
| JP | 62-193885 A | 8/1987 |
| JP | 2001-246848 A | 9/2001 |
| JP | 2004-301915 A | 10/2004 |
| JP | 2005-062482 A | 3/2005 |
| JP | 2005-122038 A | 5/2005 |
| WO | 96/35143 A1 | 11/1996 |
| WO | 2004/081117 A2 | 9/2004 |
| WO | 2006/136537 A1 | 12/2006 |

OTHER PUBLICATIONS

Official communication issued in the counterpart International Application No. PCT/EP2006/063327, mailed on Feb. 19, 2008.

Fabian: "Polymethinfarbstoffe Mit Lichtabsorption Im Nahen Infrarot," Journal fur Praktische Chemie; vol. 333; No. 2; pp. 197-222; Nov. 8, 2004.

Yagupolskii et al.: "N-Trifluoromethylsulfonylimino Derivatives of Carbonyl-Containing Donor-Accceptor Systems," Tetrahedron Letters; vol. 43; No. 21; pp. 3957-3959; May 20, 2005.

* cited by examiner

HEAT-SENSITIVE IMAGING ELEMENT

CROSS-REFERENCE TO RELATED APPLICATIONS

This application is a 371 of PCT/EP2006/063327, filed Jun. 20, 2006. This application claims the benefit of U.S. Provisional Application No. 60/694,226, filed Jun. 27, 2005, which is incorporated by reference herein in its entirety. In addition, this application claims the benefit of European Application No. 05105440.1, filed Jun. 21, 2005, which is also incorporated by reference herein in its entirety.

BACKGROUND OF THE INVENTION

1. Field of the Invention

The present invention relates to an infrared absorbing dye. The present invention relates also to a heat-sensitive imaging element including the IR dye and more particularly, to a heat-sensitive lithographic printing plate precursor including the IR dye. The present invention relates also to a method for making a lithographic printing plate whereby a print-out image of high contrast is formed upon exposure to IR-radiation.

2. Description of the Related Art

Lithographic printing typically involves the use of a so-called printing master such as a printing plate which is mounted on a cylinder of a rotary printing press. The master carries a lithographic image on its surface and a print is obtained by applying ink to the image and then transferring the ink from the master onto a receiver material, which is typically paper. In conventional lithographic printing, ink as well as an aqueous fountain solution (also called dampening liquid) are supplied to the lithographic image which consists of oleophilic (or hydrophobic, i.e., ink-accepting, water-repelling) areas and hydrophilic (or oleophobic, i.e., water-accepting, ink-repelling) areas. In so-called driographic printing, the lithographic image consists of ink-accepting and ink-abhesive (ink-repelling) areas and during driographic printing, only ink is supplied to the master.

Printing masters are generally obtained by the image-wise exposure and processing of an imaging material called a plate precursor. A typical positive-working plate precursor includes a hydrophilic support and an oleophilic coating which is not readily soluble in an aqueous alkaline developer in the non-exposed state and becomes soluble in the developer after exposure to radiation. In addition to the well known photosensitive imaging materials which are suitable for UV contact exposure through a film mask (the so-called pre-sensitized plates), heat-sensitive printing plate precursors have also become very popular. Such thermal materials offer the advantage of daylight stability and are especially used in the so-called computer-to-plate method (CtP) wherein the plate precursor is directly exposed, i.e., without the use of a film mask. The material is exposed to heat or to infrared radiation and the generated heat triggers a (physico-)chemical process, such as ablation, polymerization, insolubilization by cross-linking of a polymer or by particle coagulation of a thermoplastic polymer latex, and solubilization by the destruction of intermolecular interactions or by increasing the penetrability of a development barrier layer.

It is important in the printing plate preparation work that the exposed plate precursor shows a visible image even before being developed if necessary, i.e., a print-out image. This enables the end-user to establish immediately whether or not the precursor is already exposed to light, to inspect images on the printing plate, and to distinguish the plate as to which color of ink should be applied. In such a work flow, the exposed printing plate is developed later in a separate developing step or in an on-press processing step, or is further used in the printing process without the need of a developing step.

On-press processing is disclosed in EP 770 494, wherein the plate is mounted on the press and the coating layer is developed by interaction with the fountain solution and ink that are supplied to the cylinder during the press run. During the first runs of the press, the non-exposed areas (for a negative-working precursor) are removed from the support and thereby define the non-printing areas of the plate. Since development of the plate is not carried out before starting the printing process, a previous inspection and discrimination of the plate is not possible unless there is formed a print-out image.

Several methods for forming a print-out image are known for photopolymer systems such as disclosed in U.S. Pat. Nos. 3,359,109; 3,042,515; 4,258,123; 4,139,390; 5,141,839; 5,141,842; 4,232,106; 4,425,424; 5,030,548; 4,598,036; EP 0 434 968; WO 96/35143; and U.S. 2003/68575. In these materials the photo initiating system is a reacting component which induces formation of the print-out image upon exposure and therefore the performance of the lithographic differentiation process is reduced.

The formation of a print-out image is also known for heat-sensitive lithographic printing plates. The plates are usually image-wise exposed by an IR-laser and are consequently sensitive to IR-radiation. These printing plate precursors include, beside an IR dye as the light-to-heat conversion compound, also a dye which absorbs in the visible light wavelength range and which undergoes a color change upon heating. This color change can be obtained with a heat-decomposable dye which is bleached upon heating such as disclosed in DD 213 530, EP 897 134, EP 0 925 916, WO 96/35143, and EP 1 300 241. The color change can also be the result of a shift of the absorption maximum of the visible dye by heating as disclosed in EP 1 502 736 and EP 0 419 095.

EP 1 508 440 discloses a lithographic printing process wherein a printing plate precursor includes an IR-dye and a dye-precursor, the dye-precursor having no substantial absorption in the visible light wavelength range. Upon image-wise exposure with IR-light, a dye is formed from the dye-precursor, the dye having an absorption in the visible light wavelength range.

EP 1 428 676 describes print-out formation, upon IR-light exposure, with dye-precursors (coloration) or with dyes that undergo discoloration by acid or radicals, formed during IR-light exposure.

The heat-sensitive lithographic printing plate precursors of EP 0 925 916 and EP 1 428 676 use an IR dye which act to convert IR-radiation to heat and which changes in color due to the IR-radiation. In these prior art materials, the IR dyes exhibit, beside strong absorption in the IR wavelength range, also side-absorption in the visible wavelength range. Due to IR-exposure, the IR dye decomposes and a print-out image is built-up by the reduction of this side-absorption in the visible wavelength range. A problem of these prior art materials is the low contrast of the print-out images.

SUMMARY OF THE INVENTION

In order to overcome the problems described above, preferred embodiments of the present invention provide an infrared absorbing dye as defined below, the infrared absorbing dye preferably being capable of forming a color upon IR exposure or heating.

In another preferred embodiment of the present invention, a heat-sensitive imaging element is disclosed including the IR dyes having a structure as defined below.

In another preferred embodiment of the present invention, a heat-sensitive lithographic printing plate precursor is disclosed including the IR dyes having a structure as defined below.

In another preferred embodiment of the present invention, a method is disclosed wherein a lithographic printing plate precursor, including the IR dyes having a structure as defined below, is image-wise exposed to IR light or heat, optionally followed by a development step.

In another preferred embodiment, a method is disclosed wherein the image-wise exposed heat-sensitive lithographic printing plate precursor, having a print-out image, is developed in an on-press processing step.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Figure 1:
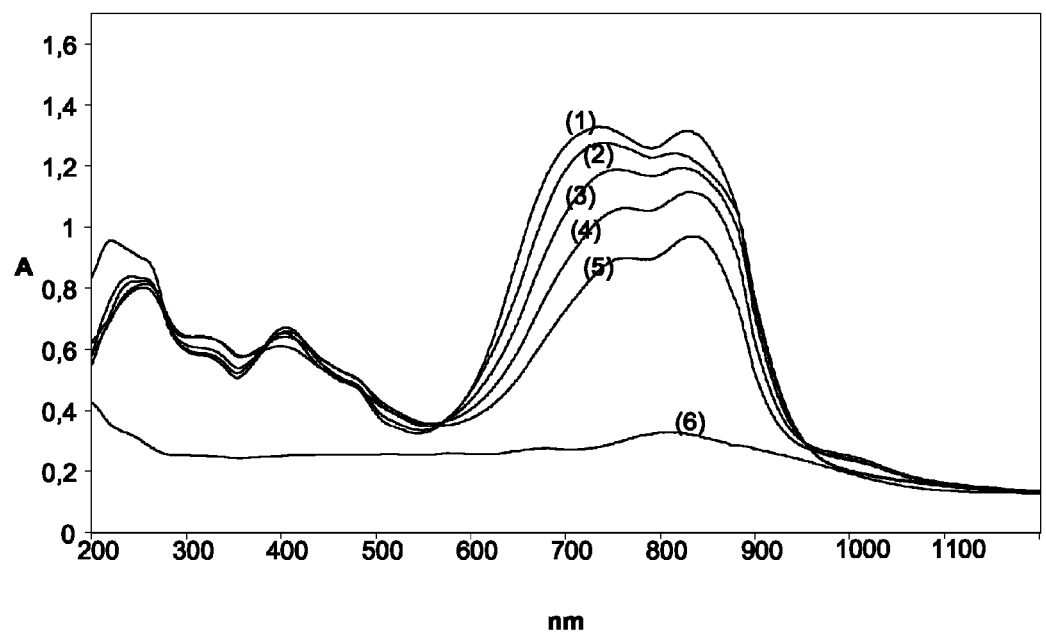
FIG. 1 shows the absorption spectrum of a comparative printing plate precursor at different exposure energies: curves 1 to 5 respectively for 0, 125, 200, 275, and 350 mJ/cm$^2$, curve 6 for the base line for the aluminum support, wherein A represents the absorption at each wavelength (nm).

The infrared absorbing dye, hereinafter also called IR dye, according to preferred embodiments of the present invention has a structure according to Formula I:

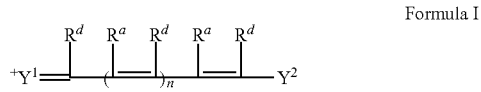

Formula I wherein
$^+Y^1=$ is represented by one of the following structures:

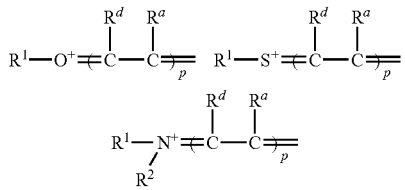

$Y^2$— is represented by one of the following structures:

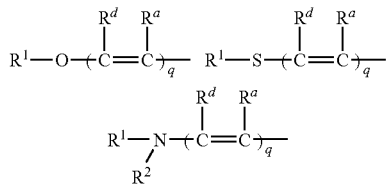

n is 0, 1, 2, or 3;
each of p and q is 0, 1, or 2;
$R^1$ and $R^2$ are independently an optionally substituted hydrocarbon group, or wherein two of the $R^1$, $R^2$, $R^d$, or $R^a$ groups together include the necessary atoms to form a cyclic structure;
characterized in that:
at least one of the $R^d$ groups is selected from the list consisting of:
—(N=CR$^{17}$)$_a$—NR$^5$—CO—R$^4$,
—(N=CR$^{17}$)$_b$—NR$^5$—SO$_2$—R$^6$,
—(N=CR$^{17}$)$_c$—NR$^{11}$—SO—R$^{12}$,
—SO$_2$—NR$^{15}$R$^{16}$ and
—S—CH$_2$—CR$^7$(H)$_{1-d}$(R$^8$)$_d$—NR$^9$—COOR$^{18}$;
a, b, c, and d independently are 0 or 1;
$R^{17}$ is a hydrogen atom, an optionally substituted aliphatic hydrocarbon group, or an optionally substituted (hetero)aryl group, or wherein $R^{17}$ and $R^5$, $R^{17}$ and $R^{11}$ together include the necessary atoms to form a cyclic structure;
$R^4$ is —OR$^{10}$, —NR$^{13}$R$^{14}$, or —CF$_3$;
wherein $R^{10}$ is an optionally substituted (hetero)aryl group or an optionally branched aliphatic hydrocarbon group;
$R^{13}$ and $R^{14}$ independently are a hydrogen atom, an optionally substituted aliphatic hydrocarbon group, or an optionally substituted (hetero)aryl group, or wherein $R^{13}$ and $R^{14}$ together include the necessary atoms to form a cyclic structure;
$R^6$ is an optionally substituted aliphatic hydrocarbon group or an optionally substituted (hetero)aryl group, —OR$^{10}$, —NR$^{13}$R$^{14}$, or —CF$_3$;
$R^5$ is a hydrogen atom, an optionally substituted aliphatic hydrocarbon group, a SO$_3^-$ group, a —COOR$^{18}$ group, or an optionally substituted (hetero)aryl group, or wherein $R^5$ together with at least one of $R^{10}$, $R^{13}$, and $R^{14}$ include the necessary atoms to form a cyclic structure;
$R^{11}$, $R^{15}$, and $R^{16}$ are independently a hydrogen atom, an optionally substituted aliphatic hydrocarbon group, or an optionally substituted (hetero)aryl group, or wherein $R^{15}$ and $R^{16}$ together include the necessary atoms to form a cyclic structure;
$R^{12}$ is an optionally substituted aliphatic hydrocarbon group or an optionally substituted (hetero)aryl group;
$R^7$ and $R^9$ independently are a hydrogen atom or an optionally substituted aliphatic hydrocarbon group;
$R^8$ is —COO$^-$ or —COOR$^{8'}$, wherein $R^{8'}$ is a hydrogen atom, an alkali metal cation, an ammonium ion, or a mono-, di-, tri- or tetra-alkyl ammonium ion;
$R^{18}$ is an optionally substituted (hetero)aryl group or an alpha-branched aliphatic hydrocarbon group; and
the $R^a$ and other $R^d$ groups are independently represented by a group selected from the list consisting of a hydrogen atom, a halogen atom, —R$^e$, —OR$^f$, —SR$^g$, and —NR$^u$R$^v$, wherein R$^e$, R$^f$, R$^g$, R$^u$, and R$^v$ independently are an optionally substituted aliphatic hydrocarbon group or an optionally substituted (hetero)aryl group; and
one or more counter ions in order to obtain an electrically neutral molecule.

The IR dye of preferred embodiments of the present invention is preferably capable of forming a color upon exposure to IR-radiation or heat. The coloration may be the result of a chemical transformation upon exposure to IR-light or heat of at least one $R^d$ group, selected from the list consisting of:
—(N=CR$^{17}$)$_a$—NR$^5$—CO—R$^4$,
—(N=CR$^{17}$)$_b$—NR$^5$—SO$_2$—R$^6$,
—(N=CR$^{17}$)$_c$—NR$^{11}$—SO—R$^{12}$,
—SO$_2$—NR$^{15}$R$^{16}$, and
—S—CH$_2$—CR$^7$(H)$_{1-d}$(R$^8$)$_d$—NR$^9$—COOR$^{18}$;
wherein the meaning of a, b, c, d, $R^{17}$, $R^5$, $R^4$, $R^6$, $R^{11}$, $R^{12}$, $R^{15}$, $R^{16}$, $R^7$, $R^8$, $R^9$, and $R^{18}$ is the same as described above and wherein the chemical transformation results in an increased light absorption in the visual wavelength range, namely between 400 nm and 700 nm. Color formation by the chemical transformation of at least one of these $R^d$ groups may be due to the transformation of the $R^d$ group into a group which is a stronger electron-donor than the $R^d$ group.

Coloration of the IR dye may also be the result a chemical transformation upon exposure to IR-radiation or heat of a $R^a$ group into a group which is a stronger electron-acceptor than the $R^a$ group.

The IR dyes described above can be used in imaging elements, e.g., lithographic printing plate precursors, to form a print out image upon exposure to IR light or heat. This is clearly illustrated in FIG. 2 wherein a printing plate precursor including an IR-dye of a preferred embodiment of the present invention shows a build-up of the absorption in the visual range while the absorption in the IR-wavelength range decreases by IR-radiation. The formation of this print-out image is clearly different from a bleaching process as illustrated in FIG. 1 for a comparative IR-dye whereby the IR-dye decomposition produces only a slight decrease of the absorption in the visible spectrum, namely between about 600 nm and 700 nm. As there is no substantial increase of the absorption in the wavelength range between 400 nm and about 600 nm, no build-up of the optical density in the visual part of the spectrum is observed. The IR dyes of preferred embodiments of the present invention may exhibit an increase of the optical density in the visual wavelength range and, as a result, the contrast of the print-out image may be improved compared to the IR-dyes whereby only bleaching takes place.

According to another preferred embodiment of the present invention, the IR-dye has the structure of one of the following Formulae II, III, or IV:

Formula II

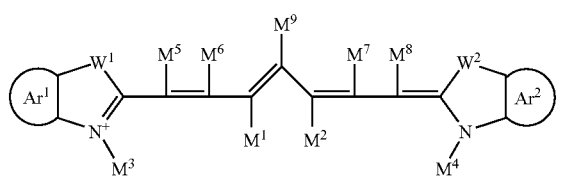

Formula III

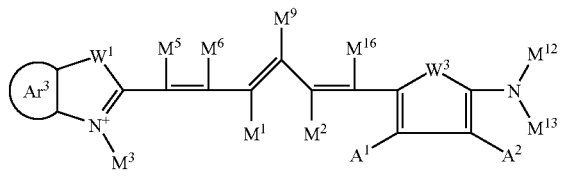

Formula IV

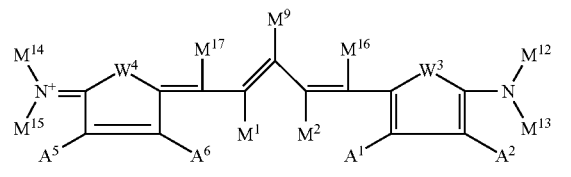

wherein $Ar^1$, $Ar^2$, and $Ar^3$ are independently an optionally substituted aromatic hydrocarbon group or an aromatic hydrocarbon group with an annulated benzene ring which is optionally substituted;

$W^1$ and $W^2$ are independently a sulphur atom or a $-CM^{10}M^{11}$ group, wherein $M^{10}$ and $M^{11}$ are independently an optionally substituted aliphatic hydrocarbon group or an optionally substituted (hetero)aryl group, or wherein $M^{10}$ and $M^{11}$ together include the necessary atoms to form a cyclic structure, preferably a 5- or 6-membered ring;

$M^1$ and $M^2$ are independently a hydrogen atom, an optionally substituted aliphatic hydrocarbon group, or wherein $M^1$ and $M^2$ together include the necessary atoms to form an optionally substituted cyclic structure, preferably a 5- or 6-membered ring, more preferably a 5-membered ring, most preferably a 5-membered ring having a cyclic structure of 5 carbon atoms;

$M^3$ and $M^4$ are independently an optionally substituted aliphatic hydrocarbon group;

$M^5$, $M^6$, $M^7$, $M^8$, $M^{16}$, and $M^{17}$ are independently a hydrogen atom, a halogen atom, or an optionally substituted aliphatic hydrocarbon group;

$W^3$ is a sulphur atom or a $-CA^3=CA^4-$ group;

$M^{12}$ and $M^{13}$ are independently an optionally substituted aliphatic hydrocarbon group or an optionally substituted (hetero)aryl group, or wherein two of the $M^{12}$, $M^{13}$, $A^2$, or $A^4$ together include the necessary atoms to form at least one cyclic structure, preferably a 5- or 6-membered ring;

$W^4$ is a sulphur atom or a $-CA^7=CA^8-$ group;

$A^1$ to $A^8$ are independently a hydrogen atom, a halogen atom, an optionally substituted aliphatic hydrocarbon group, or an optionally substituted (hetero)aryl group, or wherein each of $A^1$ and $A^2$, $A^3$ and $A^4$, $A^5$ and $A^6$, or $A^7$ and $A^8$, together include the necessary atoms to form a cyclic structure, preferably a 5- or 6-membered ring;

$M^{14}$ and $M^{15}$ are independently an optionally substituted aliphatic hydrocarbon group or an optionally substituted (hetero)aryl group, or wherein two of the $M^{14}$, $M^{15}$, $A^5$, or $A^7$ together include the necessary atoms to form at least one cyclic structure, preferably a 5- or 6-membered ring, and $M^9$ is a $R^d$ group selected from the list consisting of:
$-(N=CR^{17})_a-NR^5-CO-R^4$,
$-(N=CR^{17})_b-NR^5-SO_2-R^6$,
$-(N=CR^{17})_c-NR^{11}-SO-R^{12}$,
$-SO_2-NR^{15}R^{16}$, and
$-S-CH_2-CR^7(H)_{1-d}(R^8)_d-NR^9-COOR^{18}$,
wherein the meaning of a, b, c, d, $R^{17}$, $R^5$, $R^4$, $R^6$, $R^{11}$, $R^{12}$, $R^{15}$, $R^{16}$, $R^7$, $R^8$, $R^9$, and $R^{18}$ is the same as described above; and one or more counter ions in order to obtain an electrically neutral molecule.

The dye can be a neutral, an anionic, or a cationic dye depending on the type of the substituting groups and the number of each of the substituting groups. In a preferred embodiment, the dye of Formula II, III, or IV has at least one anionic or acid group, selected from the list consisting of $-CO_2H$, $-CONHSO_2R^h$, $-SO_2NHCOR^i$, $-SO_2NHSO_2R^j$, $-PO_3H_2$, $-OPO_3H_2$, $-OSO_3H$, $-S-SO_3H$, or $-SO_3H$ groups or their corresponding salts, wherein $R^h$, $R^i$, and $R^j$ are independently an aryl or an alkyl group, preferably a methyl group, and wherein the salts are preferably alkali metal salts or ammonium salts, including mono- or di- or tri- or tetra-alkyl ammonium salts. These anionic or acid groups may be present on the aromatic hydrocarbon group or the annulated benzene ring of $Ar^1$, $Ar^2$, or $Ar^3$, or on the aliphatic hydrocarbon group of $M^3$, $M^4$, or $M^{12}$ to $M^{15}$, or on the (hetero)aryl group of $M^{12}$ to $M^{15}$. Other substituting groups can be selected from a halogen atom, a cyano group, a sulphone group, a carbonyl group, or a carboxylic ester group.

In another preferred embodiment, each of the aliphatic hydrocarbon groups of $M^3$, $M^4$, or $M^{12}$ to $M^{15}$ is terminally substituted with at least one of these groups, more preferably with $-CO_2H$, $-CONHSO_2$-Me, $-SO_2NHCO$-Me, $-SO_2NHSO_2$-Me, $-PO_3H_2$, or $-SO_3H$ groups or their corresponding salt, wherein Me represents a methyl group.

According to another preferred embodiment of the present invention, the IR-dye has the structure of one of the following Formulae II-10, II-11, II-20, II-21, III-10, III-11, III-20, III-21, IV-10, IV-11, IV-20, or IV-21:

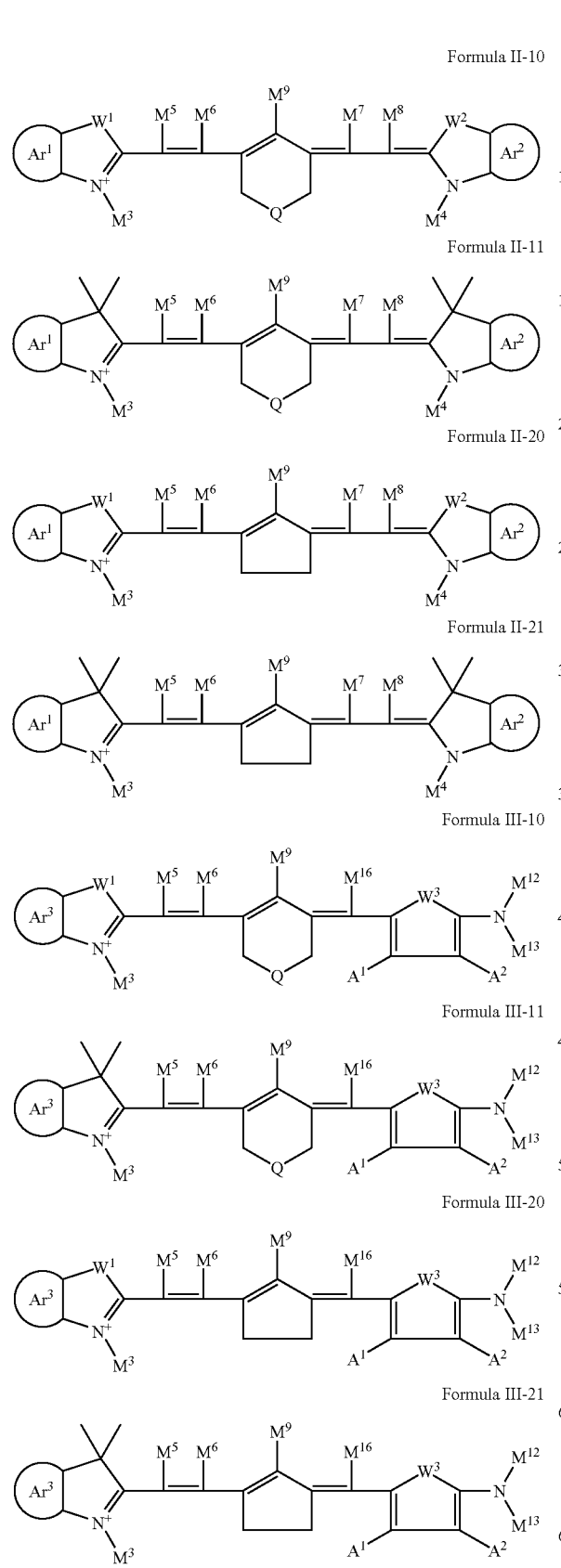

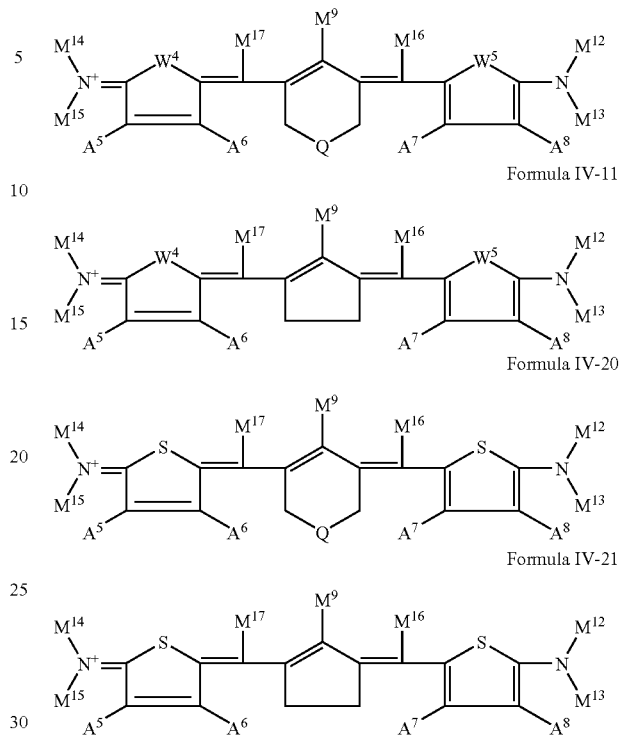

wherein

Q is O, S, —CR$^s$R$^t$, or —COOR$^u$ wherein R$^s$, R$^t$, and R$^u$ are independently a hydrogen atom or an alkyl group and the other groups have the same meaning as defined in Formula II, III, and IV.

According to another preferred embodiment of the present invention, the IR-dye has the structure of one of the following Formulae V-a, V-b, V-c, or V-d:

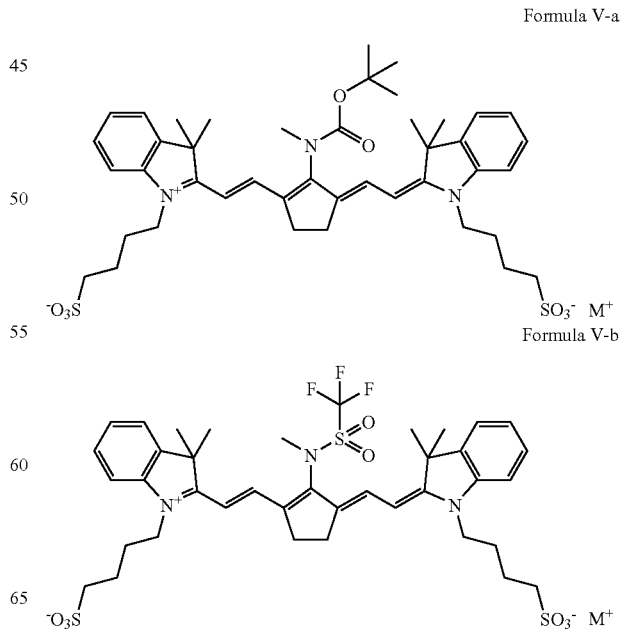

Formula V-c

Formula V-d

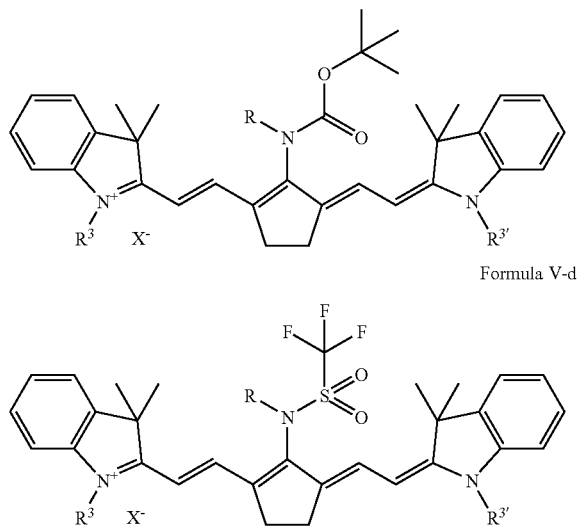

wherein
- $M^+ = Li^+$, $Na^+$, $K^+$, $NH_4^+$, $R'R''R'''NH^+$ wherein R', R", R'" are independently a H atom, an optional substituted alkyl or aryl group;
- X=halogen, sulphonate, perfluorosulphonate, or arylsulphonate; and
- $R^3$, $R^{3'}$ are methyl or ethyl.

The IR-dyes mentioned above may also be coupled to each other or to other IR absorbing dyes as to form IR dye dimers or oligomers. Besides a covalent coupling between two or more IR dyes, supra-molecular compounds, including two or more IR dyes, may also be formed by ionic interactions. Dimers, consisting of two different IR dyes, may be formed for example by an interaction between a cationic and an anionic IR dye, as described in, e.g., WO 2004/069938 and EP 1 466 728. Infrared dyes may also be ionically bond to a polymer as, e.g., described in EP 1 582 346 wherein IR dyes, including two to four sulphonate groups are ionically bonded to a polymer including covalently attached ammonium, phosphonium, and sulphonium groups.

Supra-molecular compounds, including two or more IR dyes, may also be formed by hydrogen bonding or dipole-dipole interaction.

Suitable examples of IR-dyes according to preferred embodiments of the present invention are:

IRD-001:

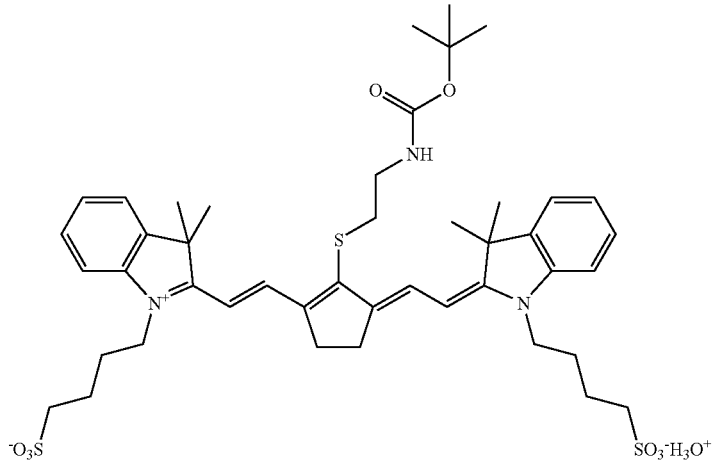

IRD-002:

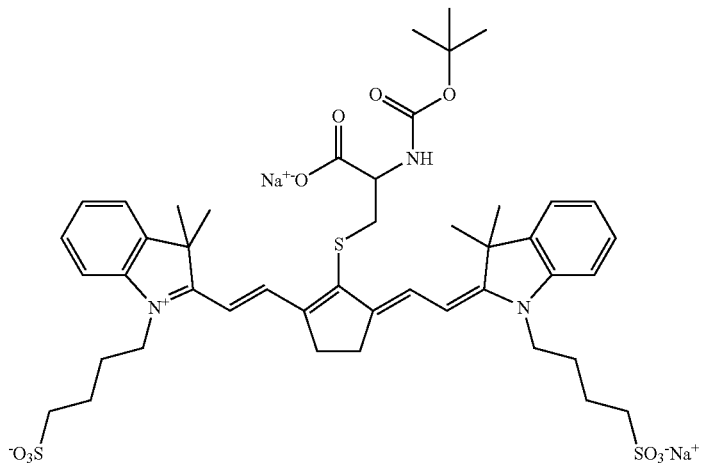

-continued
IRD-003:
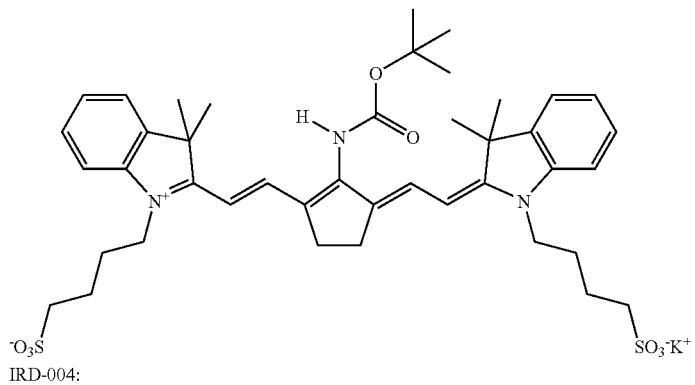
IRD-004:
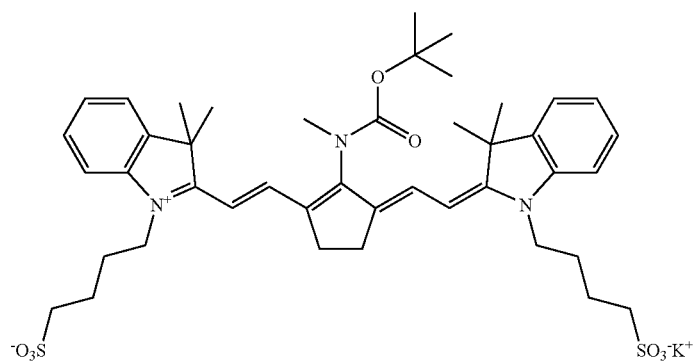
IRD-005:
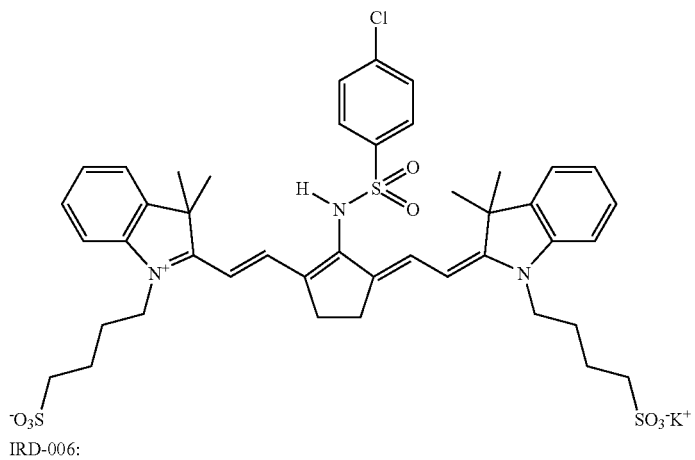
IRD-006:
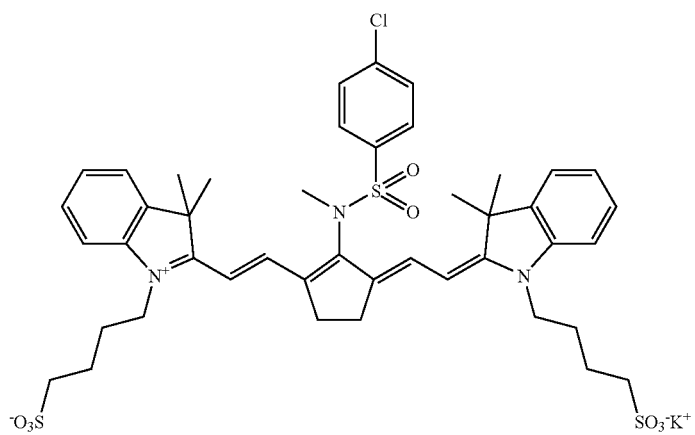

-continued
IRD-007:
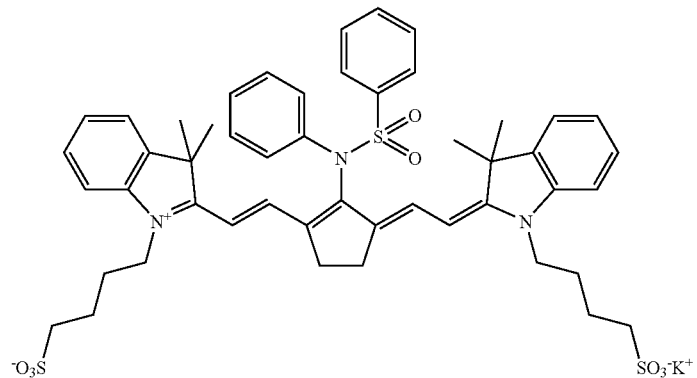
IRD-008:
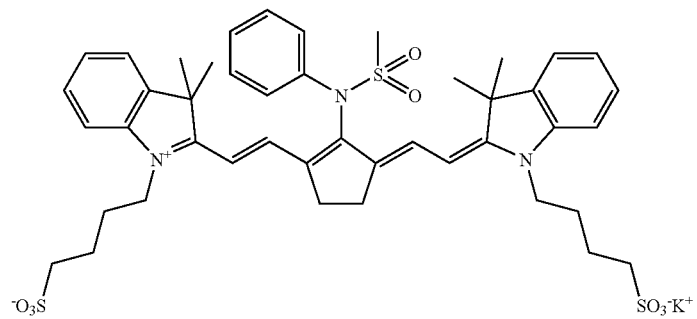
IRD-009:
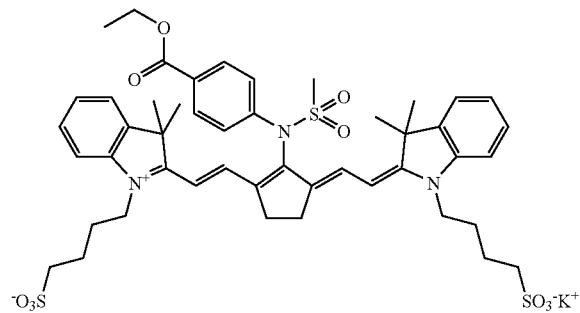
IRD-010:
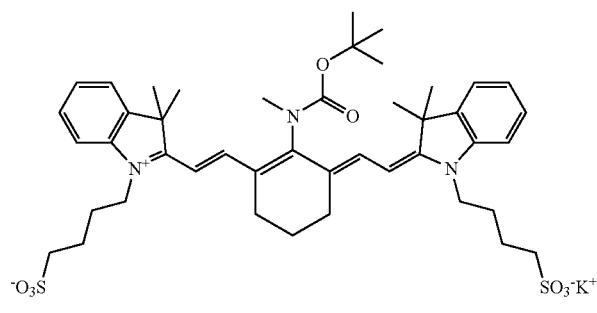
IRD-011:
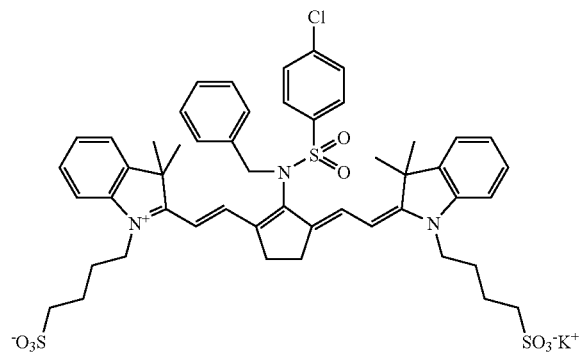
IRD-012:
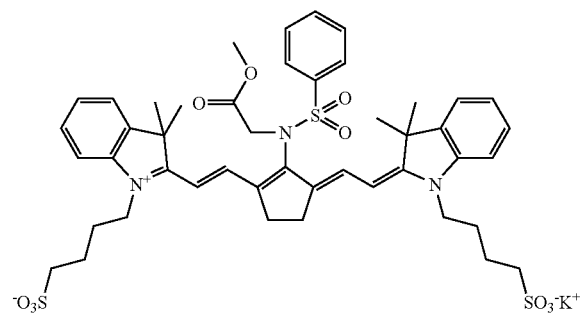

-continued
IRD-013:
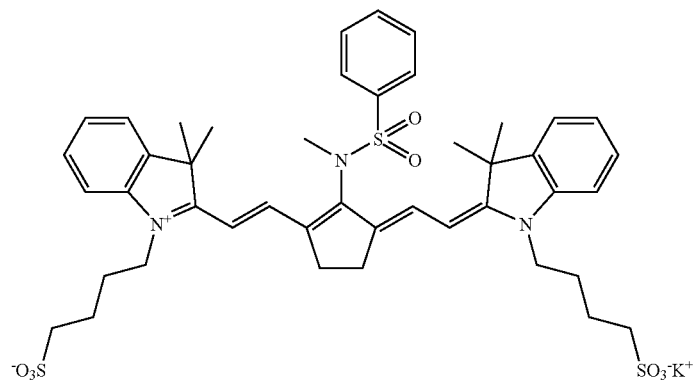
IRD-014:
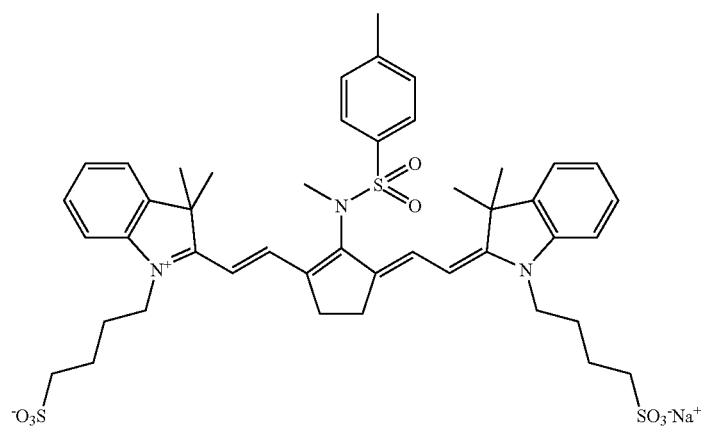
IRD-015:
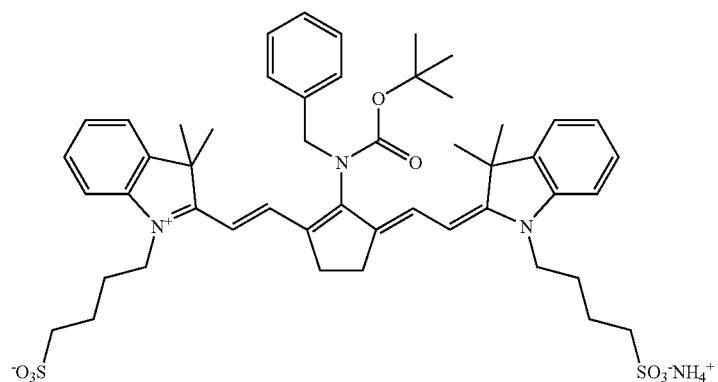
IRD-016:
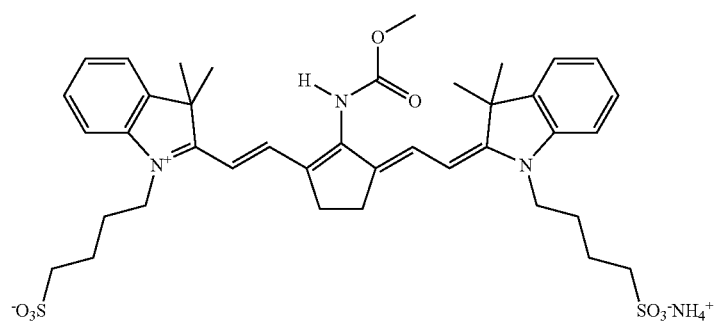

-continued
IRD-017:
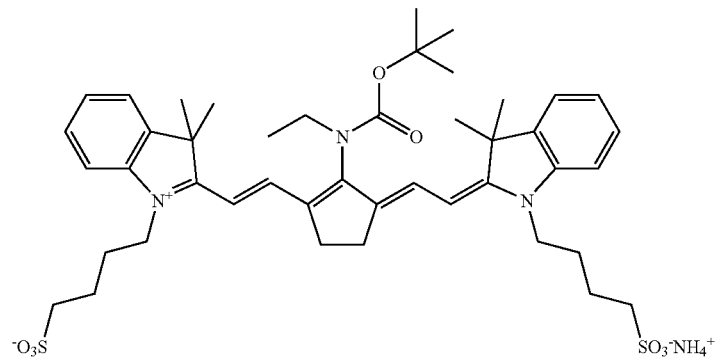
IRD-018:
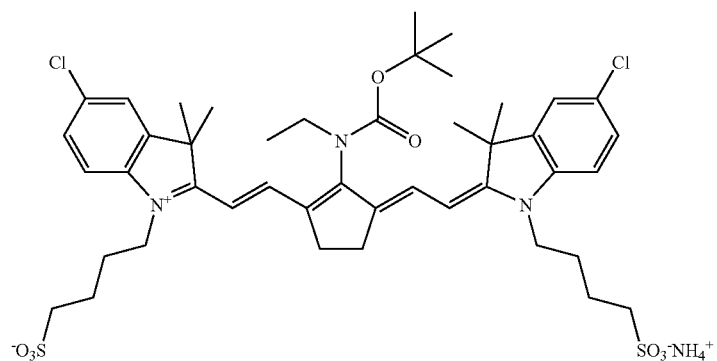
IRD-019:
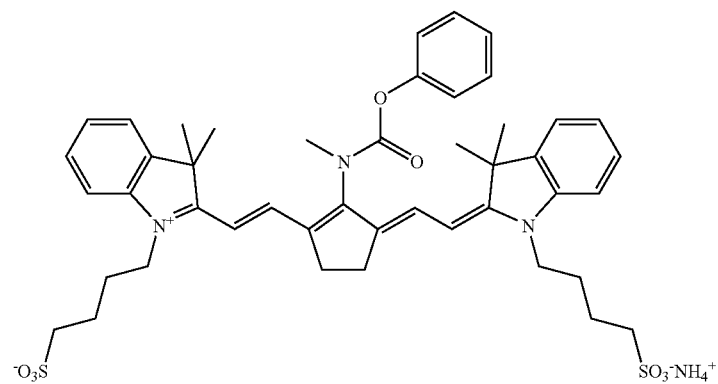
IRD-020:
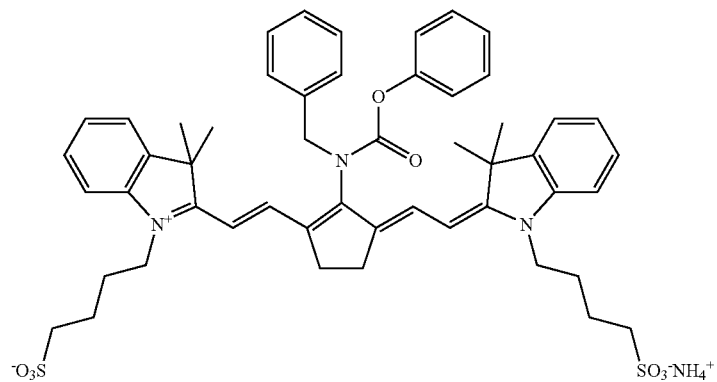

-continued
IRD-021:
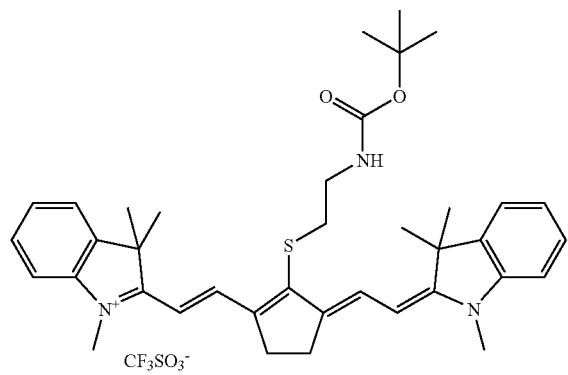
IRD-022:
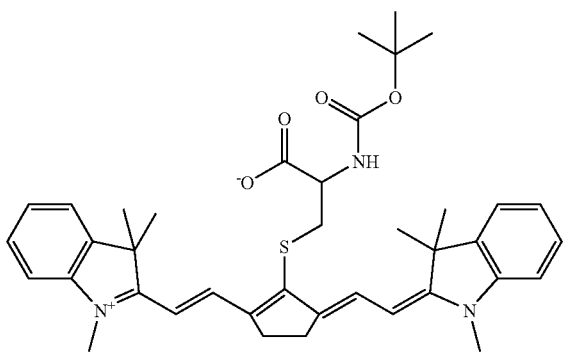
IRD-023:
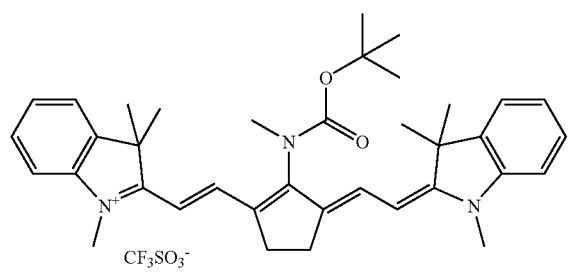
IRD-024:
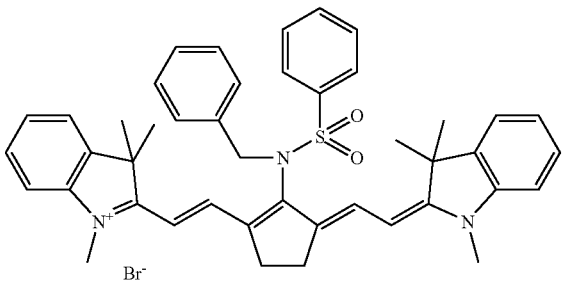
IRD-025:
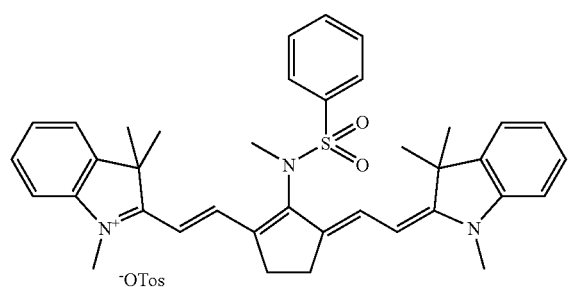
IRD-026:
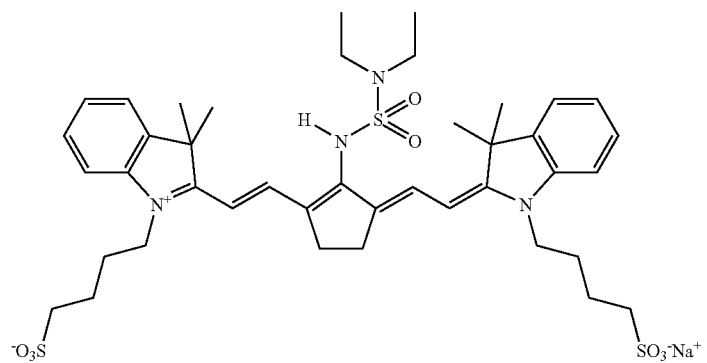

-continued
IRD-027:
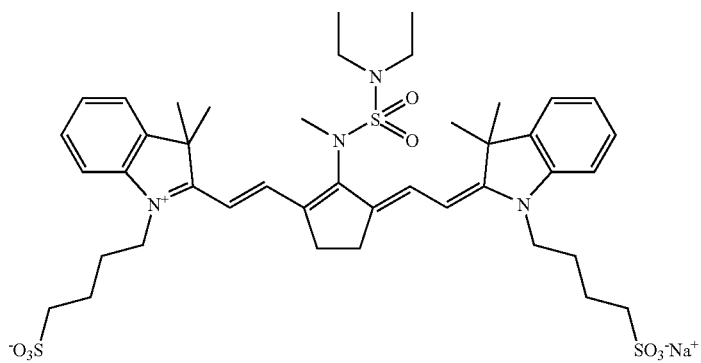
IRD-028:
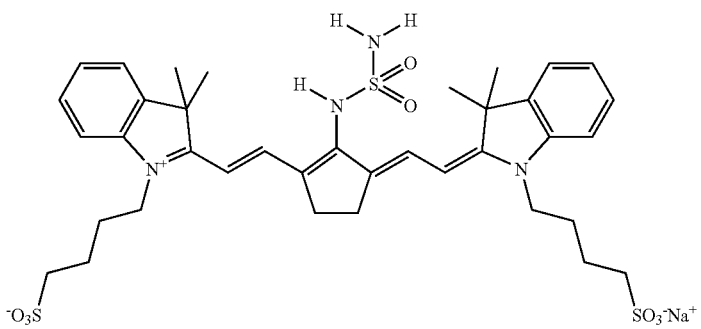
IRD-029:
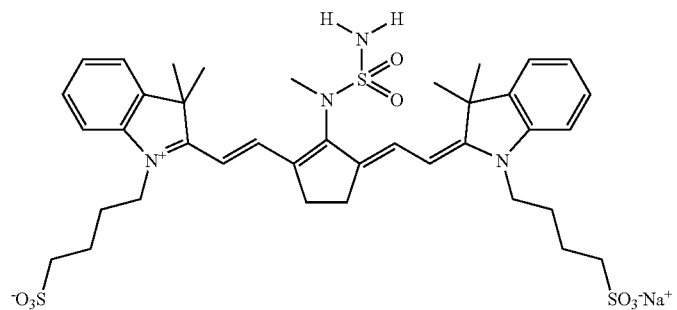
IRD-030:
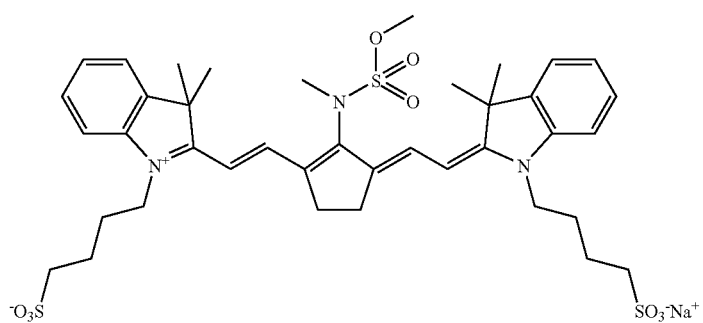

-continued
IRD-031:
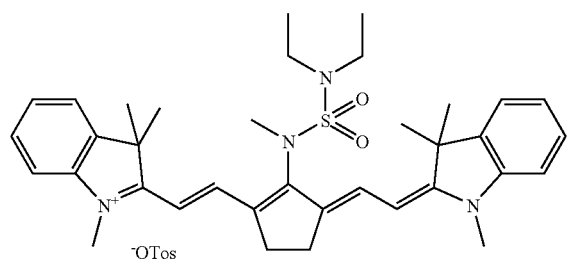
IRD-032:
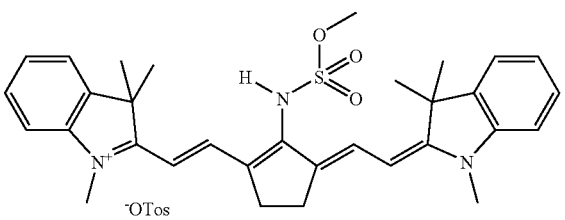
IRD-033:
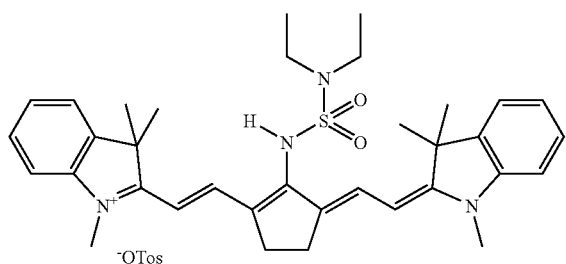
IRD-034:
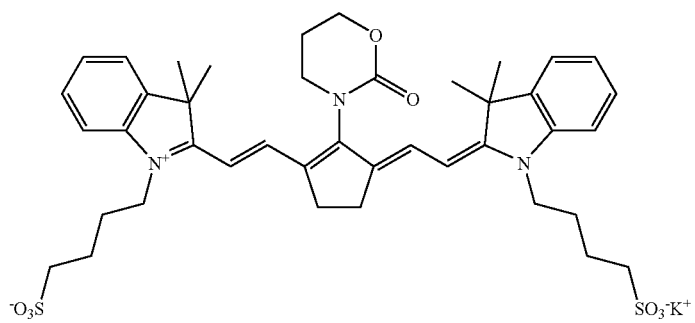
IRD035:
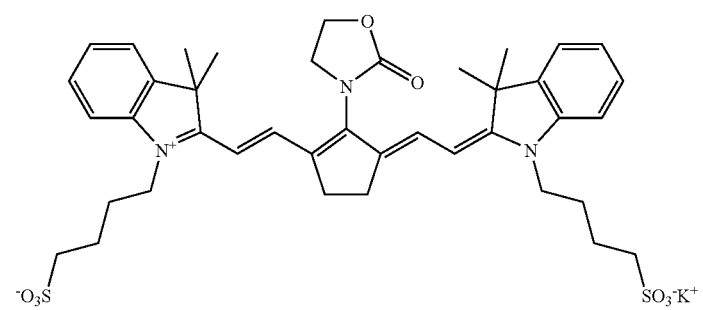
IRD-036:
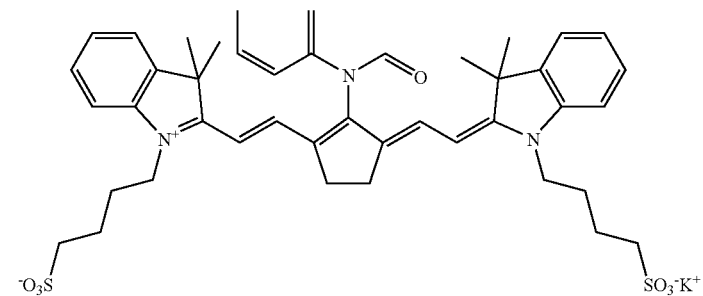

-continued
IRD-037:
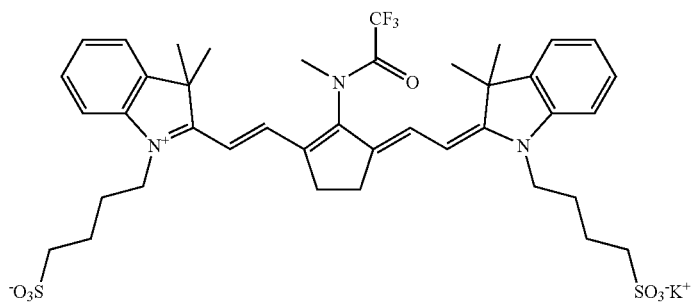
IRD-038:
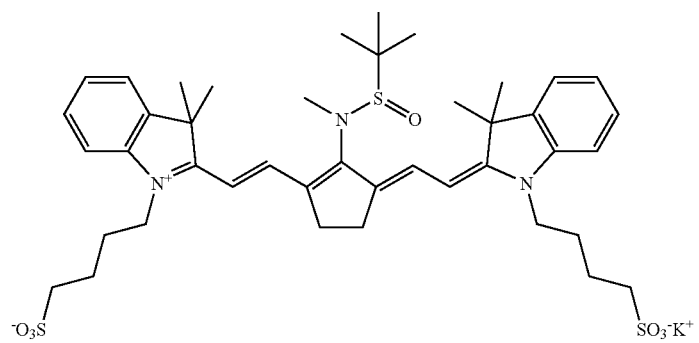
IRD-039:
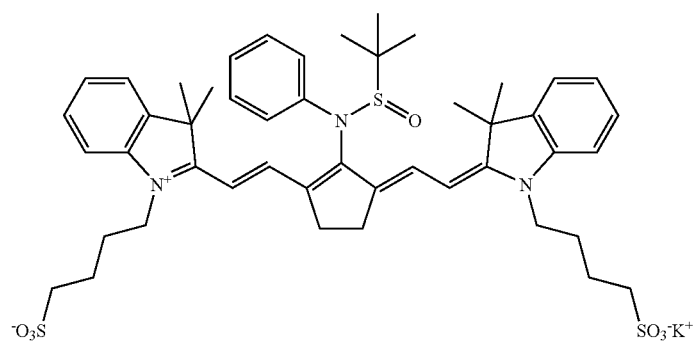
IRD-040:
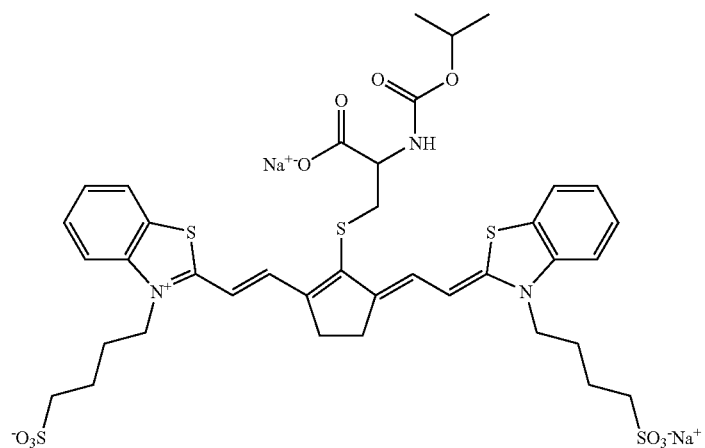

IRD-041:
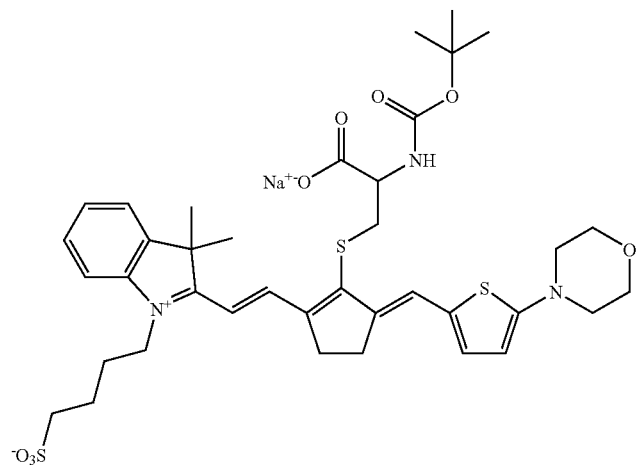
IRD-042:
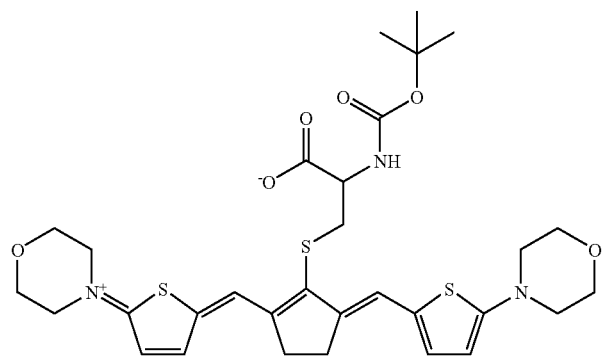
IRD-043:
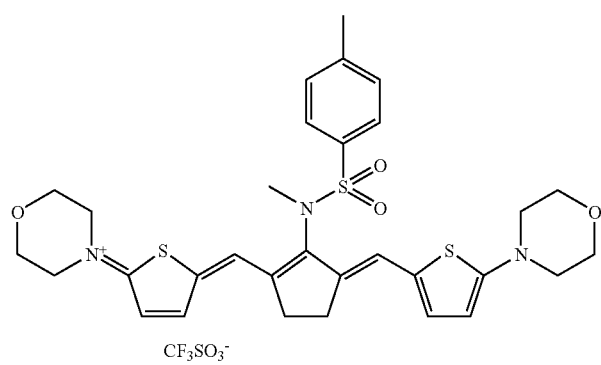
IRD-044:
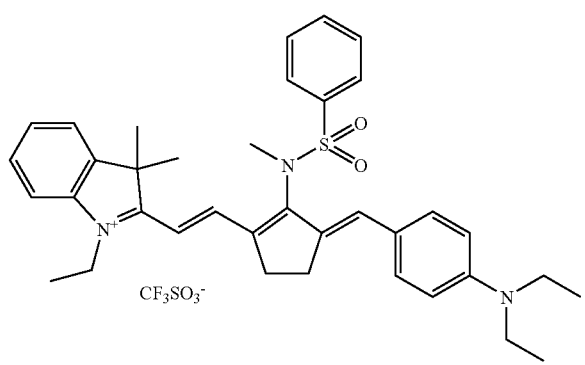
IRD-045:
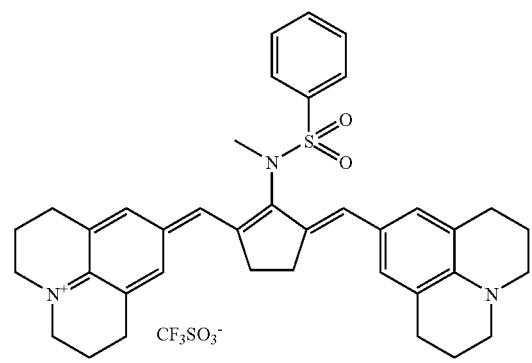

-continued
IRD-046:
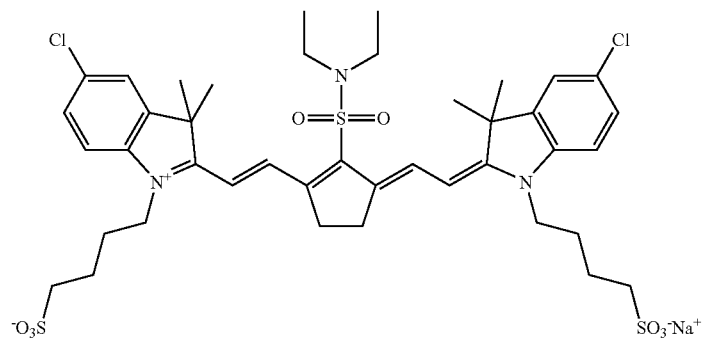
IRD-047:
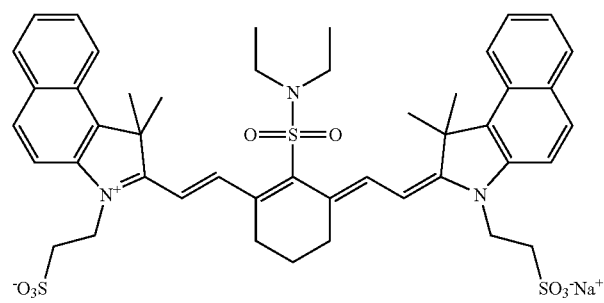
IRD-048:
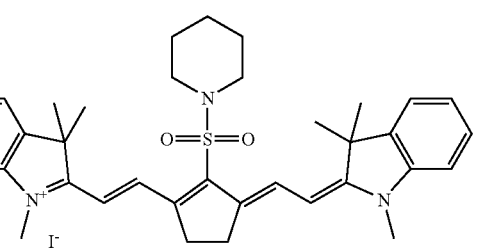
IRD-049:
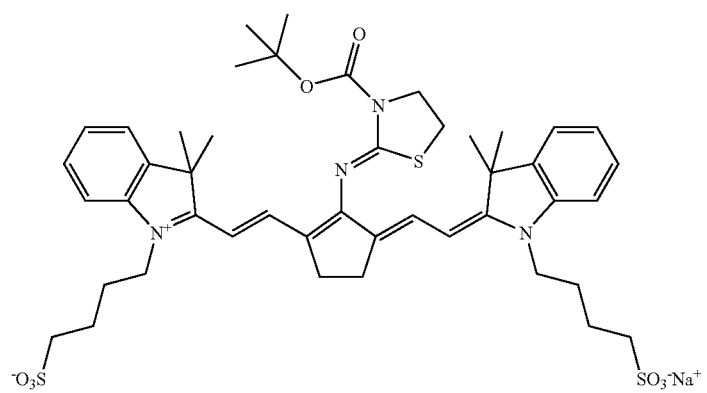
IRD-050:
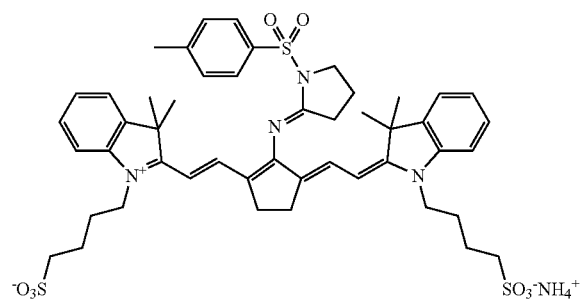
IRD-051:
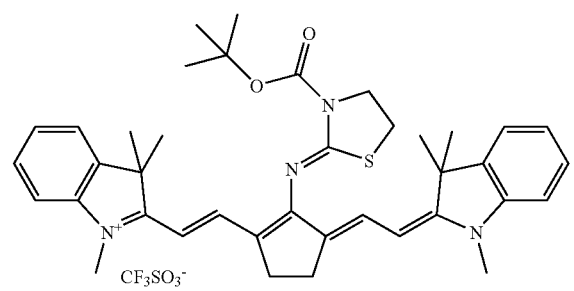

-continued
IRD-052:
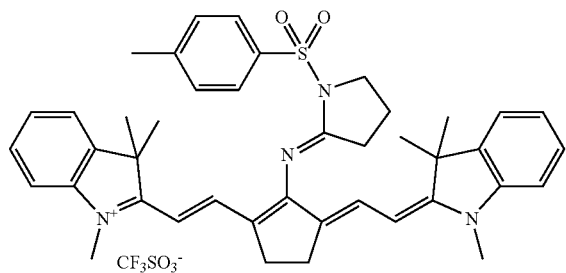
IRD-053:
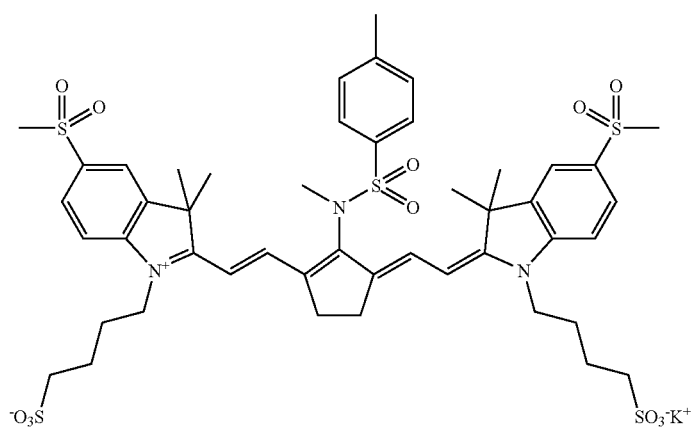
IRD-054:
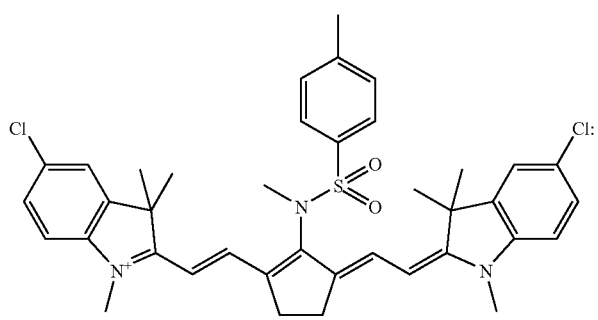
IRD-055:
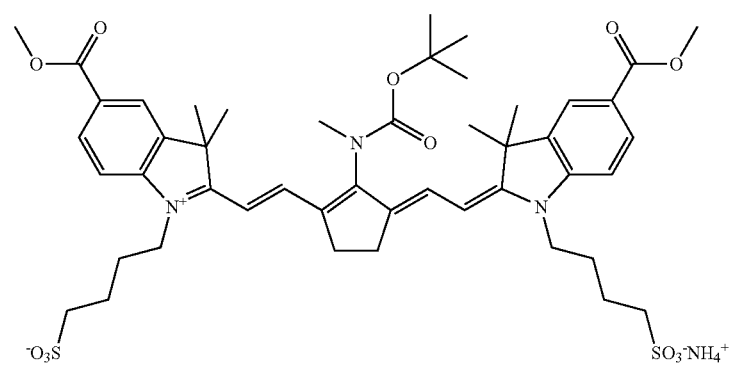

-continued
IRD-056:
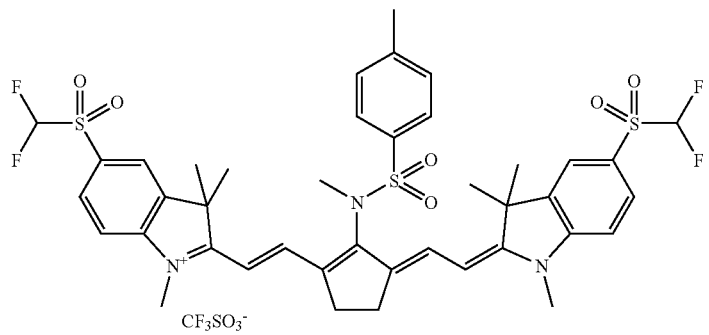
IRD-057:
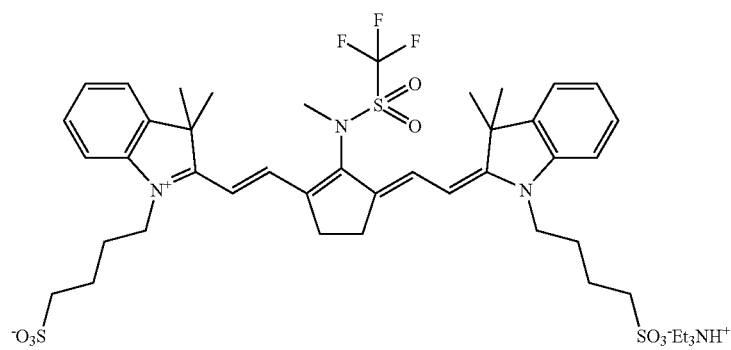
IRD-058:
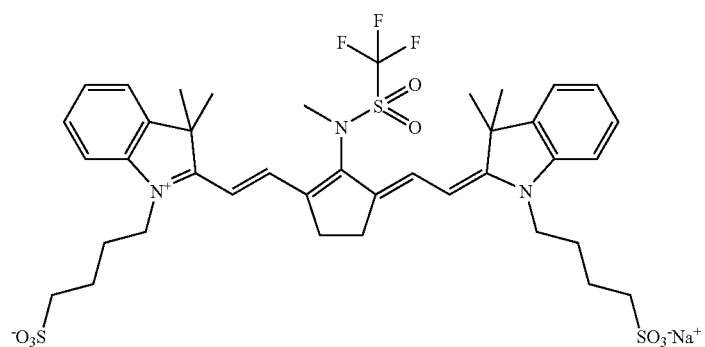
IRD-059:
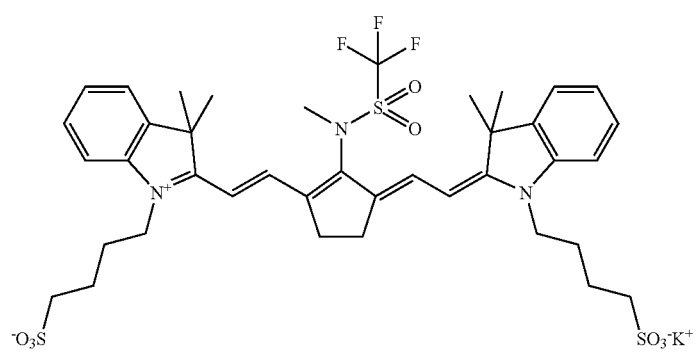

IRD-060:
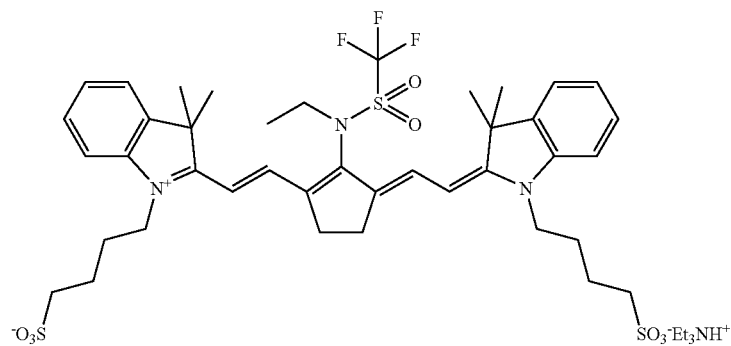
IRD-061:
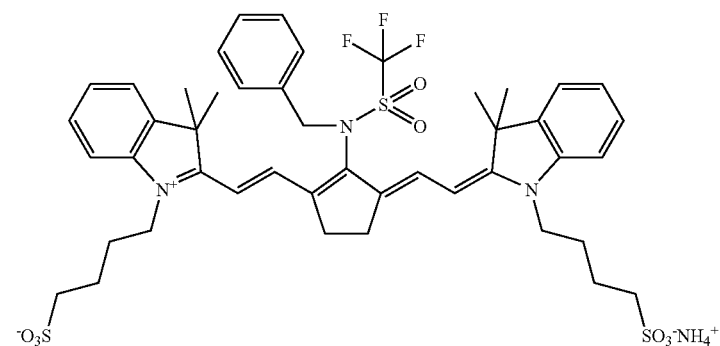
IRD-062:
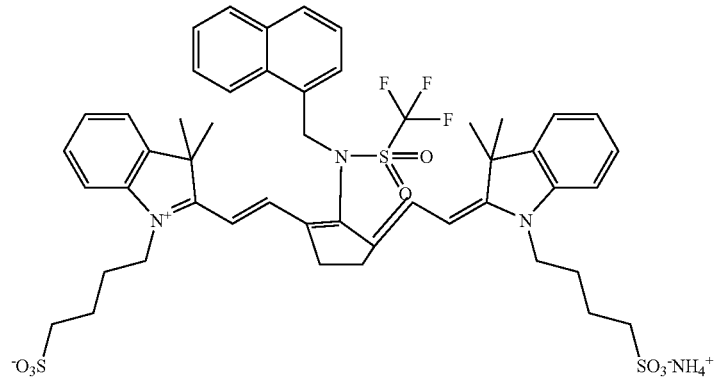
IR-063:
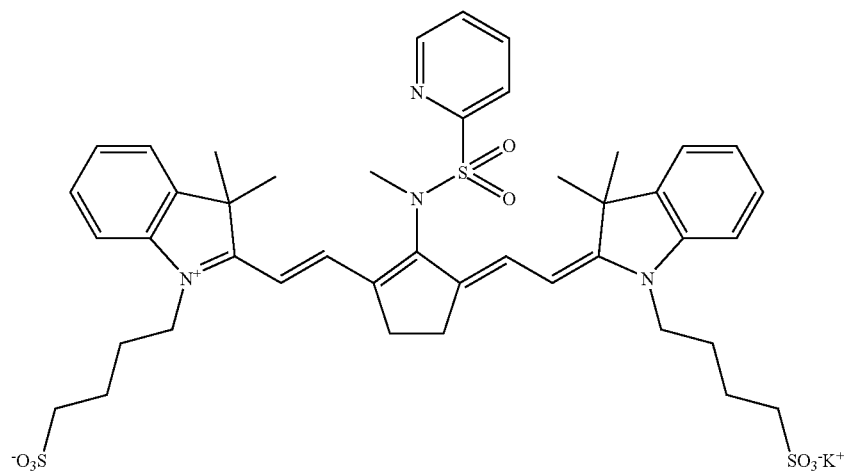

-continued
IRD-064:
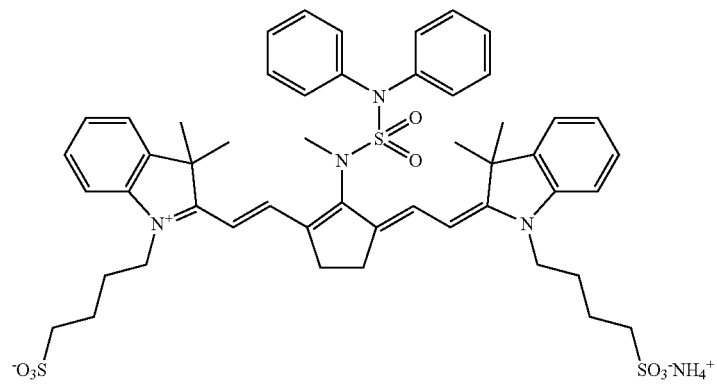
IRD-065:
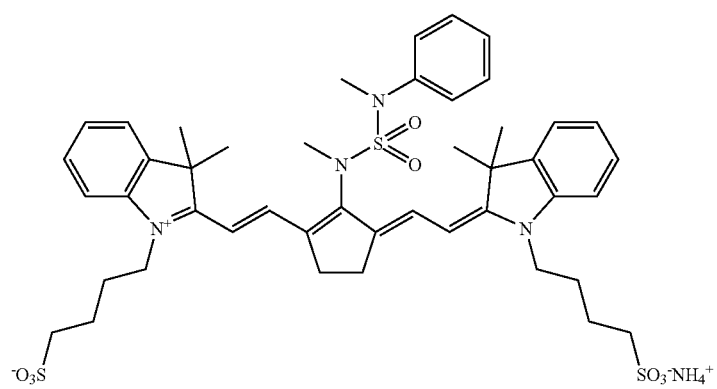
IRD-066:
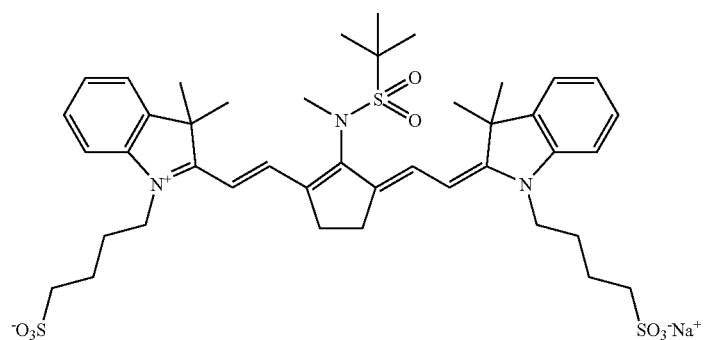
IRD-067:
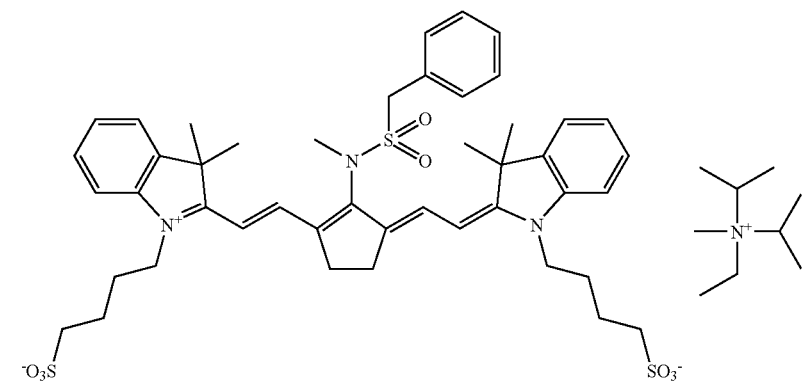

-continued
IRD-068:
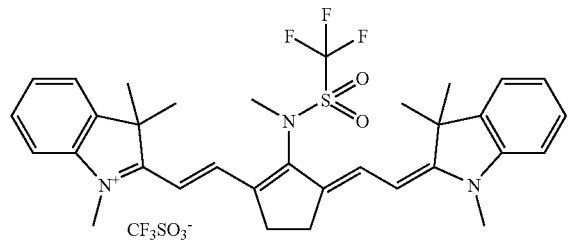
IRD-069:
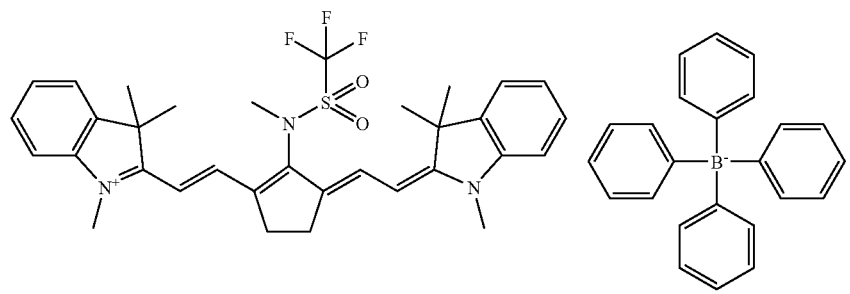
IR-070:
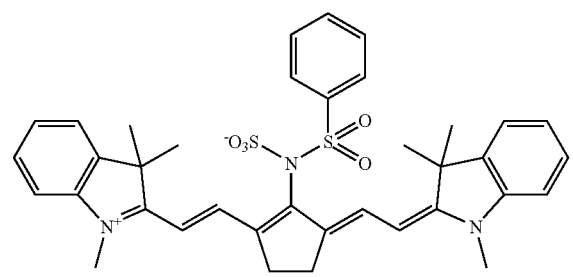
IR-071:
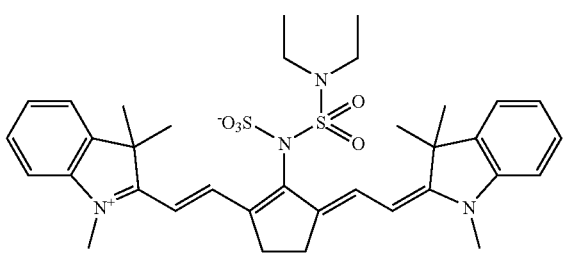
IR-072:
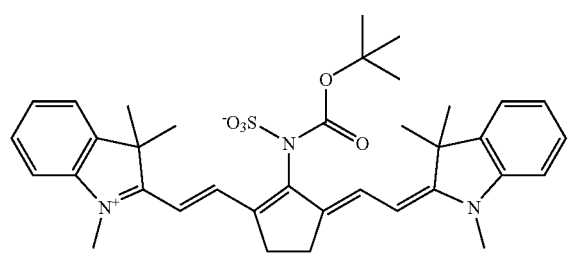
IR-073:
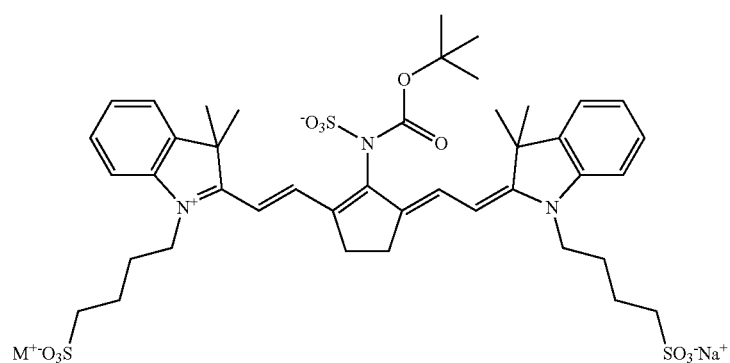

-continued
IR-074:
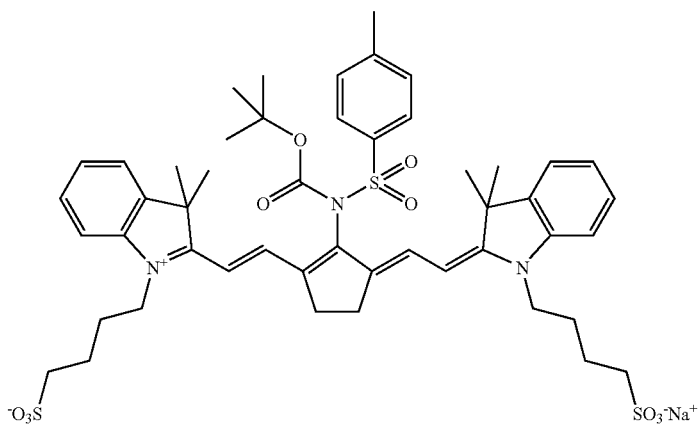
IR-075:
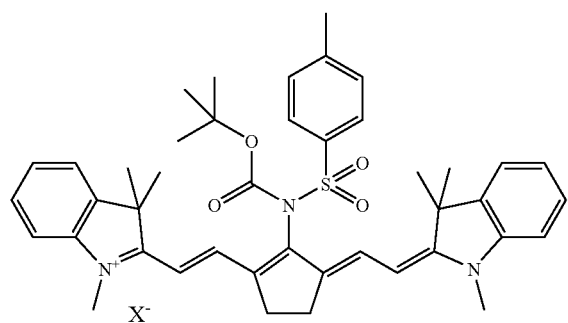
IR-076:
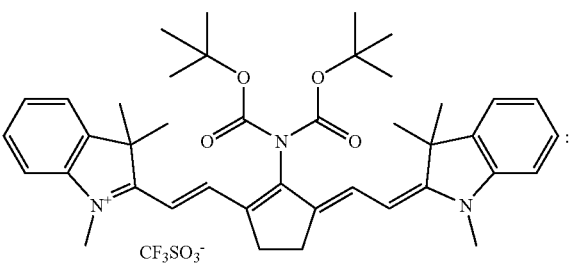
IR-077:
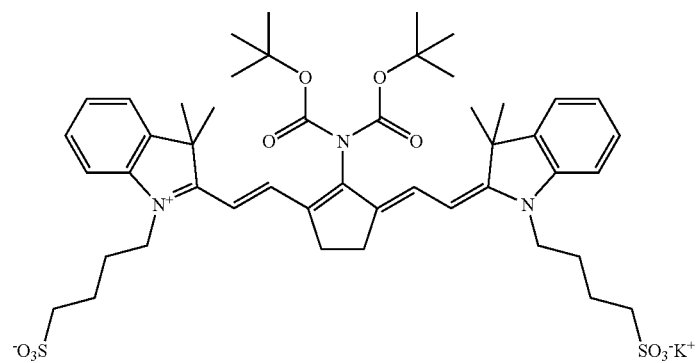
IR-078:
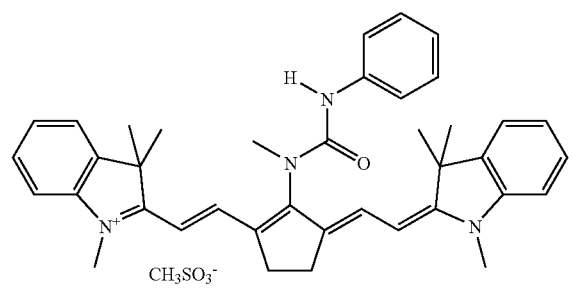

-continued
IR-079:
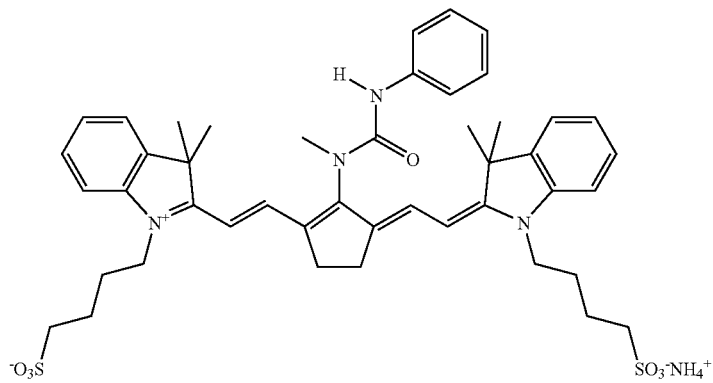
IR-080:
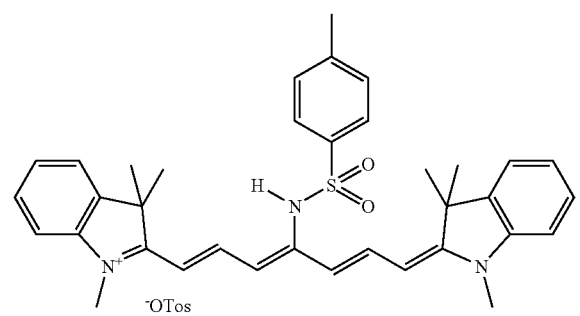
IR-81:
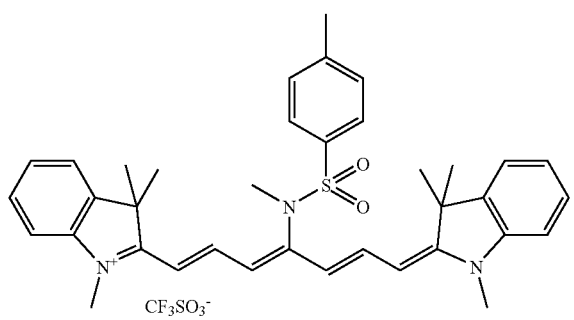
IR-82:
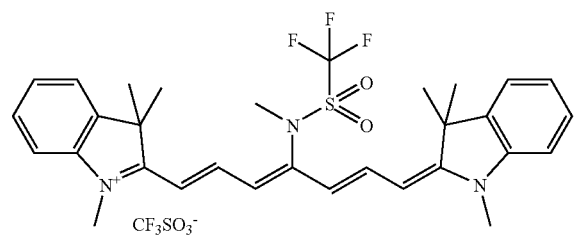
IR-83:
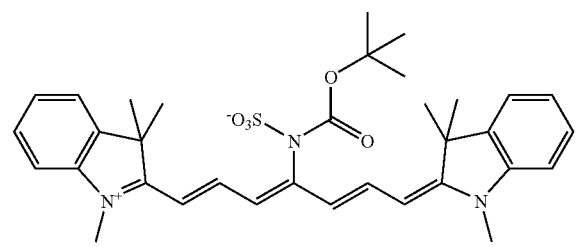
IR-84:
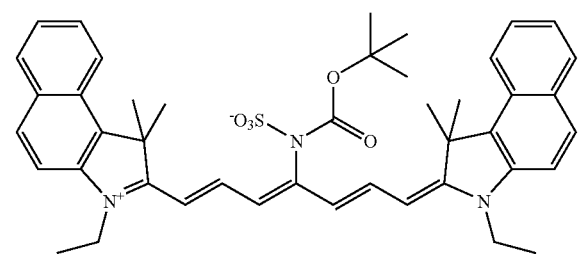
IR-85:
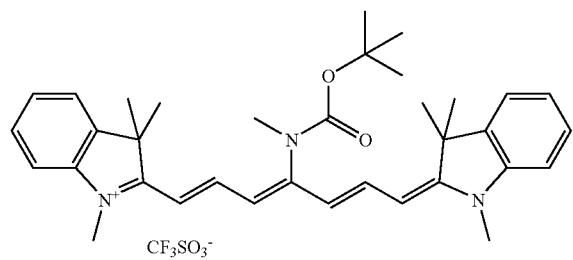

-continued
IR-86:
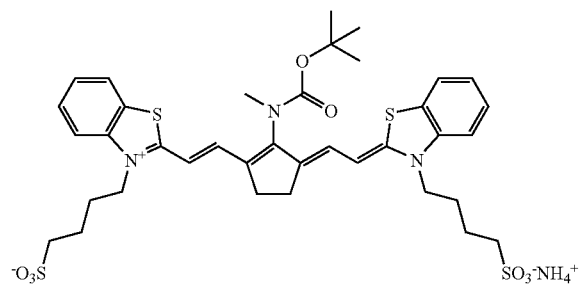
IR-87:
IR-88:
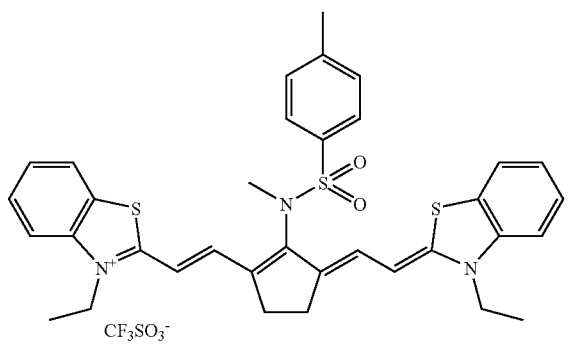
IR-89:
IR-90:
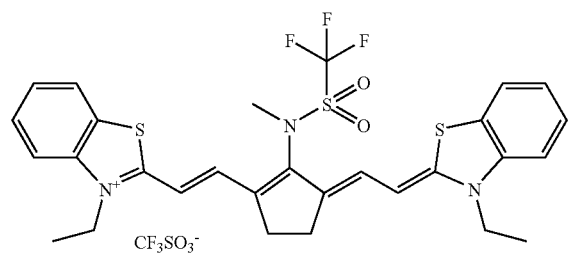
IR-91:
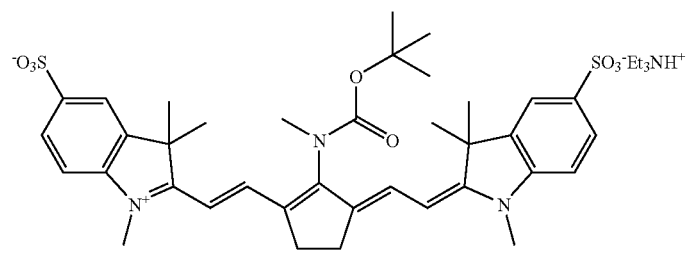
IR-92:
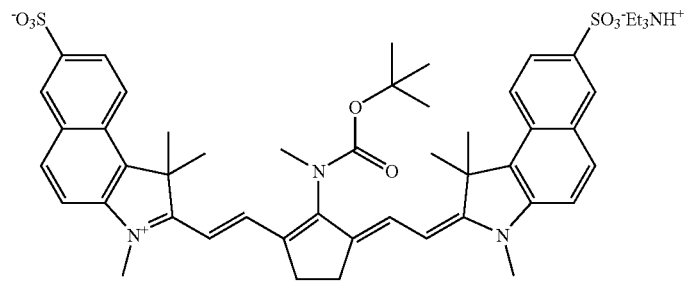

IR-93
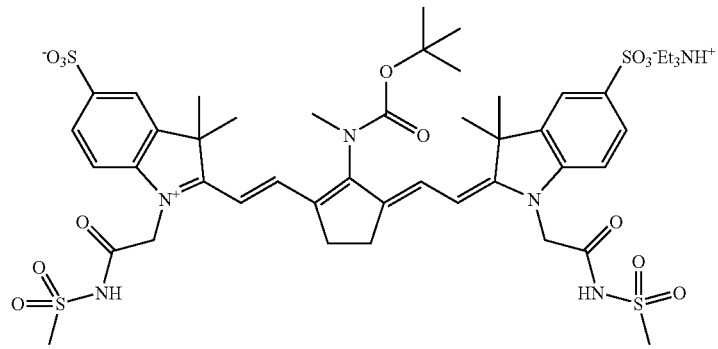
IR-94:
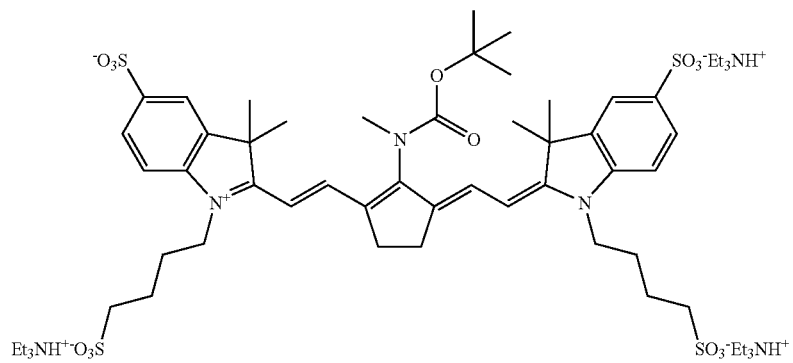
IRD-95:
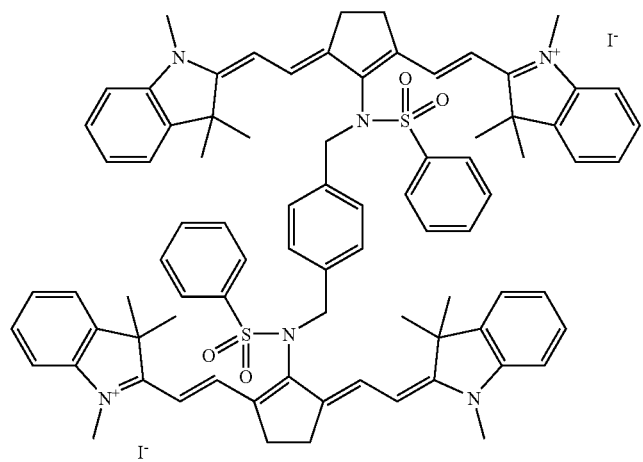

IRD-96:
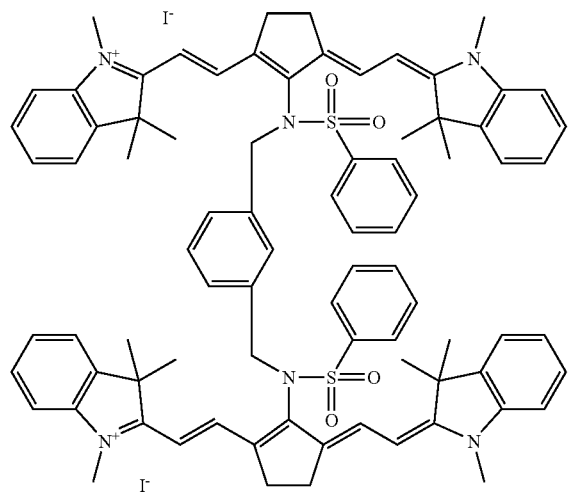
IRD-097:
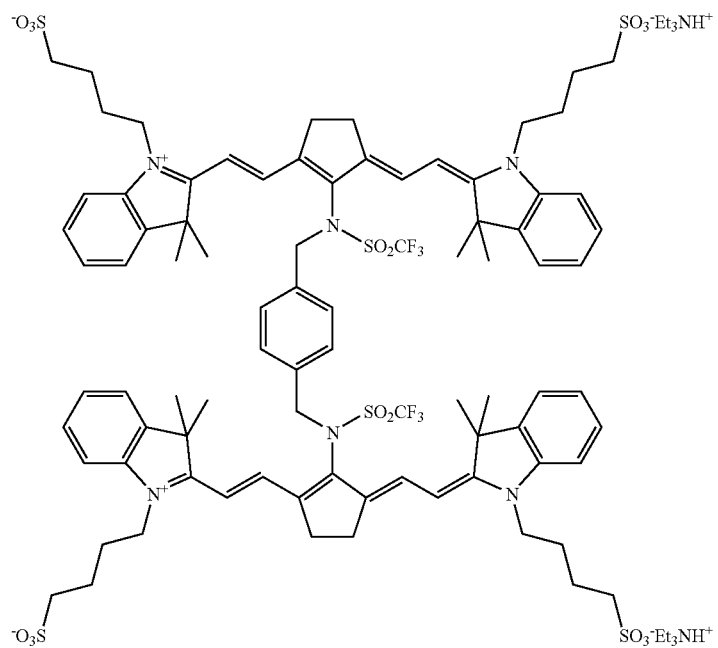

IRD-098:
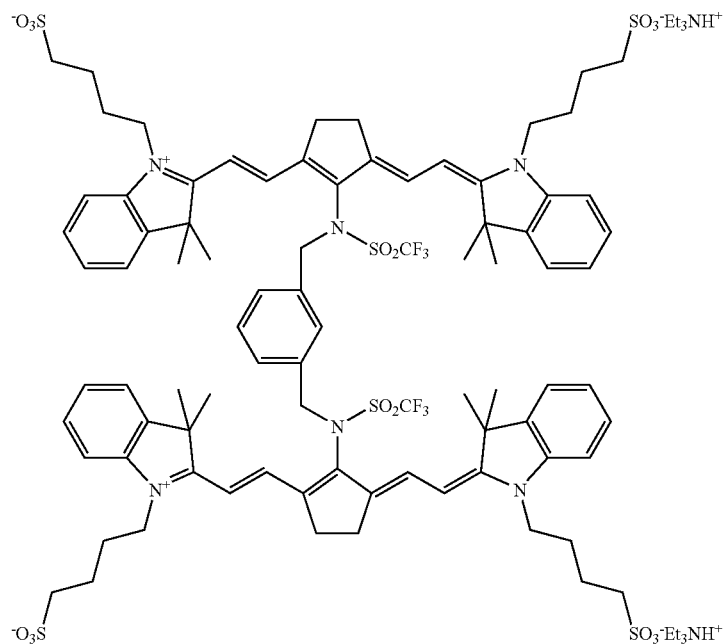
IRD-099:
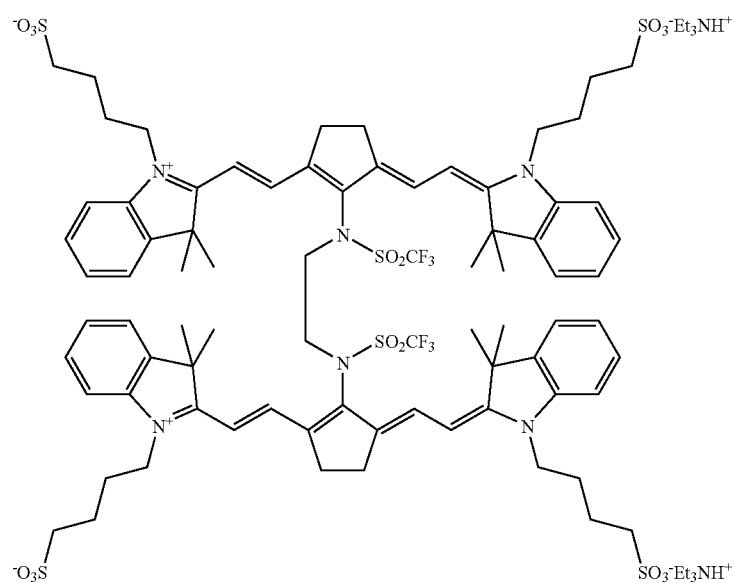

-continued
IRD-100:
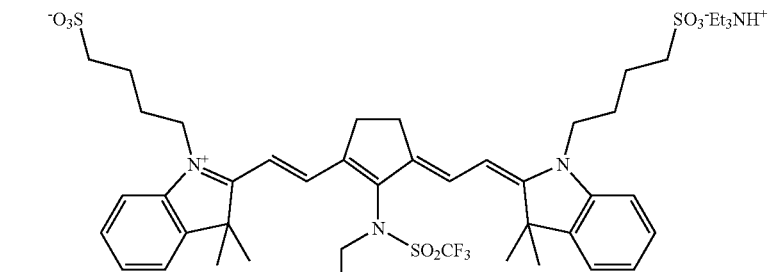
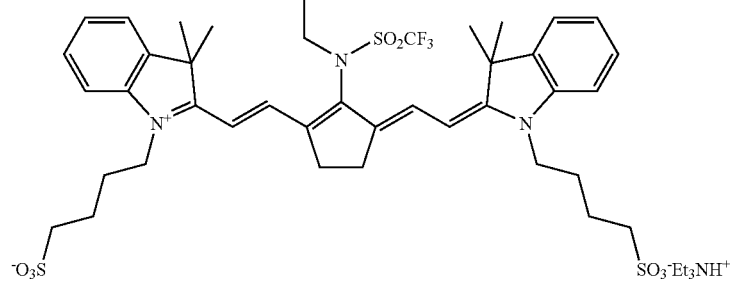
IRD-101:
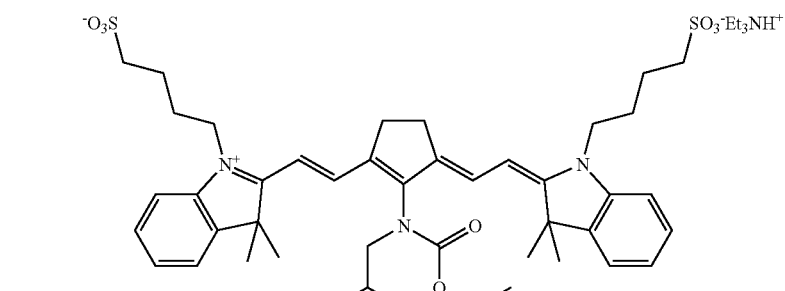
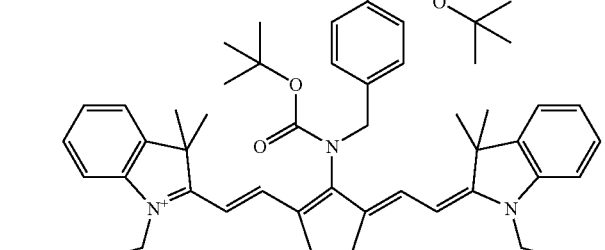
IRD-102:
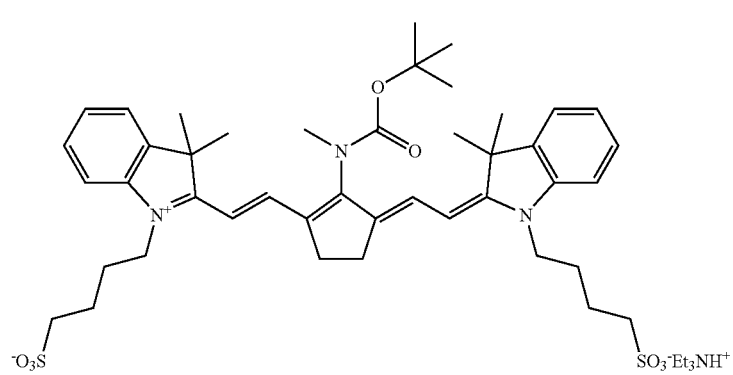

According to another preferred embodiment of the present invention, a heat-sensitive lithographic printing plate precursor is provided which includes (i) a support having a hydrophilic surface or which is provided with a hydrophilic layer; and (ii) on the support, a coating including an IR dye of Formula I, II, III, IV, V-a, V-b, V-c, or V-d. The coating is hereinafter also referred to as a "heat-sensitive coating".

The heat-sensitive coating of preferred embodiments of the present invention may include at least one or more layers such as an image recording layer, a top layer, an intermediate layer between the support and the image-recording layer, and/or an intermediate layer between the top layer and the image-recording layer.

The IR dye of various preferred embodiments of the present invention may be present in at least one layer of the heat-sensitive coating, e.g., in an image recording layer, in a top layer, in an intermediate layer between the support and the image-recording layer, or in an intermediate layer between the top layer and the image-recording layer, preferably in an image-forming layer and/or in a top layer.

The concentration of the IR-dye in the heat-sensitive coating depends on the type of the heat-sensitive coating. Heat-sensitive coatings which include a photopolymerizable composition, thermoplastic polymer particles, microcapsules, a switchable polymer, or an alkaline soluble polymer in combination with a solubility inhibiting compound, usually contain an IR dye in a concentration ranging between 0.25% and 50% by weight, preferably between 0.5% and 30% by weight, more preferably between 0.7% and 20% by weight relative to the coating as a whole. Heat-sensitive coatings which ablate under the influence of IR-radiation or heating may contain higher concentrations of IR-dye, preferably between 50% and 100% by weight, more preferably between 75% and 100% by weight relative to the coating as a whole.

The heat-sensitive coating may further include other infrared absorbing compounds, such as IR-cyanine dyes, IR-merocyanine dyes, IR-methine dyes, IR-naphthoquinone dyes or IR-squarylium dyes, IR-cyanine dyes having two indolenine groups, or anionic IR-cyanine dyes having two sulphonic acids or carboxylic acid groups.

Compounds, in the prior art known as photo-initiators or photo-co-initiators, may enhance the visual contrast, obtained with the IR dyes according to preferred embodiments of the present invention, by facilitating the transformation reaction of the $R^d$ groups, mentioned above, upon IR exposure.

For example, borates are known to initiate or co-initiate photo-polymerization reactions. See, e.g., WO 92/13900, EP-A 0 483 648, and EP-A 0 353 030, DE 19 648 282, DE 19 648 313, and Research Disclosure, Aug. 10, 1997, pages 493-495. Borates that may enhance the obtained contrast according to preferred embodiments of the present invention are represented according to Formula VI.

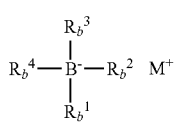

Formula VI wherein $R_b^1$, $R_b^2$, $R_b^3$, and $R_b^4$ are independently an optionally substituted aliphatic hydrocarbon group, an optionally substituted (hetero)aryl group, a halogen atom and $M^+$ is an alkali metal cation such as, e.g., $Li^+$, $Na^+$, $K^+$, an optional substituted ammonium ion according to Formula VII. $M^+$ may also be a cationic IR dye, more particulary a cationic IR dye according to preferred embodiments of the present invention.

The borate compounds described in EP-A 1 467 250 (paragraph [0028] on page 6 to paragraph [0035] on page 12) may also be used as contrast enhancing compounds.

Other initiators or co-initiators, as for example those described in EP-A 1 449 653 and EP-A 1 467 250, may also influence the transformation reaction of the $R^d$ groups of the IR dyes according to preferred embodiments of the present invention. These initiators may be used in combination with the borate initiators mentioned above.

Ammonium compounds according to Formula VII may also facilitate the transformation reaction of the $R^d$ groups mentioned above.

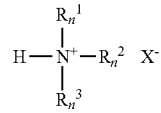

Formula VII wherein $R_n^1$, $R_n^2$ and $R_n^3$ are independently an optionally substituted aliphatic hydrocarbon group, an optionally substituted (hetero)aryl group, or a halogen atom. $X^-$ is a halide, a sulphonate group, a carboxylate group, or a phosphate or phosphonate group. $X^-$ may also be an anionic IR dye, more particulary an anionic IR dye according to preferred embodiments of the present invention. $X^-$ may also be a polymeric compound such as, e.g., partly deprotonated polyacrylic acid or poly (meth)acrylic acid. Poly (meth)acrylic acid may also enhance the obtained contrast, especially in a photopolymerizable composition.

Exposure of the printing plate precursors with ambient daylight, or with some kind of safelight used while providing the printing plate precursor, may deterioate the IR dye used, resulting in a decreased IR absorption and therefore a decreases sensitivity of the precursor. The addition of carboxylic acid compounds, especially those described in EP-A 1 467 250 (pages 4 to 6), e.g., phenyl-NH—CH$_2$—COOH, may improve the daylight stability of printing plate precursor including IR dyes according to preferred embodiments of the present invention.

The daylight stability of the printing plate precursors according to preferred embodiments of the present invention may also be improved by using the compounds described in EP-A 1 607 233 (paragraph [0038] on page 5 to paragraph [0063] on page 18). Compounds, known as fragmentable electron donors, as described in EP-A 1 300 726 and Journal of American Chemical Society, 2000, 122, 48, pages 11934-11943, may also improve the daylight stability of the IR dyes.

The heat-sensitive coating may also further contain other ingredients such as additional binders, development inhibitors, or accelerators.

The printing plate precursors used in preferred embodiments of the present invention are exposed to infrared radiation, e.g., by an infrared laser. Preferably, a laser emitting near infrared light having a wavelength in the range from about 700 nm to about 1500 nm is used, e.g., a semiconductor laser diode, a Nd:YAG, or a Nd:YLF laser. The required laser power depends on the sensitivity of the image recording layer, the pixel dwell time of the laser beam, which is determined by the spot diameter (typical value of modern plate-setters at 1/e$^2$ of maximum intensity: 10-25 μm), the scan speed and the resolution of the exposure apparatus (i.e., the number of addressable pixels per unit of linear distance, often expressed in dots per inch or dpi; typical value: 1000-4000 dpi). Two types of laser-exposure apparatuses are commonly used: internal (ITD) and external drum (XTD) plate-setters. ITD plate-setters for thermal plates are typically characterized by a very high scan speed up to 500 m/sec and may require a laser power of several Watts. XTD plate-setters for thermal plates having a typical laser power from about 200 mW to about 1 W operate at a lower scan speed, e.g., from 0.1 m/sec to 10 m/sec.

In the development step which may be optionally present, the non-exposed areas of the image-recording layer are removed without essentially removing the exposed areas, i.e., without affecting the exposed areas to an extent that renders the ink-acceptance of the exposed areas unacceptable. The non-exposed areas of the image-recording layer may be removed by supplying a developing solution. The developing solution may be water, an aqueous solution, a gum solution, or an aqueous alkaline solution. The development may be combined with mechanical rubbing, e.g., by a rotating brush. The developing solution can be applied to the plate, e.g., by rubbing in with an impregnated pad, by dipping, (spin-)coating, spraying, pouring-on, either by hand or in an automatic processing apparatus.

In another preferred embodiment of the present invention, the image-wise exposed printing plate precursor may also be developed by mounting it on a print cylinder of a printing press and supplying an aqueous dampening liquid and/or ink to the surface of the plate while rotating the print cylinder. This developing step is also called "on-press developing" or "on-press processing".

According to another preferred embodiment of the present invention, a method for making a lithographic printing plate without wet processing is disclosed including the steps of (i) providing the heat-sensitive lithographic printing plate precursor, and (ii) image-wise exposing the precursor to IR-radiation or heat thereby inducing the transformation of the IR dye and forming a print-out image. In a preferred embodiment of this method, the energy density in the image-wise exposing step is at most 300 mJ/cm$^2$, preferably at most 250 mJ/cm$^2$, more preferably at most 200 mJ/cm$^2$, most preferably at most 175 mJ/cm$^2$.

According to another preferred embodiment of the present invention, a method for making a lithographic printing plate includes the steps of (i) providing the heat-sensitive lithographic printing plate precursor, (ii) image-wise exposing the precursor to IR-radiation or heat thereby inducing the transformation of the IR dye and forming a print-out image, and (iii) developing the image-wise exposed precursor.

The developing solution used in this developing step may be water, an aqueous solution, a gum solution, or an aqueous alkaline solution. In a preferred embodiment of this method, the energy density in the image-wise exposing step is at most 300 mJ/cm$^2$, preferably at most 250 mJ/cm$^2$, more preferably at most 200 mJ/cm$^2$, most preferably at most 175 mJ/cm$^2$.

In another preferred embodiment of the present invention, the developing step is preferably carried out by mounting the image-wise exposed precursor on a printing press and developing the precursor in an on-press developing step. In this on-press developing step, fountain solution and ink are supplied to the precursor while rotating the plate on the press, resulting in a dissolution of the coating on the non-printing areas of the precursor. In a preferred embodiment of this method, the energy density in the image-wise exposing step is at most 300 mJ/cm$^2$, preferably at most 250 mJ/cm$^2$, more preferably at most 200 mJ/cm$^2$, most preferably at most 175 mJ/cm$^2$.

In accordance with a more preferred embodiment of the present invention, the IR dye is substituted with the anionic or acid groups as defined above. This is especially advantageous when the image-wise exposed precursor is developed with water, an aqueous solution, or a gum solution, and also when the image-wise exposed precursor is developed in an on-press developing step with a fountain solution, in order to minimize the risk of dye stain.

In these systems wherein the printing plate precursor after image-wise exposure is processed with a developing solution, the heat-sensitive coating usually includes an additional contrasting dye. After processing, the coating including this contrasting dye substantially remains on the plate only in the printing areas and is removed from the plate on the non-imaging areas, resulting in a visual contrast after processing. According to preferred embodiments of the present invention, the IR dyes may have an additional advantage of forming a good, or even better, contrast after processing, without the addition of such a contrasting dye or by reducing the amount of contrasting dye. This omission or reducing of such a contrasting dye can have a still further advantage in improving the clean-out in the non-printing area of the printing plate. During the wet processing, an undesirable adsorption of the contrasting dye on the hydrophilic surface of the support can occur resulting in a reduced hydrophilicity of the support in the non-printing areas and resulting in an increased tendency of toning. These two advantages are demonstrated in the Examples.

The support of the printing plate precursor may be a sheet-like material such as a plate or it may be a cylindrical element such as a sleeve which can be slid around a print cylinder of a printing press. Preferably, the support is a metal support such as aluminum or stainless steel.

A particularly preferred lithographic support is an electrochemically grained and anodized aluminum support. Graining and anodizing of aluminum supports is well known. The grained aluminum support used in the material is preferably an electrochemically grained support. The acid used for graining can be, e.g., nitric acid or sulphuric acid. The acid used for graining preferably includes hydrogen chloride. Also mixtures of, e.g., hydrogen chloride and acetic acid can be used. The relationship between electrochemical graining and anodizing parameters such as electrode voltage, nature, and concentration of the acid electrolyte or power consumption on the one hand and the obtained lithographic quality in terms of Ra and anodic weight (g/m$^2$ of $Al_2O_3$ formed on the aluminum surface) on the other hand is well known. More details about the relationship between various production parameters and R$^a$ or anodic weight can be found in, e.g., the article "Management of Change in the Aluminium Printing Industry" by F. R. Mayers, published in the ATB Metallurgie Journal, Volume 42 No. 1-2 (2002), page 69.

The anodized aluminum support may be subject to a so-called post-anodic treatment to improve the hydrophilic properties of its surface. For example, the aluminum support may be silicated by treating its surface with a sodium silicate solution at an elevated temperature, e.g., 95° C. Alternatively, a phosphate treatment may be applied which involves treating the aluminum oxide surface with a phosphate solution that may further contain an inorganic fluoride. Further, the aluminum oxide surface may be rinsed with a citric acid or citrate solution. This treatment may be carried out at room temperature or may be carried out at a slightly elevated temperature of about 30° C. to 50° C. A further interesting treatment involves rinsing the aluminum oxide surface with a bicarbonate solution. Still further, the aluminum oxide surface may be treated with polyvinylphosphonic acid, polyvinylmethylphosphonic acid, phosphoric acid esters of polyvinyl alcohol, polyvinylsulphonic acid, polyvinylbenzenesulphonic acid, sulphuric acid esters of polyvinyl alcohol, and acetals of polyvinyl alcohols formed by reaction with a sulphonated aliphatic aldehyde.

Another useful post-anodic treatment may be carried out with a solution of polyacrylic acid or a polymer including at least 30 mol % of acrylic acid monomeric units, e.g., GLASCOL E15, a polyacrylic acid, commercially available from ALLIED COLLOIDS.

The support can also be a flexible support, which may be provided with a hydrophilic layer, hereinafter called 'base layer'. The flexible support is, e.g., paper, plastic film, or aluminum. Preferred examples of plastic film are polyethylene terephthalate film, polyethylene naphthalate film, cellulose acetate film, polystyrene film, polycarbonate film, etc. The plastic film support may be opaque or transparent.

The base layer is preferably a cross-linked hydrophilic layer obtained from a hydrophilic binder cross-linked with a hardening agent such as formaldehyde, glyoxal, polyisocyanate, or a hydrolyzed tetra-alkylorthosilicate. The latter is particularly preferred. The thickness of the hydrophilic base layer may vary in the range of 0.2 µm to 25 µm and is preferably 1 µm to 10 µm. More details of preferred embodiments of the base layer can be found in, e.g., EP-A 1 025 992.

In a preferred embodiment, the heat-sensitive coating may include hydrophobic thermoplastic polymer particles dispersed in a hydrophilic binder.

In this type image-recording layer, due to the heat generated during the exposure step, the hydrophobic thermoplastic polymer particles fuse or coagulate so as to form a hydrophobic phase which corresponds to the printing areas of the printing plate. Coagulation may result from heat-induced coalescence, softening or melting of the thermoplastic polymer particles. There is no specific upper limit to the coagulation temperature of the thermoplastic hydrophobic polymer particles, however the temperature should be sufficiently below the decomposition temperature of the polymer particles. Preferably the coagulation temperature is at least 10° C. below the temperature at which the decomposition of the polymer particles occurs. The coagulation temperature is preferably higher than 50° C., more preferably above 100° C.

In the development step, the non-exposed areas of the image-recording layer are removed by supplying a developing solution without essentially removing the exposed areas, i.e., without affecting the exposed areas to an extent that renders the ink-acceptance of the exposed areas unacceptable. The developing solution may be water, an aqueous solution, or an aqueous alkaline solution. The development by supplying a developing solution may be combined with mechanical rubbing, e.g., by a rotating brush. The developing solution can be applied to the plate, e.g., by rubbing in with an impregnated pad, by dipping, (spin-)coating, spraying, pouring-on, either by hand or in an automatic processing apparatus. The image-wise exposed printing plate precursor may also be developed in an on-press processing by mounting it on a print cylinder of a printing press and supplying an aqueous dampening liquid and/or ink to the surface of the plate while rotating the print cylinder.

Specific examples of suitable hydrophobic thermoplastic polymers are, e.g., polyethylene, poly(vinyl chloride), poly(methyl(meth)acrylate), poly(ethyl(meth)acrylate), poly(vinylidene chloride), poly(meth)acrylonitrile, poly(vinyl carbazole), polystyrene or copolymers thereof. Polystyrene and poly(meth)acrylonitrile or their derivatives are highly preferred embodiments. According to such preferred embodiments, the thermoplastic polymer includes at least 50 wt. % of polystyrene, and more preferably at least 60 wt. % of polystyrene. In order to obtain sufficient resistivity towards organic chemicals, such as the hydrocarbons used in plate cleaners, the thermoplastic polymer preferably includes at least 5 wt. %, more preferably at least 30 wt. % of nitrogen containing monomeric units or of units which correspond to monomers that are characterized by a solubility parameter larger than 20, such as (meth)acrylonitrile. Suitable examples of such nitrogen containing monomeric units are disclosed in EP-A 1 219 416.

According to a highly preferred embodiment, the thermoplastic polymer is a copolymer consisting of styrene and acrylonitrile units in a weight ratio between 1:1 and 5:1 (styrene:acrylonitrile), e.g., in a 2:1 ratio.

The weight average molecular weight of the thermoplastic polymer particles may range from 5,000 to 1,000,000 g/mol. The hydrophobic particles preferably have a number average particle diameter below 200 nm, more preferably between 10 nm and 100 nm, most preferably between 20 nm and 63 nm. The amount of hydrophobic thermoplastic polymer particles contained in the image-recording layer is preferably at least 20 wt. %, more preferably at least 70 wt. % and most preferably between 70 wt. % and 85 wt. %.

The hydrophobic thermoplastic polymer particles may be present as a dispersion in an aqueous coating liquid of the image-recording layer and may be prepared by the methods disclosed in U.S. Pat. No. 3,476,937. Another method especially suitable for preparing an aqueous dispersion of the thermoplastic polymer particles includes dissolving the hydrophobic thermoplastic polymer in an organic water immiscible solvent, dispersing the thus obtained solution in water or in an aqueous medium, and removing the organic solvent by evaporation.

The image recording layer preferably further includes a hydrophilic binder, e.g., homopolymers and copolymers of vinyl alcohol, acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60 percent by weight, preferably 80 percent by weight.

In another preferred embodiment, the heat-sensitive coating may also include a photopolymer or a photopolymerizable composition.

In this type of image-recording layer, upon exposure to IR light or heat, the photopolymer or photopolymerizable composition is hardened, so as to form a hydrophobic phase which corresponds to the printing areas of the printing plate. Here, "hardened" means that the coating becomes insoluble or non-dispersible for the developer and may be achieved through polymerization and/or crosslinking of the photosensitive coating, optionally followed by a heating step to enhance or to speed-up the polymerization and/or crosslinking reaction. In this optional heating step, hereinafter also referred to as "pre-heat", the plate precursor is heated, preferably at a temperature of about 80° C. to 150° C. and preferably during a dwell time of about 5 seconds to 1 minute.

The photopolymerizable coating provided on the support includes a polymerizable monomer or oligomer and an initiator capable of hardening the monomer or oligomer and, optionally, a sensitizer capable of absorbing light used in the image-wise exposing step.

The coating thickness of the photopolymerizable coating is preferably between 0.1 g/m$^2$ and 4.0 g/m$^2$, more preferably between 0.4 g/m$^2$ and 2.0 g/m$^2$.

In a preferred embodiment, the polymerizable monomer or oligomer may be a monomer or oligomer including at least one epoxy or vinyl ether functional group and the initiator may be a Bronsted acid generator capable of generating free acid, optionally in the presence of a sensitizer, upon exposure, hereinafter the initiator also referred to as "cationic photoinitiator" or "cationic initiator". Suitable polyfunctional epoxy monomers include, for example, 3,4-epoxycyclohexylmethyl-3,4-epoxycyclohex-ane carboxylate, bis-(3,4-epoxycyclohexymethyl)adipate, difunctional bisphenol A epichlorohydrin epoxy resin and multifunctional epichlorohydrinitetraphenylol ethane epoxy resin. Suitable cationic photoinitiators include, for example, triarylsulfonium hexafluoroantimonate, triarylsulfonium hexafluorophosphate, diaryliodonium hexafluoroantimonate, and haloalkyl substituted s-triazine. It is noted that most cationic initiators are also free radical initiators because, in addition to generating Bronsted acid, they also generate free radicals during photo or thermal decomposition.

In another preferred embodiment, the polymerizable monomer or oligomer may be an ethylenically unsaturated compound, having at least one terminal ethylenic group, hereinafter also referred to as "free-radical polymerizable monomer", and the initiator may be a compound, capable of generating free radical, optionally in the presence of a sensitizer, upon exposure, hereinafter the initiator also referred to as "free radical initiator". Suitable free-radical polymerizable monomers include, for example, multifunctional (meth)acrylate monomers (such as (meth)acrylate esters of ethylene glycol, trimethylolpropane, pentaerythritol, ethoxylated ethylene glycol and ethoxylated trimethylolpropane, multifunctional urethanated (meth)acrylate, and epoxylated (meth) acrylate), and oligomeric amine diacrylates. The (meth) acrylic monomers may also have other double bond or epoxide group, in addition to (meth)acrylate group. The (meth)acrylate monomers may also contain an acidic (such as carboxylic acid) or basic (such as amine) functionality. Any free radical initiator capable of generating free radical in the presence of a sensitizer upon exposure can be used as a free radical initiator of this invention. Suitable free-radical initiators include, for example, the derivatives of acetophenone (such as 2,2-dimethoxy-2-phenylacetophenone, and 2-methyl-1-[4-(methylthio)phenyl-2-morpholino propan-1-one); benzophenone; benzil; ketocoumarin (such as 3-benzoyl-7-methoxy coumarin and 7-methoxy coumarin); xanthone; thioxanthone; benzoin or an alkyl-substituted anthraquinone; onium salts (such as diaryliodonium hexafluoroantimonate, diaryliodonium triflate, (4-(2-hydroxytetradecyl-oxy)-phenyl)phenyliodonium hexafluoroantimonate, triarylsulfonium hexafluorophosphate, triarylsulfonium p-toluenesulfonate, (3-phenylpropan-2-onyl)triaryl phosphonium hexafluoroantimonate, and N-ethoxy(2-methyl)pyridinium hexafluorophosphate, and onium salts as described in U.S. Pat. Nos. 5,955,238; 6,037,098; and 5,629,354); borate salts (such as tetrabutylammonium triphenyl(n-butyl)borate, tetraethylammonium triphenyl(n-butyl)borate, diphenyliodonium tetraphenylborate, and triphenylsulfonium triphenyl(n-butyl) borate, and borate salts as described in U.S. Pat. Nos. 6,232,038 and 6,218,076); haloalkyl substituted s-triazines (such as 2,4-bis(trichloromethyl)-6-(p-methoxy-styryl)-s-triazine, 2,4-bis(trichloromethyl)-6-(4-methoxy-naphth-1-yl)-s-triazine, 2,4-bis(trichloromethyl)-6-piperonyl-s-triazine, and 2,4-bis(trichloromethyl)-6-[(4-ethoxy-ethylenoxy)-phen-1-yl]-s-triazine, and s-triazines as described in U.S. Pat. Nos. 5,955, 238; 6,037,098; 6,010,824; and 5,629,354); and titanocene (bis(etha.9-2,4-cyclopentadien-1-yl)bis[2,6-difluoro-3-(1H-pyrrol-1-yl)phenyl)titanium). Onium salts, borate salts, and s-triazines are preferred free radical initiators. Diaryliodonium salts and triarylsulfonium salts are preferred onium salts. Triarylalkylborate salts are preferred borate salts. Trichloromethyl substituted s-triazines are preferred s-triazines.

In still another preferred embodiment, the polymerizable monomer or oligomer may be a combination of a monomer or oligomer including at least one epoxy or vinyl ether functional group and a polymerizable ethylenically unsaturated compound, having at least one terminal ethylenic group, and the initiator may be a combination of a cationic initiator and a free-radical initiator. A monomer or oligomer including at least one epoxy or vinyl ether functional group and a polymerizable ethylenically unsaturated compound, having at least one terminal ethylenic group, can be the same compound wherein the compound contains both ethylenic group and epoxy or vinyl ether group. Examples of such compounds include epoxy functional acrylic monomers, such as glycidyl acrylate. The free radical initiator and the cationic initiator can be the same compound if the compound is capable of generating both free radical and free acid. Examples of such compounds include various onium salts such as diaryliodonium hexafluoroantimonate and s-triazines such as 2,4-bis (trichloromethyl)-6-[(4-ethoxyethylenoxy)-phen-1-yl]-s-triazine which are capable of generating both free radical and free acid in the presence of a sensitizer.

The photopolymerizable coating may also include a multifunctional monomer. This monomer contains at least two functional groups selected from an ethylenically unsaturated group and/or an epoxy or vinyl ether group. Particular multifunctional monomers for use in the photopolymer coating are disclosed in U.S. Pat. Nos. 6,410,205; 5,049,479; EP 1079276; EP 1369232; EP 1369231; EP 1341040; U.S. 2003/0124460; EP 1241002; EP 1288720; and in the reference book including the cited references: Chemistry & Technology UV & EB Formulation for Coatings, Inks & Paints, Volume 2 and Prepolymers and Reactive Diluents for UV and EB Curable Formulations by N. S. Allen, M. A. Johnson, P. K. T. Oldring, M. S. Salim; Edited by P. K. T. Oldring, 1991, ISBN 0 947798102.

The photopolymerizable coating may also include a co-initiator. Typically, a co-initiator is used in combination with a free radical initiator and/or cationic initiator. Particular co-initiators for use in the photopolymer coating are disclosed in U.S. Pat. Nos. 6,410,205; 5,049,479; EP 1079276; EP 1369232; EP 1369231; EP 1341040; U.S. 2003/0124460; EP 1241002; EP 1288720; and in the reference book including the cited refences: Chemistry & Technology UV & EB Formulation for Coatings, Inks & Paints, Volume 3 and Photoinitiators for Free Radical and Cationic Polymerisation by K. K. Dietliker, Edited by P. K. T. Oldring, 1991, ISBN 0 947798161.

The photopolymerizable coating may also include an inhibitor. Particular inhibitors for use in the photopolymer coating are disclosed in U.S. Pat. No. 6,410,205 and EP 1288720.

The photopolymerizable coating may also include a binder. The binder can be selected from a wide series of organic polymers. Compositions of different binders can also be used. Useful binders include for example chlorinated polyalkylene (in particular chlorinated polyethylene and chlorinated polypropylene), polymethacrylic acid alkyl esters or alkenyl esters (in particular polymethyl(meth)acrylate, polyethyl(meth)acrylate, polybutyl(meth)acrylate, polyisobutyl (meth)acrylate, polyhexyl(meth)acrylate, poly(2-ethylhexyl) (meth)acrylate and polyalkyl(meth)acrylate copolymers of (meth)acrylic acid alkyl esters or alkenyl esters with other copolymerizable monomers (in particular with (met)acrylonitrile, vinyl chloride, vinylidene chloride, styrene and/or butadiene), polyvinyl chloride (PVC, vinylchloride/(meth) acrylonitrile copolymers, polyvinylidene chloride (PVDC), vinylidene chloride/(meth)acrylonitrile copolymers, polyvinyl acetate, polyvinyl alcohol, poly(meth)acrylonitrile, (meth)acrylonitrile/styrene copolymers, (meth)acrylamide/ alkyl (meth)acrylate copolymers, (meth)acrylonitrile/butadiene/styrene (ABS) terpolymers, polystyrene, poly(α-methylstyrene), polyamides, polyurethanes, polyesters, methyl cellulose, ethylcellulose, acetyl cellulose, hydroxy-($C_1$-$C_4$-alkyl)cellulose, carboxymethyl cellulose, polyvinyl formal, and polyvinyl butyral. Other useful binders are binders containing carboxyl groups, in particular copolymers containing monomeric units of α,β-unsaturated carboxylic acids or monomeric units of α,β-unsaturated dicarboxylic acids (preferably acrylic acid, methacrylic acid, crotonic acid, vinylacetic acid, maleic acid, or itaconic acid). By the term "copolymers" are to be understood in the context of the present invention as polymers containing units of at least 2 different monomers, thus also terpolymers and higher mixed polymers. Particular examples of useful copolymers are those containing units of (meth)acrylic acid and units of alkyl (meth)acrylates, allyl(meth)acrylates and/or (meth)acrylonitrile as well as copolymers containing units of crotonic acid and units of alkyl(meth)acrylates and/or (meth)acrylonitrile and vinylacetic acid/alkyl(meth)acrylate copolymers. Also suitable are copolymers containing units of maleic anhydride or maleic acid monoalkyl esters. Among these are, for example, copolymers containing units of maleic anhydride and styrene, unsaturated ethers or esters or unsaturated aliphatic hydrocarbons and the esterification products obtained from such copolymers. Further suitable binders are products obtainable from the conversion of hydroxyl-containing polymers with intramolecular dicarboxylic anhydrides. Further useful binders are polymers in which groups with acid hydrogen atoms are present, some or all of which are converted with activated isocyanates. Examples of these polymers are products obtained by conversion of hydroxyl-containing polymers with aliphatic or aromatic sulfonyl isocyanates or phosphinic acid isocyanates. Also suitable are polymers with aliphatic or aromatic hydroxyl groups, for example copolymers containing units of hydroxyalkyl(meth)acrylates, allyl alcohol, hydroxystyrene or vinyl alcohol, as well as epoxy resins, provided they carry a sufficient number of free OH groups. Particular useful binder and particular useful reactive binders are disclosed in EP 1 369 232; EP 1 369 231; EP 1 341 040; U.S. 2003/0124460; EP 1 241 002; EP 1 288 720; U.S. Pat. Nos. 6,027,857; 6,171,735; and 6,420,089.

The organic polymers used as binders have a typical mean molecular weight $M_w$ between 600 and 200,000, preferably between 1,000 and 100,000. Preference is further given to polymers having an acid number between 10 to 250, preferably 20 to 200, or a hydroxyl number between 50 and 750, preferably between 100 and 500. The amount of binder(s) generally ranges from 10% to 90% by weight, preferably 20% to 80% by weight, relative to the total weight of the non-volatile components of the composition.

Various surfactants may be added into the photopolymerizable coating to allow or enhance the developability of the precursor. Both polymeric and small molecule surfactants can be used. Nonionic surfactants are preferred. Preferred nonionic surfactants are polymers and oligomers containing one or more polyether (such as polyethylene glycol, polypropylene glycol, and copolymer of ethylene glycol and propylene glycol) segments. Examples of preferred nonionic surfactants are block copolymers of propylene glycol and ethylene glycol (also called block copolymer of propylene oxide and ethylene oxide); ethoxylated or propoxylated acrylate oligomers; and polyethoxylated alkylphenols and polyethoxylated fatty alcohols. The nonionic surfactant is preferably added in an amount ranging between 0.1% and 30% by weight of the photo-polymerizable coating, more preferably between 0.5% and 20%, and most preferably between 1% and 15%.

A topcoat or overcoat, including, e.g., polyvinylalcohol or polyvinylpyrrolidone or copolymers thereof may be coated on top of the photopolymerizable coating. The contrast, obtained after exposure to IR radiation or heat, and due to the IR dye according to preferred embodiments of the present invention being present, may be obtained with or without the topcoat or overcoat.

In another preferred embodiment, the heat-sensitive coating may also include a switchable polymer which is capable of changing the hydrophilic/hydrophobic-balance of the surface of the heat-sensitive coating upon IR-radiation or heating from hydrophilic to hydrophobic or from hydrophobic to hydrophilic.

The thermally switchable polymer renders the surface of the heat-sensitive coating, which is initially hydrophilic (or hydrophobic), more hydrophobic (or more hydrophilic) due to the heat generated during the exposure step. By more hydrophilic is meant an increase in the wettability of the coating by the fountain solution which is usually an aqueous solution. By more hydrophobic is meant an increase in the wettability of the coating by the oleophilic ink. Usually such printing plates can be used directly on the printing press, but an additional wet developing step such as an on-press developing step or an off-press developing step, may be used.

Typical examples of such systems are the thermally induced acid catalyzed cleavage of acid-labile groups pendant from a polymer backbone as described in WO 92/9934 and EP 652 483, polymeric systems which ablate from the support or which depolymerise upon heating, the thermal cyclodehydration of polyamic acids with hydrazide groups as described in U.S. Pat. No. 4,081,572, the thermally induced destruction or generation of a charge on polymers as described in EP 200 488, the thermally induced rupture of microcapsels and the subsequent reaction the encapsulated material with other compounds of the coating as described in U.S. Pat. No. 5,569,573, EP 646 476, WO 94/2395, and WO 98/29258, the image-wise crosslinking of a water-soluble bottom layer with a phenolic top layer as described in JP 10-069089, the heat-sensitive hyperbranched polymers containing heat-sensitive active end groups as described in U.S. Pat. No. 6,162,578, and the polarity switchable image-forming materials as described in EP 1 129 861.

In another preferred embodiment, the heat-sensitive coating may also include a polymer or binder soluble in an alkaline solution and a solubility inhibiting compound which reduces the solubility of the layer in the alkaline solution, and wherein, upon IR-radiation or heating, the heat-sensitive coating has an increased solubility in the alkaline solution.

The amount of the alkali-soluble polymer is advantageously from 40% to 99.8% by weight, preferably from 70% to 99.4% by weight, particularly preferably from 80% to 99% by weight, based in each case on the total weight of the non-volatile components of the coating. The alkali-soluble binder is preferably an organic polymer which has acidic groups with a pKa of less than 13 to ensure that the coating is soluble or at least swellable in aqueous alkaline developers. Advantageously, the binder is a polymer or polycondensate, for example a polyester, polyamide, polyurethane or polyurea. Polycondensates and polymers having free phenolic hydroxyl groups, as obtained, for example, by reacting phenol, resorcinol, a cresol, a xylenol or a trimethylphenol with aldehydes, especially formaldehyde, or ketones are also particularly suitable. Condensates of sulfamoyl- or carbamoyl-substituted aromatics and aldehydes or ketones are also suitable. Polymers of bismethylol-substituted ureas, vinyl ethers, vinyl alcohols, vinyl acetals or vinylamides and polymers of phenylacrylates and copolymers of hydroxy-lphenylmaleimides are likewise suitable. Furthermore, polymers having units of vinylaromatics, N-aryl(meth)acrylamides or aryl (meth)acrylates may be mentioned, it being possible for each of these units also to have one or more carboxyl groups, phenolic hydroxyl groups, sulfamoyl groups or carbamoyl groups. Specific examples include polymers having units of 2-hydroxyphenyl(meth)acrylate, of N-(4-hydroxyphenyl) (meth)acrylamide, of N-(4-sulfamoylphenyl)-(meth)acrylamide, of N-(4-hydroxy-3,5-dimethylbenzyl)-(meth)acrylamide, or 4-hydroxystyrene or of hydroxyphenylmaleimide. The polymers may additionally contain units of other monomers which have no acidic units. Such units include vinylaromatics, methyl(meth)acrylate, phenyl(meth)acrylate, benzyl (meth)acrylate, methacrylamide or acrylonitrile.

In a preferred embodiment, the polycondensate is a phenolic resin, such as a novolac, a resole, or a polyvinylphenol. The novolac is preferably a cresol/formaldehyde or a cresol/xylenol/formaldehyde novolac, the amount of novolac advantageously being at least 50% by weight, preferably at least 80% by weight, based in each case on the total weight of all binders.

In a preferred embodiment, the alkali-soluble binder is a phenolic resin wherein the phenyl group or the hydroxy group of the phenolic monomeric unit are chemically modified with an organic substituent. The phenolic resins which are chemically modified with an organic substituent may exhibit an increased chemical resistance against printing chemicals such as fountain solutions or press chemicals such as plate cleaners. Examples of preferred chemically modified phenolic resins are described in EP-A 0 934 822; EP-A 1 072 432; U.S. Pat. No. 5,641,608; EP-A 0 982 123; WO99/01795; WO 2004/035310; WO 2004/035686; WO 2004/035645; WO 2004/035687; and U.S. 2005/0037280.

A specific example of a chemically modified phenolic resin includes a monomeric unit wherein the phenyl group is substituted with a group having the structure —N═N-Q, wherein the —N═N— group is covalently bound to a carbon atom of the phenyl group and wherein Q is an aromatic group. Most preferred are the polymers wherein Q has the following Formula

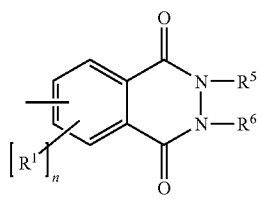

wherein n is 0, 1, 2, or 3;
wherein each $R^1$ is selected from hydrogen, an optionally substituted alkyl, alkenyl, alkynyl, cycloalkyl, heterocyclic, aryl, heteroaryl, aralkyl or heteroaralkyl group, —$SO_2$—NH—$R^2$, —NH—$SO_2$—$R^4$, —CO—$NR^2$—$R^3$, —$NR^2$—CO—$R^4$, —O—CO—$R^4$, —CO—O—$R^2$, —CO—$R^2$, —$SO_3$—$R^2$, —$SO_2$—$R^2$, —SO—$R^4$, —P(═O)(—O—$R^2$)(—O—$R^3$), —$NR^2$—$R^3$, —O—$R^2$, —S—$R^2$, —CN, —$NO_2$, a halogen, -N-phthalimidyl, -M-N-phthalimidyl, or -M-$R^2$, wherein M represents a divalent linking group containing 1 to 8 carbon atoms;
wherein $R^2$, $R^3$, $R^5$ and $R^6$ are independently selected from hydrogen or an optionally substituted alkyl, alkenyl, alkynyl, cycloalkyl, heterocyclic, aryl, heteroaryl, aralkyl or heteroaralkyl group;
wherein $R^4$ is selected from an optionally substituted alkyl, alkenyl, alkynyl, cycloalkyl, heterocyclic, aryl, heteroaryl, aralkyl or heteroaralkyl group;
or wherein at least two groups selected from each $R^1$ to $R^4$ together represent the necessary atoms to form a cyclic structure;
or wherein $R^5$ and $R^6$ together represent the necessary atoms to form a cyclic structure.

The dissolution behavior of the coating in the developer can be fine-tuned by optional solubility regulating components. More particularly, development accelerators and development inhibitors can be used.

Development accelerators are compounds which act as dissolution promoters because they are capable of increasing the dissolution rate of the coating. For example, cyclic acid anhydrides, phenols or organic acids can be used in order to improve the aqueous developability. Examples of the cyclic acid anhydride include phthalic anhydride, tetrahydrophthalic anhydride, hexahydrophthalic anhydride, 3,6-endoxy-4-tetrahydrophthalic anhydride, tetrachlorophthalic anhydride, maleic anhydride, chloromaleic anhydride, alpha-phenylmaleic anhydride, succinic anhydride, and pyromellitic anhydride, as described in U.S. Pat. No. 4,115,128. Examples of the phenols include bisphenol A, p-nitrophenol, p-ethoxyphenol, 2,4,4'-trihydroxybenzophenone, 2,3,4-trihydroxy-benzophenone, 4-hydroxybenzophenone, 4,4',4"-trihydroxy-triphenylmethane, and 4,4',3",4"-tetrahydroxy-3,5,3',5'-tetramethyltriphenyl-methane, and the like. Examples of the organic acids include sulfonic acids, sulfinic acids, alkylsulfuric acids, phosphonic acids, phosphates, and carboxylic acids, as described in, for example, JP-A 60-88,942 and JP-A 2-96,755. Specific examples of these organic acids include p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, 3,4,5-trimethoxybenzoic acid, 3,4,5-trimethoxycinnamic acid, phthalic acid, terephthalic acid, 4-cyclohexene-1,2-dicarboxylic acid, erucic acid, lauric acid, n-undecanoic acid, and ascorbic acid. The amount of the cyclic acid anhydride, phenol, or organic acid contained in the coating is preferably in the range of 0.05% to 20% by weight.

In a preferred embodiment, the coating also contains one or more dissolution inhibitors, i.e., one or more materials which reduce the dissolution rate of the hydrophobic polymer in the aqueous alkaline developer at the non-exposed areas of the coating. The dissolution inhibiting capability of the inhibitor can easily be tested by coating two samples on a support: a reference sample containing only the hydrophobic polymer and another including both the polymer (in equal amounts as the reference) as well as the inhibitor. A series of unexposed samples is immersed in an aqueous alkaline developer, each sample during a different time period. After the immersion period, the sample is removed from the developer, immediately rinsed with water, dried and then the dissolution of the coating in the developer is measured by comparing the weight of the sample before and after the development. As soon as the coating is dissolved completely, no more weight loss is measured upon longer immersion time periods, i.e., a curve representing weight loss as a function of immersion time reaches a plateau from the moment of complete dissolution of the layer. A material has good inhibiting capability when the coating of the sample without the inhibitor has dissolved completely in the developer before the sample with the inhibitor is attacked by the developer to such an extent that the ink-accepting capability of the coating is affected.

The dissolution inhibitor(s) can be added to the layer of the coating which includes the alkali-soluble hydrophobic polymer discussed above. In this preferred embodiment, the dissolution rate of the non-exposed coating in the developer is reduced by interaction between the hydrophobic polymer and the inhibitor, due to, e.g., hydrogen bonding between these compounds. The dissolution inhibiting capability of the inhibitor is preferably reduced or destroyed by the heat generated during the exposure so that the coating readily dissolves in the developer at exposed areas. Such inhibitors are preferably organic compounds which include at least one aromatic group and a hydrogen bonding site, e.g., a carbonyl group, a sulfonyl group, or a nitrogen atom which may be quaternized and which may be part of a heterocyclic ring or which may be part of an amino substituent of the organic compound. Suitable dissolution inhibitors of this type have been disclosed in e.g., EP-A 825927, WO 97/39894, and EP-A 823327. Some of the compounds mentioned below, e.g., infrared dyes such as cyanines and contrast dyes such as quaternized triarylmethane dyes can also act as a dissolution inhibitor.

Water-repellent polymers represent a second type of suitable dissolution inhibitors. Such polymers seem to increase the developer resistance of the coating by repelling the aqueous developer from the coating. The water-repellent polymers can be added to the layer including the hydrophobic polymer and/or can be present in a separate layer provided on top of the layer with the hydrophobic polymer. In the latter preferred embodiment, the water-repellent polymer forms a barrier layer which shields the coating from the developer and the solubility of the barrier layer in the developer or the penetrability of the barrier layer by the developer can be reduced by exposure to heat or infrared light, as described in, e.g., EP-A 864420, EP-A 950517, and WO99/21725. Preferred examples of the water-repellent polymers are polymers including siloxane and/or perfluoroalkyl units. In one preferred embodiment, the coating contains such a water-repellent polymer in an amount between 0.5 mg/m$^2$ and 25 mg/m$^2$, preferably between 0.5 mg/m$^2$ and 15 mg/m$^2$ and most preferably between 0.5 mg/m$^2$ and 10 mg/m$^2$. When the water-repellent polymer is also ink-repelling, e.g., in the case of polysiloxanes, higher amounts than 25 mg/m$^2$ can result in poor ink-acceptance of the non-exposed areas. An amount lower than 0.5 mg/m$^2$ on the other hand may lead to an unsatisfactory development resistance. The polysiloxane may be a linear, cyclic or complex cross-linked polymer or copolymer. The term polysiloxane compound shall include any compound which contains more than one siloxane group —Si(R,R')—O—, wherein R and R' are optionally substituted alkyl or aryl groups. Preferred siloxanes are phenylalkylsiloxanes and dialkylsiloxanes. The number of siloxane groups in the (co)polymer is at least 2, preferably at least 10, more preferably at least 20. It may be less than 100, preferably less than 60. In another preferred embodiment, the water-repellent polymer is a block-copolymer or a graft-copolymer of a poly(alkylene oxide) block and a block of a polymer including siloxane and/or perfluoroalkyl units. A suitable copolymer includes about 15 to 25 siloxane units and 50 to 70 alkylene oxide groups. Preferred examples include copolymers including phenylmethylsiloxane and/or dimethylsiloxane as well as ethylene oxide and/or propylene oxide, such as Tego Glide 410, Tego Wet 265, Tego Protect 5001 or Silikophen P50/X, all commercially available from Tego Chemie, Essen, Germany. Such a copolymer acts as a surfactant which upon coating, due to its bifunctional structure, automatically positions itself at the interface between the coating and air and thereby forms a separate top layer even when the whole coating is applied from a single coating solution. Simultaneously, such surfactants act as a spreading agent which improves the coating quality. Alternatively, the water-repellent polymer can be applied in a second solution, coated on top of the layer including the hydrophobic polymer. In that preferred embodiment, it may be advantageous to use a solvent in the second coating solution that is not capable of dissolving the ingredients present in the first layer so that a highly concentrated water-repellent phase is obtained at the top of the coating.

The heat-sensitive coating may also include a composition which is typically used for a driographic printing plate, usually based on copolymers of polysiloxane.

EXAMPLES

Synthesis of IRD-001 (scheme 1)

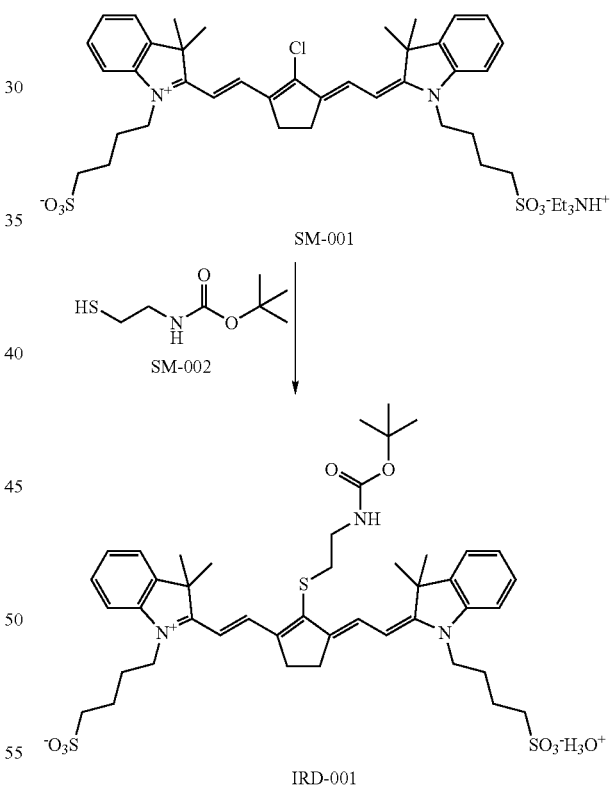

SM-001 is prepared as described in U.S. Pat. No. 5,576,443; SM-001 (8.14 g) is dissolved in methanol (30 ml); SM-002 (2.12 g) and triethylamine (1.66 ml) are added. After stirring for 1 hour at room temperature, the reaction mixture is diluted with ethyl acetate (150 ml) and methanesulfonic acid (0.77 ml) is added, inducing the crystallization of IRD-001. Upon filtration, washing with ethyl acetate and drying under vacuum, IRD-001 is obtained as a red-brown crystalline powder (5.2 g). Absorption maximum (methanol): 818 nm.

Synthesis of IRD-002 (scheme 2):

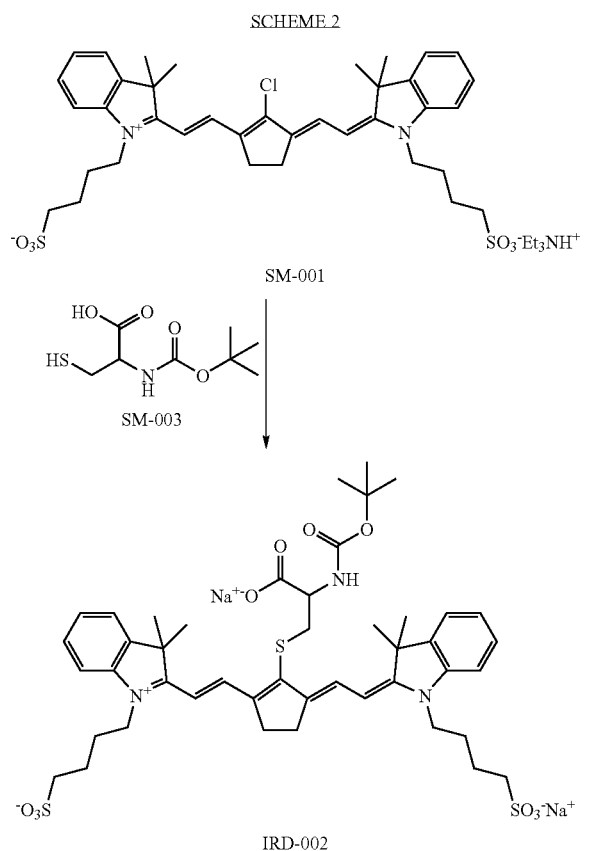

SM-001 is prepared as described in U.S. Pat. No. 5,576,443; SM-001 (4.90 g) is dissolved in methanol (20 ml); SM-003 (2.00 g) and triethylamine (1.86 ml) are added. After stirring for 1 hour at room temperature, NaOAc-3H$_2$O (1.64 g)(NaOAc means sodium acetate) and acetone (400 ml) are added, inducing the crystallization of IRD-002. Upon filtration, washing with acetone and drying under vacuum, IRD-002 is obtained as a green crystalline powder (4.81 g). Absorption maximum (methanol): 812 nm.

Synthesis of IRD-003 (scheme 3)

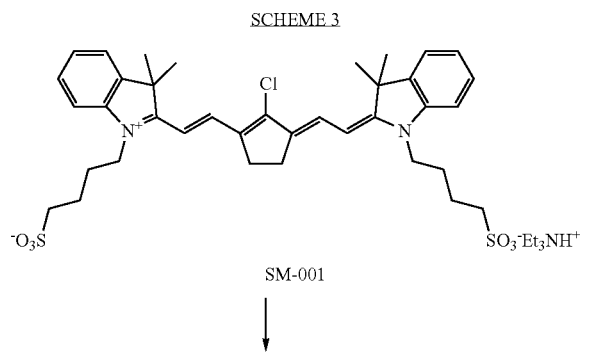

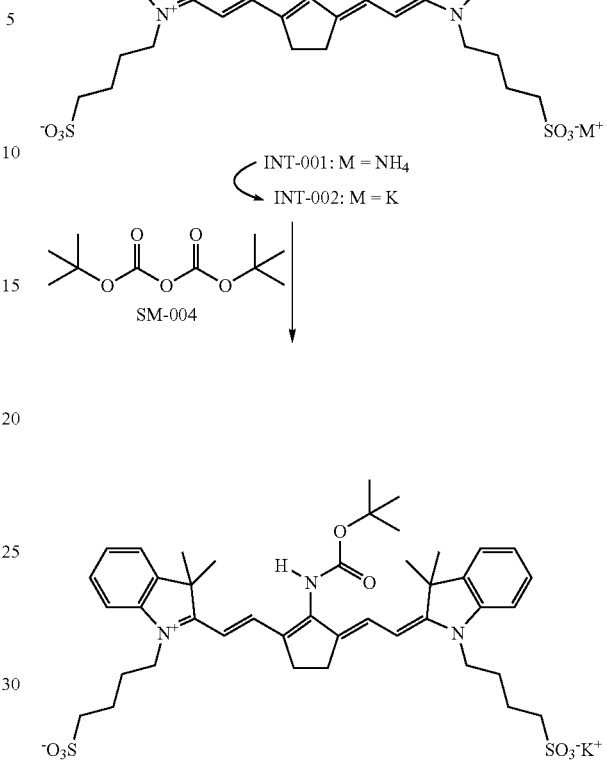

SM-001 is prepared as described in U.S. Pat. No. 5,576,443. To a solution of SM-001 (203.8 g) in methanol (800 ml) at room temperature is added a 1.5 molar solution of NH$_4$OH in water (1.0 l). After stirring for 4 hours at 50° C., isopropanol (200 ml) is added and the reaction mixture is cooled overnight. The precipitate is filtered, washed with cold isopropanol and air dried to obtain INT-001 (160.0 g) as a gold colored powder.

INT-001 (160.0 g) is dissolved in methanol (1.5 l) and under strong stirring, a solution of KOH (31.5 g) in water (62 ml) is added in 30 minutes. After stirring for 90 minutes at room temperature, the precipitate is filtered, washed with ethanol (2×100 ml) on the filter and air dried to obtain INT-002 (160.2 g).

To a solution of INT-002 (0.732 g) in DMSO at room temperature is added SM-004 (0.65 g) and the potassium salt of tertiary butanol (hereafter: Kot-Bu) (0.25 g). After stirring at room temperature for 1 hour, additional SM-004 (0.22 g) and Kot-Bu (0.13 g) are added and the reaction mixture is stirred at 40° C. for 2 hours. After cooling and neutralization with acetic acid, the reaction mixture is poured into methyl t.butyl ether (MTBE) (150 ml). After settling, the solution is decanted. The precipitate is treated with MTBE (100 ml), filtered to obtain IRD-003 (0.82 g). Absorption maximum (methanol): 788 nm.

Synthesis of IRD-004 (scheme 4)

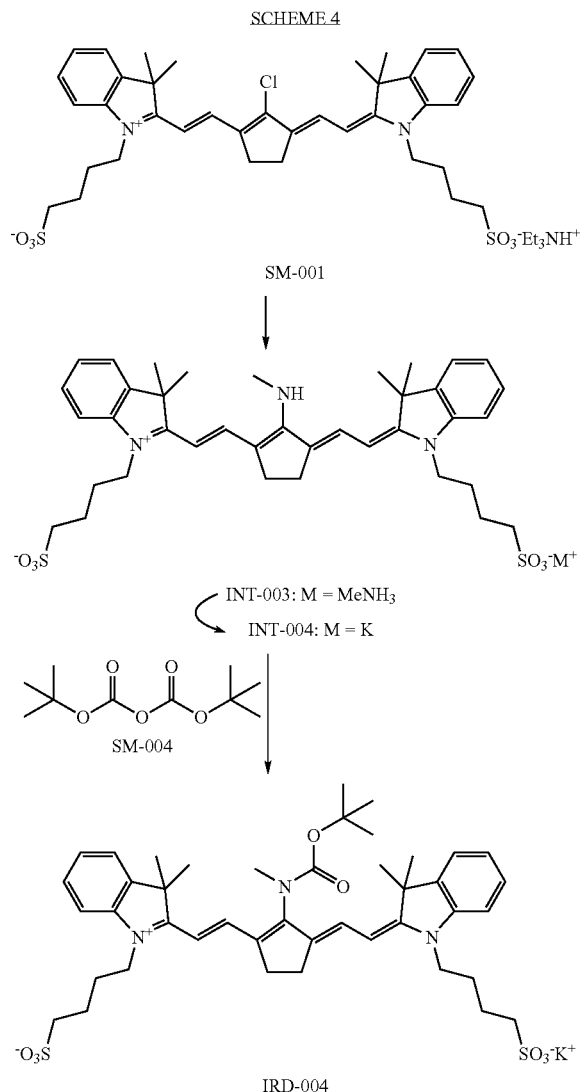

Synthesis of IRD-005 (scheme 5)

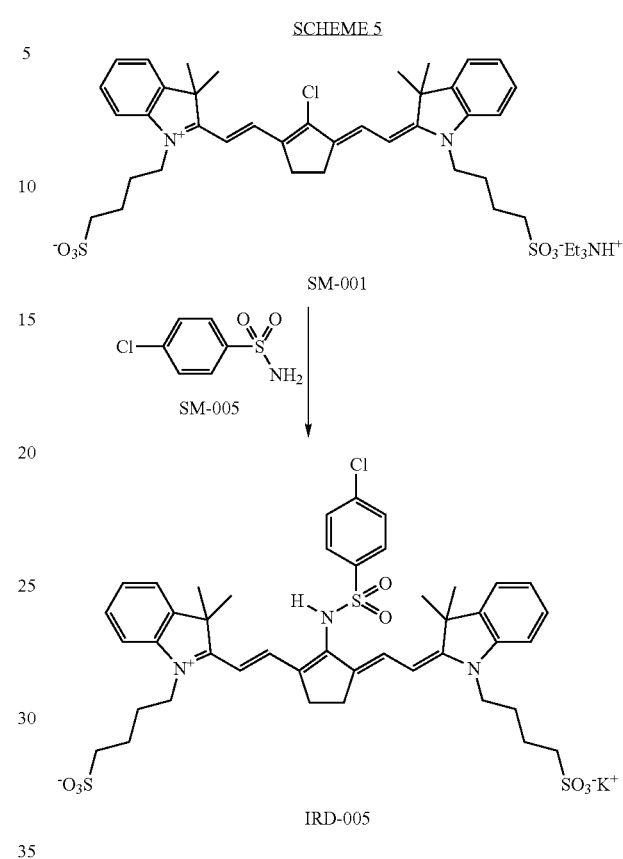

SM-001 is prepared as described in U.S. Pat. No. 5,576, 443. To a solution of SM-001 (203.6 g) in methanol (600 ml) at room temperature is added a 40% w/w solution of methyl amine in water (200 ml). After stirring for 1 hour at 40° C., isopropanol (250 ml) is added and the reaction mixture is cooled to 5° C. The precipitate is filtered, washed with an ice cold 9/1 mixture of isopropanol and water (2×100 ml) and air dried, to obtain INT-003 (181.5 g). INT-003 (181.1 g) is dissolved in methanol (1.8 l) and under strong stirring, a solution of KOH (41.6 g) in water (120 ml) is added in 30 minutes. After stirring for 1 hour at room temperature, the reaction mixture is cooled to 15° C. and the precipitate is filtered, washed with cold ethanol (2×100 ml) on the filter and air dried to obtain INT-004 (160.9 g). To a suspension of INT-004 (7.46 g) in DMSO (30 ml) are added SM-004 (8.73 g) and KOt.Bu (1.35 g). After stirring for 3 days at room temperature, cooling to 5° C. addition of methanesulfonic acid (0.78 ml), IRD-004 is precipitated with a mixture of ethylacetate/water (100/1) (200 ml). After suspending in acetone, filtration and drying, IRD-004 (8.61 g) is obtained. Absorption maximum (methanol): 812 nm.

SM-001 is prepared as described in U.S. Pat. No. 5,576, 443. To a suspension of SM-001 (8.14 g) and SM-005 (3.03 g) in sulfolane (60 ml) at room temperature is added Kot-Bu (3.36 g). After stirring for 30 minutes at 90° C., the reaction mixture is cooled to room temperature and upon addition of methanesulfonic acid (1.3 ml), water (3 ml) and acetone (120 ml), crude IRD-005 precipitates. After filtration, dissolving in water (20 ml) and addition of acetone (500 ml), IRD-005 (9.24 g, containing $CH_3SO_3K$ as an impurity) is obtained. Absorption maximum (methanol+HOAc): 806 nm. Absorption maximum (methanol+$Et_3N$): 654 nm.

Synthesis of IRD-006 (scheme 6)

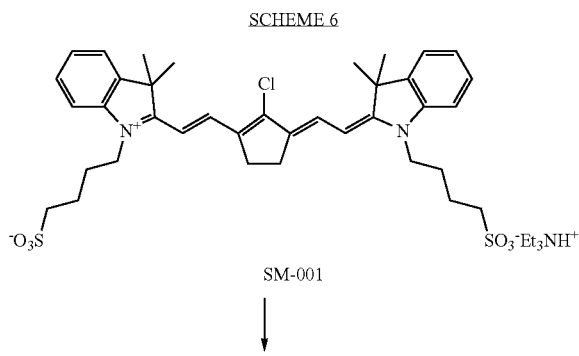

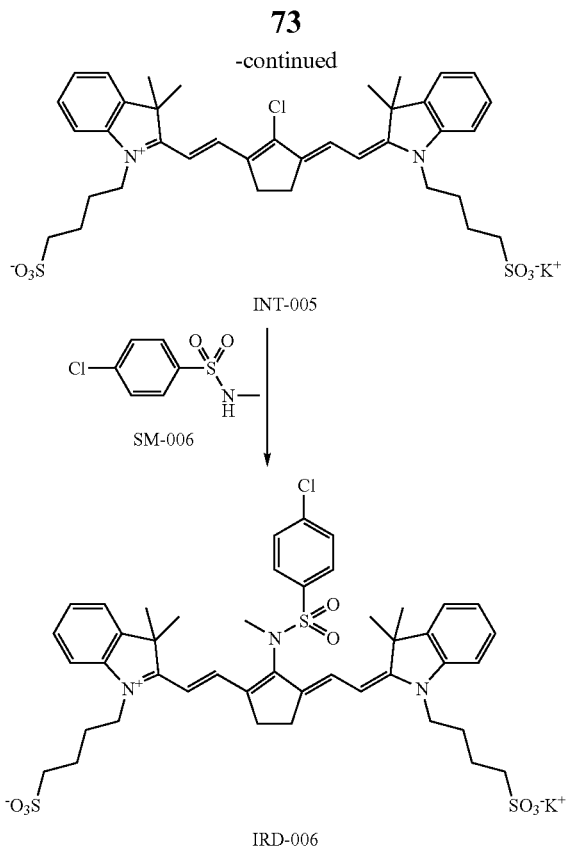

INT-005

SM-006

IRD-006

SM-001 is prepared as described in U.S. Pat. No. 5,576,443. To a stirred solution of SM-001 (81.5 g) in methanol (250 ml) at room temperature is added a solution of KOAc (11.8 g) in methanol (200 ml). Upon addition of methanol (200 ml) and ethyl acetate (300 ml), crude INT-005 is obtained by filtration. After washing with ethyl acetate (200 ml) and drying under vacuum INT-005 (55 g) is obtained, ready for use in the next step. After warming a suspension of INT-005 (5.00 g) and SM-006 (3.4 g) in sulfolane (30 ml) to 60° C., KOt.Bu (3.36 g) is added. After stirring for 30 minutes at 90° C., the reaction mixture is cooled to room temperature and upon addition of water (10 ml), methanesulfonic acid (0.65 ml) and acetone (500 ml), IRD-006 precipitates. After filtration IRD-006 (6.74 g, containing CH$_3$SO$_3$K as an impurity) is obtained. Absorption maximum (methanol): 820 nm.

Synthesis of IRD-007, IRD-008, and IRD-009

SCHEME 7

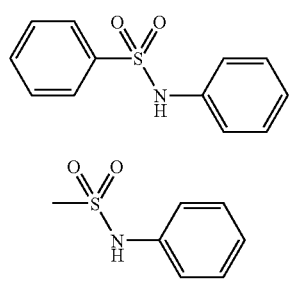

SM-007

SM-008

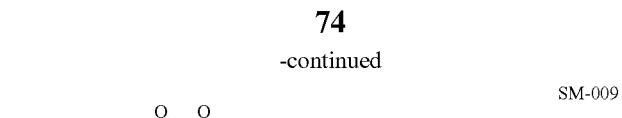

SM-009

The synthesis of IRD-007, IRD-008, and IRD-009 is performed in analogy with the synthesis of IRD-006, replacing with SM-007, SM-008, and SM-009 (scheme 7), respectively.

Absorption maximum (methanol) of IRD-007: 830 nm.
Absorption maximum (methanol) of IRD-008: 826 nm.
Absorption maximum (methanol) of IRD-009: 829 nm.

Synthesis of IRD-057: scheme 8

SCHEME 8

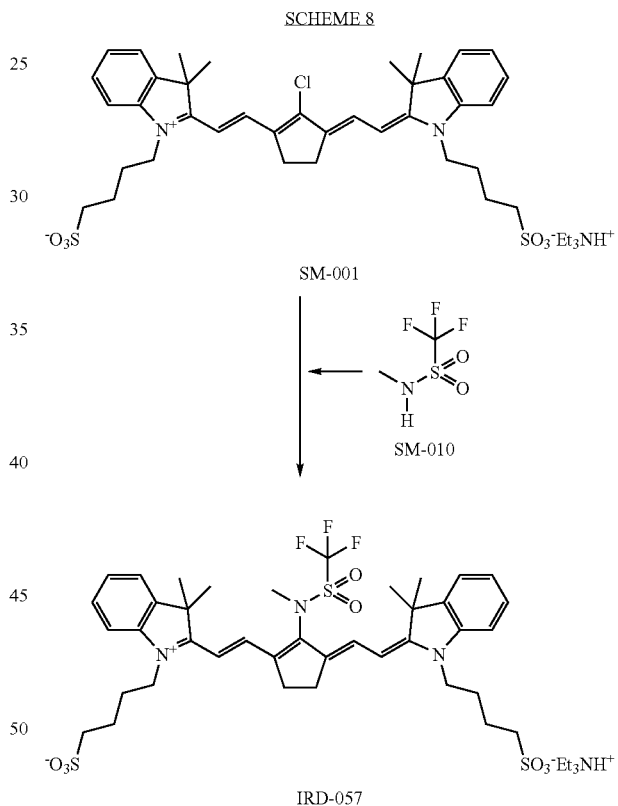

SM-001

SM-010

IRD-057

SM-010 is prepared as described in Tetrahedron, 50 (1994) 5579-90. SM-001 is prepared as described in U.S. Pat. No. 5,576,443. To a suspension of SM-001 (34.2 g) and SM-010 (15 g) in acetonitrile (100 ml) 12.7 ml triethyl amine is added; the mixture is heated for 2 hours at 80° C. After cooling to room temperature, ethyl acetate (400 ml), containing water (8 ml) is added. After stirring for 1 hour, the crude IRD-057 is filtered off. Crude IRD-057 is purified by dissolution in acetonitrile (50 ml) and precipitation with acetone (1000 ml); after filtration and drying under vacuum, 23.6 g IRD-057 is obtained as a green powder.

Synthesis of IRD-068 and IRD-069: scheme 9
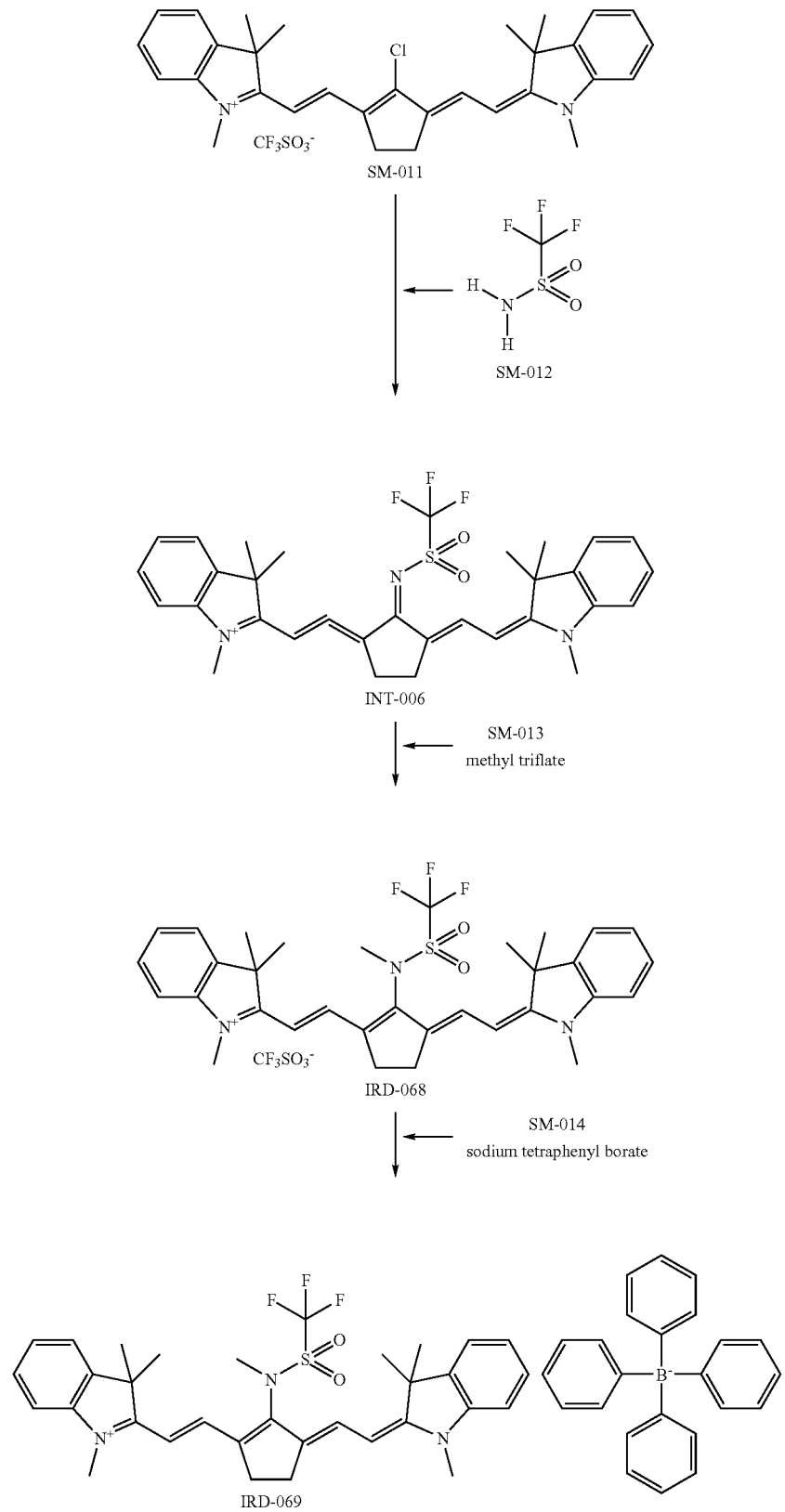

The synthesis of SM-011 is described in EP 0 626 427; SM-012 is commercially available from TCI organic chemicals; SM-013, methyl triflate, is commercially available from Aldrich; SM-014, sodium tetraphenyl borate, is commercially available from Aldrich. To a suspension of 30 g SM-011 and 18 g SM-012 in 50 ml sulfolane at room temperature, 13.3 ml triethyl amine was added; this mixture was heated at 90° C. for 2 hours. After cooling the mixture to room temperature, 200 ml methanol is added to precipitate INT-006. After filtration, washing with 100 ml methanol and drying, 22 g INT-006, only slightly contaminated with SM-001, was obtained. To a solution of 21 g INT-006 in 50 ml methylene chloride 7.1 g of SM-013 (methyl trifluoromethane sulfonate=methyl triflate) was added at room temperature. After 2 hours, 2 g of triethyl amine was added, followed by 200 ml ethyl acetate to precipitate IRD-068. After filtration, crude IRD-068 was purified by dissolution in 50 ml methylene chloride, addition of 2 g triethyl amine, followed by 200 ml ethyl acetate. After filtration and drying under vacuum, 20 g IRD-068 was obtained. To a solution of 10 g IRD-068 in 300 ml methanol at 60° C., a solution of 4.58 g SM-014 in 100 ml methanol was added. After cooling to room temperature during 1 hour, the precipitated IRD-069 was filtered and purified as follows: washing with 200 ml water/filtration; washing with 200 ml methanol/filtration/drying under vacuum. 11.4 IRD-069 was obtained.

Synthesis of IRD-072: scheme 10

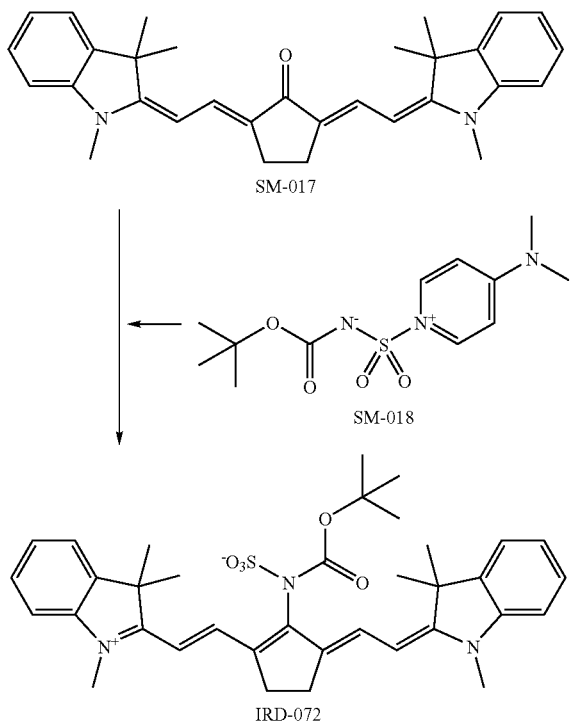

To a solution of 4.5 g SM-017 (commercially available from Spectrum Info) in 155 ml toluene at 110° C. 3.0 g of SM-018 (synthesis according to Organic Letters 2001, 3(14), 2241-2243) was added. After 4 hours at 110° C., the reaction mixture was cooled to room temperature, allowing IRD-072 to crystallize. After washing the powder 3 times with 50 ml hot toluene and drying in vacuum, 6.3 g of IRD-072 was obtained as a green powder.

Synthesis of IRD-083: scheme 11

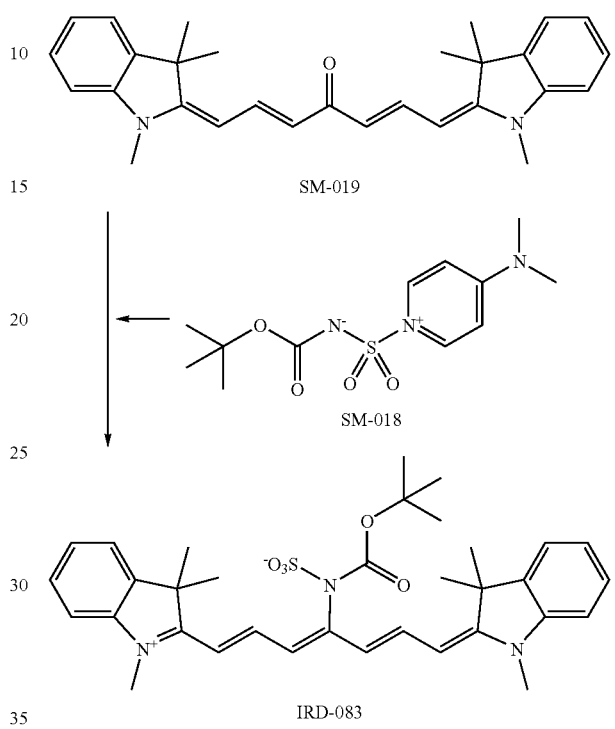

To a solution of 425 mg SM-019 (commercially available from Spectrum Info) in 15.5 ml toluene at 110° C., 301 mg of SM-018 (synthesized according to Organic Letters 2001, 3(14), 2241-2243) was added. After heating for 2 hours at 110° C., the reaction mixture was cooled to 50° C., allowing IRD-083 to crystallize. After washing the powder with 5 ml of hot toluene and drying in vacuum, 250 mg of IRD-083 is obtained as a green powder.

Synthesis of IRD-096: scheme 12

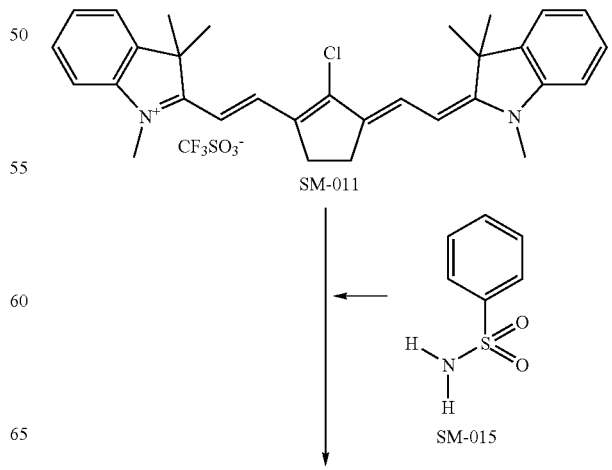

-continued

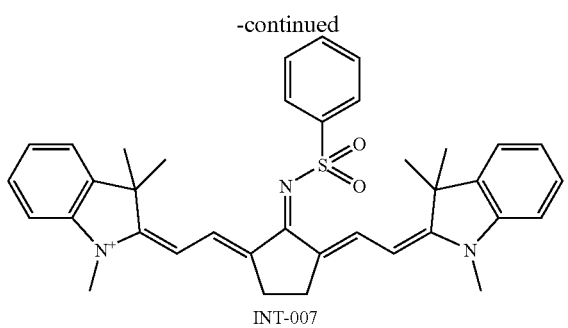

INT-007

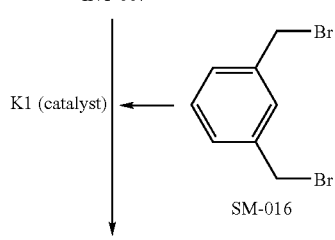

SM-016

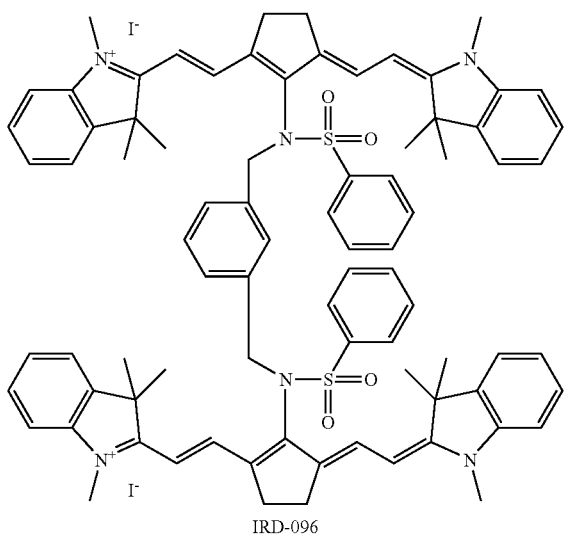

IRD-096

A suspension of 50 g SM-011 (synthesis described in EP 0 626 427) and 31.7 g SM-015 (commercially is commercially available from Aldrich) in methanol was warmed to 70° C. followed by the addition of a 33% solution of sodium methoxide in 29 g of methanol. After 4 hours, the reaction mixture was cooled to room temperature. The precipitated INT-007 was filtered and purified as follows: washing with 100 ml ethyl acetate/filtration/washing with 100 ml water/filtration/drying under vacuum. 35.1 INT-007 was obtained. To a suspension of 1.2 g INT-007 in 5 ml acetonitrile 264 mg SM-016 was added SM-016. After heating the reaction mixture for 1 hour at 70° C., 332 mg of potassium iodide was added. After 6 hours at 70° C., the reaction mixture was cooled to room temperature and filtered. Upon addition of 20 ml ethyl acetate to the mother liquor, IRD-071 was precipitated. After filtration and drying under vacuum 670 mg of IRD-096 was obtained.

Preparation of the Lithographic Substrate S-01

A 0.19 mm thick aluminum foil was degreased by immersing the foil in an aqueous solution containing 40 g/l of sodium hydroxide at 60° C. for 8 seconds and rinsed with demineralized water for 2 seconds. The foil was then electrochemically grained during 15 seconds using an alternating current in an aqueous solution containing 12 g/l of hydrochloric acid and 38 g/l of aluminum sulfate (18-hydrate) at a temperature of 33° C. and a current density of 130 A/dm$^2$. After rinsing with demineralized water for 2 seconds, the aluminum foil was then desmutted by etching with an aqueous solution containing 155 g/l of sulfuric acid at 70° C. for 4 seconds and rinsed with demineralized water at 25° C. for 2 seconds. The foil was subsequently subjected to anodic oxidation during 13 seconds in an aqueous solution containing 155 g/l of sulfuric acid at a temperature of 45° C. and a current density of 22 A/dm$^2$, then washed with demineralized water for 2 seconds and post-treated for 10 seconds with a solution containing 4 g/l of polyvinylphosphonic acid at 40° C., rinsed with demineralized water at 20° C. during 2 seconds and dried.

The support thus obtained has a surface roughness Ra of 0.21 μm and an anodic weight of 4 g/m$^2$ of Al$_2$O$_3$.

Comparative Examples 1 to 3 and Invention Examples 1 to 18

Preparation of the Printing Plate Precursors PPP-01 to PPP-21

The printing plate precursors PPP-01 to PPP-21 were produced by applying a coating solution onto the above described lithographic substrate S-01. The composition of the coating is defined in Table 1. The pH of the coating solution was adjusted to 3.6 before coating. The coating was applied from an aqueous solution. The coatings were dried at 50° C. for 1 minute. The coating weights of the ingredients are indicated in Table 1.

Comparative IR-DYES:

CIR-01:

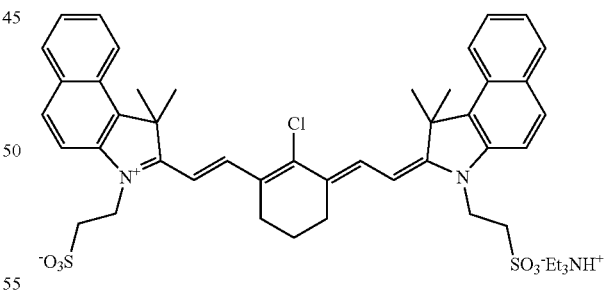

CIR-02:

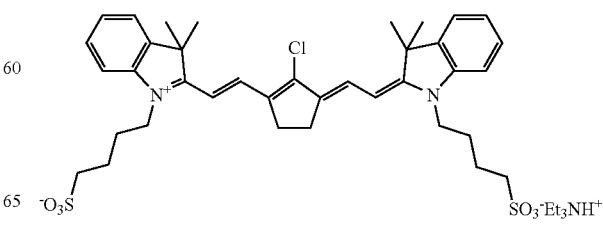

TABLE 1

Composition of Printing Plate Precursors

| PPP-number | Coating weight PSAN (1) (g/m$^2$) | Type IR-dye | Coating weight IR-dye (2) (mol/m$^2$) | Coating weight PAA (3) (g/m$^2$) | Coating weight PVA (4) (g/m$^2$) | Coating weight ZONYL (5) (g/m$^2$) |
|---|---|---|---|---|---|---|
| PPP-01 | 0.6927 | CIR-01 | 1.03 10$^{-4}$ | 0.090 | — | 0.0075 |
| PPP-02 | 0.6927 | CIR-02 | 1.10 10$^{-4}$ | 0.090 | — | 0.0075 |
| PPP-03 | 0.6927 | CIR-02 | 1.10 10$^{-4}$ | — | 0.090 | 0.0075 |
| PPP-04 | 0.6927 | IRD-006 | 0.75 10$^{-4}$ | 0.090 | — | 0.0075 |
| PPP-05 | 0.6927 | IRD-006 | 0.75 10$^{-4}$ | — | 0.090 | 0.0075 |
| PPP-06 | 0.6927 | IRD-007 | 0.83 10$^{-4}$ | 0.090 | — | 0.0075 |
| PPP-07 | 0.6927 | IRD-007 | 0.83 10$^{-4}$ | — | 0.090 | 0.0075 |
| PPP-08 | 0.6927 | IRD-009 | 0.85 10$^{-4}$ | 0.090 | — | 0.0075 |
| PPP-09 | 0.6927 | IRD-009 | 0.85 10$^{-4}$ | — | 0.090 | 0.0075 |
| PPP-10 | 0.6927 | IRD-004 | 1.10 10$^{-4}$ | 0.090 | — | 0.0075 |
| PPP-11 | 0.6927 | IRD-004 | 1.10 10$^{-4}$ | — | 0.090 | 0.0075 |
| PPP-12 | 0.6927 | IRD-003 | 1.10 10$^{-4}$ | 0.090 | — | 0.0075 |
| PPP-13 | 0.6927 | IRD-003 | 1.10 10$^{-4}$ | — | 0.090 | 0.0075 |
| PPP-14 | 0.6927 | IRD-008 | 0.82 10$^{-4}$ | 0.090 | — | 0.0075 |
| PPP-15 | 0.6927 | IRD-008 | 0.82 10$^{-4}$ | — | 0.090 | 0.0075 |
| PPP-16 | 0.6927 | IRD-005 | 0.87 10$^{-4}$ | 0.090 | — | 0.0075 |
| PPP-17 | 0.6927 | IRD-005 | 0.87 10$^{-4}$ | — | 0.090 | 0.0075 |
| PPP-18 | 0.6927 | IRD-001 | 1.10 10$^{-4}$ | 0.090 | — | 0.0075 |
| PPP-19 | 0.6927 | IRD-001 | 1.10 10$^{-4}$ | — | 0.090 | 0.0075 |
| PPP-20 | 0.6927 | IRD-002 | 1.10 10$^{-4}$ | 0.090 | — | 0.0075 |
| PPP-21 | 0.6927 | IRD-002 | 1.10 10$^{-4}$ | — | 0.090 | 0.0075 |

(1) PSAN is a latex dispersion of a Styrene/acrylonitrile copolymer (molar ratio 50/50; stabilized with an anionic wetting agent; average particle size 61 nm; solid content by weight 20.58%);
(2) IR-dye is added as an aqueous solution or dispersion to the coating;
(3) PAA is Glascol E15 from Allied Colloids Manufacturing Co. Ltd; a polyacrylic acid of 15% wt in water;
(4) PVA is an aqueous solution of ERKOL WX48/20, a polyvinylalcohol/polyvinylacetate copolymer (7.5% wt) from ERKOL, part of ACETEX Group;
(5) ZONYL is Zonyl FSO100, a surfactant from Dupont.

Image Formation

The printing plate precursors PPP-01 to PPP-11 were exposed with a Creo Trendsetter (40 W) at several exposure energy densities, namely 0, 125, 200, 275, and 350 mJ/cm$^2$. The Diffuse Reflectance Spectra (DRS-spectra) were measured with a SHIMADZU UV-3101 PC/ISR-3100 spectrophotometer for each plate precursor at areas exposed with these energies. From these DRS-spectra, the optical density was calculated by integration over the wavelength range from 400 nm to 700 nm. The difference between the integrated optical density on the exposed area and the integrated optical density on the non-exposed area is equal to the contrast-value as given in Table 2 for Comparative Examples 1 to 3 and Invention Examples 1 to 8.

For the printing plate precursors PPP-12 to PPP-21 the contrast-values were calculated in the same way for the exposure energies of 200 and 275 mJ/cm$^2$. These values are given in Table 3 for Invention Examples 9 to 18.

TABLE 2

Contrast-values of Print-out Images

| EXAMPLE number | PPP-number | Contrast-value at 125 mJ/cm$^2$ | Contrast-value at 200 mJ/cm$^2$ | Contrast-value at 275 mJ/cm$^2$ | Contrast-value at 350 mJ/cm$^2$ |
|---|---|---|---|---|---|
| Comparative Example 1 | PPP-01 | −5.45 | −12.99 | −23.28 | −36.67 |
| Comparative Example 2 | PPP-02 | −12.45 | −0.31 | −6.42 | −10.32 |
| Comparative Example 3 | PPP-03 | −11.52 | −9.69 | −15.33 | −19.87 |
| Invention Example 1 | PPP-04 | 12.60 | 55.69 | 46.36 | 40.68 |
| Invention Example 2 | PPP-05 | 7.53 | 37.17 | 40.25 | 34.57 |
| Invention Example 3 | PPP-06 | 21.35 | 66.18 | 55.10 | 49.75 |
| Invention Example 4 | PPP-07 | 14.78 | 46.19 | 48.02 | 44.63 |
| Invention Example 5 | PPP-08 | 3.88 | 40.89 | 30.68 | 24.07 |
| Invention Example 6 | PPP-09 | 7.29 | 31.48 | 35.58 | 30.10 |
| Invention Example 7 | PPP-10 | 16.00 | 46.20 | 26.76 | 17.85 |
| Invention Example 8 | PPP-11 | 10.76 | 34.27 | 26.31 | 14.49 |

TABLE 3

Contrast-values of Print-out Images

| EXAMPLE number | PPP-number | Contrast-value at 200 mJ/cm$^2$ | Contrast-value at 275 mJ/cm$^2$ |
|---|---|---|---|
| Invention Example 9 | PPP-12 | 23.29 | 24.40 |
| Invention Example 10 | PPP-13 | 2.14 | 4.68 |
| Invention Example 11 | PPP-14 | 33.84 | 21.86 |
| Invention Example 12 | PPP-15 | 27.97 | 30.70 |
| Invention Example 13 | PPP-16 | 38.99 | 46.95 |

TABLE 3-continued

Contrast-values of Print-out Images

| EXAMPLE number | PPP-number | Contrast-value at 200 mJ/cm$^2$ | Contrast-value at 275 mJ/cm$^2$ |
|---|---|---|---|
| Invention Example 14 | PPP-17 | 7.99 | 4.67 |
| Invention Example 15 | PPP-18 | 19.25 | 6.66 |
| Invention Example 16 | PPP-19 | 13.60 | 8.88 |
| Invention Example 17 | PPP-20 | 18.69 | 0.65 |
| Invention Example 18 | PPP-21 | 25.86 | 28.23 |

A negative value indicates that the optical density on the exposed areas is lower than before the exposure due to the decomposition of the IR-dye resulting in bleaching of the coating upon exposure.

A positive value indicates an increase of the visual optical density on the exposed area compared with the non-exposed area. The higher this value, the higher the contrast of the print-out image build-up upon exposure.

In the Comparative Examples 1 to 3, a negative value is observed for the comparative IR-dyes CIR-01 and CIR-02. The decrease of the visual optical density after exposure demonstrates the bleaching process in these Comparative Examples 1 to 3 wherein no substantial optical density was build up upon exposure.

Figure 2:
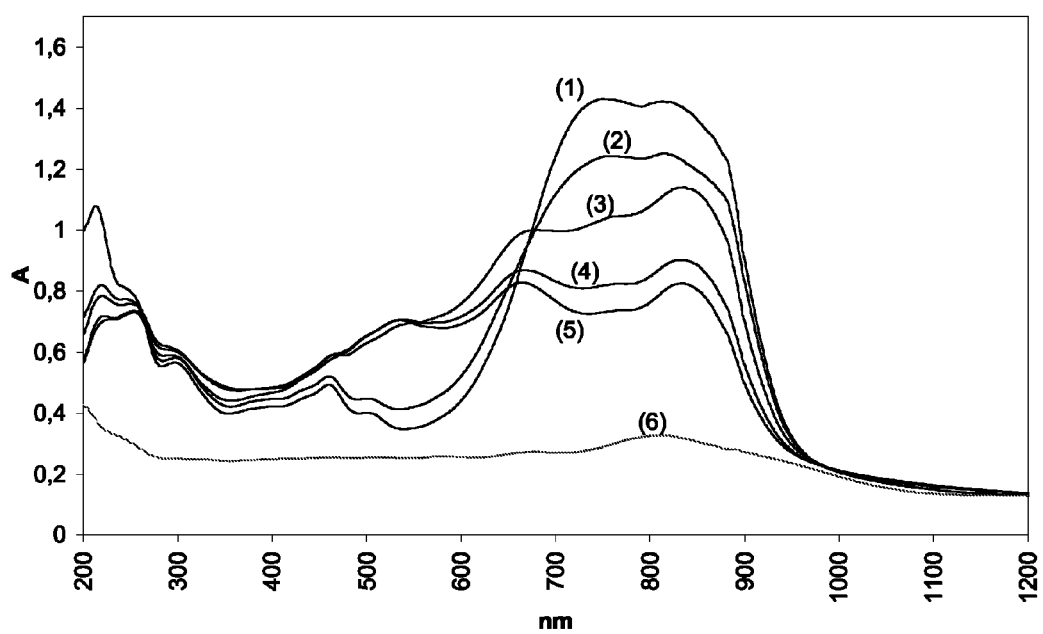
FIG. 2 shows the absorption spectrum of a printing plate precursor according to a preferred embodiment of the present invention at different exposure energies: curves 1 to 5 respectively for 0, 125, 200, 275, and 350 mJ/cm$^2$, curve 6 for the base line for the aluminum support, wherein A represents the absorption at each wavelength (nm).

As an example, the absorption spectra of PPP-01, including CIR-01 (comparative dye) and PPP-04, including IRD-006 (invention dye), exposed with different energies (0, 125, 200, 275, and 350 mJ/cm$^2$) are given in FIG. 1 and FIG. 2: the absorption above about 600 nm decreases with increasing exposure energy, but only for the invention example the absorption in the visual wavelength range is increased after exposure, indicating the build-up of a colored print-out image.

Comparative Example 4 and Invention Example 19

Preparation of the Printing Plate Precursors PPP-22 and PPP-23

The printing plate precursors PPP-22 and PPP-23 were produced in the same way as described above for PPP-01. The coating weights of the ingredients are indicated in Table 4.

TABLE 4

Composition of Printing Plate Precursors

| PPP-number | Coating weight PSAN (1) (g/m$^2$) | Type IR-dye | Coating weight IR-dye (2) (g/m$^2$) | Coating weight PAA (3) (g/m$^2$) | Coating weight ZONYL (5) (g/m$^2$) |
|---|---|---|---|---|---|
| PPP-22 | 0.60 | CIR-01 | 0.096 | 0.120 | 0.007 |
| PPP-23 | 0.60 | IRD-004 | 0.116 | 0.120 | 0.007 |

(1) to (5): see Table 1

Image Formation

The printing plate precursors PPP-22 and PPP-23 were exposed with a Creo S059 plate setter (exposure energy 100-300 mJ/cm$^2$). In Invention Example 19 (for PPP-23) a very good and pronounced print-out image is observed while in Comparative Example 4 (for PPP-22) it was difficult to observe a difference between the exposed and non-exposed areas.

Print Results

After exposure, the plates were mounted on a GTO46 printing press (available from Heidelberger Druckmaschinen A G), and a print job was started using K+E Novavit 800 Skinnex ink (trademark of BASF Drucksysteme GmbH) and 3% FS101 (trademark of AGFA) in 10% isopropanol as fountain liquid.

In the Invention Example 19 (for PPP-23) a better clean-out in the non-exposed areas of the plate was observed than in the Comparative Example 4 (for PPP-22). This indicates less adsorption of the IR-dye of a preferred embodiment of the present invention on the hydrophilic surface of the aluminum support. Good results are obtained for the other lithographic printing properties of the plates.

Comparative Example 5 and Invention Examples 20 and 21

Preparation of the Printing Plate Precursors PPP-24 to PPP-26

The printing plate precursors PPP-24 to PPP-26 were produced in the same way as described above for PPP-01. The coating weights of the ingredients are indicated in Table 5.

TABLE 5

Composition of Printing Plate Precursors

| PPP-number | Coating weight PSAN (1) (g/m$^2$) | Type IR-dye | Coating weight IR-dye (2) (g/m$^2$) | Coating weight PAA (3) (g/m$^2$) | Coating weight ZONYL (5) (g/m$^2$) |
|---|---|---|---|---|---|
| PPP-24 | 0.59 | CIR-01 | 0.1 | 0.12 | 0.01 |
| PPP-25 | 0.59 | IRD-004 | 0.11 | 0.12 | 0.01 |
| PPP-26 | 0.59 | IRD-007 | 0.12 | 0.12 | 0.01 |

(1) to (5): see Table 1

Image Formation

The printing plate precursors PPP-24 to PPP-26 were exposed with a Creo TH5850 (40 W) plate setter at exposure energies varying between 150 and 300 mJ/cm$^2$. The contrast-values of these print-out images have been calculated from the DRS-spectra as described in Invention Example 1 and are given in Table 6.

TABLE 6

Contrast-values of Print-out Images

| EXAMPLE number | PPP-number | Contrast-value at 150 mJ/cm$^2$ | Contrast-value at 200 mJ/cm$^2$ | Contrast-value at 250 mJ/cm$^2$ | Contrast-value at 300 mJ/cm$^2$ |
|---|---|---|---|---|---|
| Comparative Example 5 | PPP-24 | −13.57 | −21.09 | −22.58 | −21.77 |
| Invention Example 20 | PPP-25 | 14.77 | 21.60 | 22.26 | 27.35 |
| Invention Example 21 | PPP-26 | 6.70 | 21.91 | 32.16 | 39.14 |

The positive contrast-values for Invention Example 20 (for PPP-25) and Invention Example 21 (for PPP-26) demonstrate a very good and pronounced print-out image. The negative contrast-values for Comparative Example 5 (for PPP-24) demonstrate the weak differentiation between the exposed and non-exposed areas.

Print Results

After exposure, the plates were mounted on a GTO46 printing press (available from Heidelberger Druckmaschinen A G), and a print job was started using K+E Novavit 800 Skinnex ink (trademark of BASF Drucksysteme GmbH) and 3% FS101 (trademark of AGFA) in 10% isopropanol as fountain liquid.

In the Invention Example 20 (for PPP-25) and Invention Example 21 (for PPP-26) a better clean-out in the non-exposed areas of the plate was observed than in the Comparative Example 5 (for PPP-24). This indicates less adsorption of the IR-dye according to preferred embodiments of the invention on the hydrophilic surface of the aluminum support. Good results are obtained for the other lithographic printing properties of the plates.

Comparative Example 6 and Invention Examples 22 and 24

Preparation of the Printing Plate Precursors PPP-27 to PPP-30

The printing plate precursors PPP-27 to PPP-30 were produced in the same way as described above for PPP-01. The PPP-28 contains, in addition to a comparative IR-dye, a Cu-phthalocyanine (CD-01) as contrast dye, able to form a visual contrast after processing. The coating weights of the ingredients are indicated in Table 7.

TABLE 7

Composition of Printing Plate Precursors

| PPP-number | Coating weight PSAN (1) (g/m²) | Type IR-dye | Coating weight IR-dye (2) (g/m²) | Coating weight CD-01 (g/m²) | Coating weight PAA (3) (g/m²) | Coating weight ZONYL (5) (g/m²) |
|---|---|---|---|---|---|---|
| PPP-27 | 0.62 | CIR-01 | 0.08 | — | 0.08 | 0.01 |
| PPP-28 | 0.62 | CIR-01 | 0.08 | 0.02 | 0.08 | 0.01 |
| PPP-29 | 0.62 | IRD-004 | 0.09 | — | 0.08 | 0.01 |
| PPP-30 | 0.62 | IRD-007 | 0.10 | — | 0.08 | 0.01 |

(1) to (5): see Table 1
CD-01 is a Cu-phthalocyanine contrast dye from Cabot Corporation, an aqueous dispersion of 15 wt %.

Image Formation

The printing plate precursors PPP-27 to PPP-30 were exposed with a Creo TH5850 (40 W) plate setter at exposure energies varying between 150 and 300 mJ/cm². The contrast-values of these print-out images have been calculated from the DRS-spectra as described in Invention Example 1 and are given in Table 8.

TABLE 8

Contrast-values of Print-out Images

| EXAMPLE number | PPP-number | Contrast-value at 150 mJ/cm² | Contrast-value at 200 mJ/cm² | Contrast-value at 250 mJ/cm² | Contrast-value at 300 mJ/cm² |
|---|---|---|---|---|---|
| Comparative Example 6 | PPP-27 | −9.38 | −13.81 | −16.99 | −16.79 |
| Comparative Example 7 | PPP-28 | −8.54 | −12.35 | −14.34 | −12.14 |
| Invention Example 22 | PPP-29 | 13.67 | 27.59 | 35.19 | 33.05 |
| Invention Example 23 | PPP-30 | 12.22 | 30.17 | 37.42 | 36.28 |

The positive contrast-values for Invention Example 22 (for PPP-29) and Invention Example 23 (for PPP-30) demonstrate a very good and pronounced print-out image. The negative contrast-values for Comparative Example 6 (for PPP-27) demonstrate the weak differentiation between the exposed and non-exposed areas. The presence of the contrast dye CD-01 (Cu-phthalocyanine) gives also no rise to an increase of the contrast-value upon exposure as demonstrate in Comparative Example 7 (for PPP-28).

Processing

After exposure, the printing plate precursors were developed in a gumming unit, using with Agfa RC5230 (trademark from AGFA) as gumming solution. The RC520 solution is an aqueous solution of the surfactant DOWFAX 3B2, commercially available from DOW CHEMICAL, in a concentration of 39.3 g/l, citric acid.laq in a concentration of 9.8 g/l, and trisodium citrate.2aq in a concentration of 32.6 g/l, and the RC520 solution has a pH-value of about 5.

In the developing step, the non-exposed areas are removed from the support revealing the hydrophilic surface of the aluminum support while the exposed areas remain on the plate. The DRS-spectra of the exposed and non-exposed area after this wet processing were measured and from these spectra the absorption was integrated over the wavelength range between 400 and 700 nm. The contrast-value after processing is defined as the difference between the integrated value of the exposed area and the non-exposed area. These contrast-values, which are different from the contrast-values of the print-out images, are given in Table 9.

TABLE 9

Contrast-values after Processing

| EXAMPLE number | PPP-number | Contrast-value after processing at 150 mJ/cm² | Contrast-value after processing at 200 mJ/cm² | Contrast-value after processing at 250 Mj/cm² | Contrast-value after processing at 300 mJ/cm² |
|---|---|---|---|---|---|
| Comparative Example 6 | PPP-27 | 36.33 | 33.10 | 32.31 | 30.34 |
| Comparative Example 7 | PPP-28 | 66.85 | 65.94 | 63.88 | 60.77 |
| Invention Example 22 | PPP-29 | 95.03 | 110.57 | 109.23 | 100.83 |
| Invention Example 23 | PPP-30 | 62.89 | 80.78 | 83.17 | 81.86 |

After processing, the coating layer is removed on the non-exposed areas, revealing the hydrophilic surface of the aluminum support, while on the exposed area the coating remains on the plate. For the Comparative Example 6 (PPP-27) these values vary between 30 and 36 which may be considered as a weak contrast after processing.

In order to increase this contrast, typically a contrast dye (e.g., CD-01) was added in the coating composition (PPP-28), resulting in good contrast-value ranging between 60 and 66 as demonstrated in Comparative Example 7.

In Invention Examples 22 and 23, including the IR-dyes of the present invention, contrast-values ranging of about 80 or even about 100 to 110 were obtained as demonstrated in Table 9. This is clearly an additional advantage of the IR-dyes of the present invention beside the improved contrast of the print-out images as demonstrated in Table 8.

Print Results

The plates were mounted on a GTO46 printing press (available from Heidelberger Druckmaschinen A G), and a print job was started using K+E Novavit 800 Skinnex ink (trademark of BASF Drucksysteme GmbH) and 3% FS101 (trademark of AGFA) in 10% isopropanol as fountain liquid. Good printing results are obtained with the plates.

Comparative Example 8 and Invention Example 24

Preparation of Lithographic Substrate S-02

A 0.28 mm thick aluminum support was degreased by spraying it with an aqueous solution containing 34 g/l of sodium hydroxide at 70° C. for 5.9 s and rinsing it at room temperature for 3.6 s with a solution containing 12.4 g/l hydrochloric acid and 9 g/l sulphuric acid.

The aluminum support was than electrochemically grained using an alternating current in an aqueous solution containing 12.4 g/l hydrochloric acid and 9 g/l sulphuric acid at a temperature of 37° C. and at an anodization charge density of 54500 Coulomb/m$^2$.

Subsequently, the support was etched with an aqueous solution containing 145 g/l sulphuric acid at 80° C. for 4.8 s and rinsed with water at room temperature for 3.6 s.

After the etching step, the support was subjected for 4.6 s to an anodic oxidation in an aqueous solution containing 145 g/l sulphuric acid and 10 g/l aluminum sulphate at a temperature of 57° C. and a current density of 2500 A/m$^2$. Subsequently, the anodized support was washed with water at room temperature for 3.6 s and dried at 55° C. for 5.3 s.

Subsequently the support was post-anodic treated with 2.2 g/l polyvinylphosphonic acid during 4.2 s at 70° C. and rinsed with water for 1.2 s at room temperature.

The obtained support was processed in a TD6000 developer (trademark of AGFA) at 25° C. during 22 s to remove the post-anodic treatment and subsequently rinsed with water. After this, the substrate was gummed with RC795 (trademark of AGFA).

The grained and anodized aluminum support was washed with water and dried at 40° C. during 15 minutes.

Preparation of the Printing Plate Precursors PPP-31 and PPP-32

The printing plate precursors PPP-31 and PPP-32 were produced by coating a solution of 0.67 g IR-dye in 100 ml ethanol with a doctor blade at a wet thickness of 30 μm onto the above described lithographic substrate S-02. After drying the coating weights of the ingredients are indicated in Table 10.

CIR-03:

TABLE 10

Composition of Printing Plate Precursors

| PPP-number | Type IR-dye | Coating weight IR-dye (2) (g/m$^2$) |
|---|---|---|
| PPP-31 | CIR-03 | 0.67 |
| PPP-32 | IRD-004 | 0.67 |

Image Formation

The printing plate precursors PPP-31 and PPP-32 were exposed with an IR-laser diode at 830 nm. The energy densities vary between 357 and 1000 mJ/cm$^2$ as indicated in Table 11 (different settings for Laser Power and Drum Speed).

TABLE 11

Applied Laser Energy Densities

| Laser Power (mW) | Drum Speed (m/s) | Pitch (μm) | Laser Energy Density (mJ/cm$^2$) |
|---|---|---|---|
| 200 | 8 | 7 | 357 |
| 280 | 8 | 7 | 500 |
| 140 | 4 | 7 | 500 |
| 200 | 4 | 7 | 714 |
| 280 | 4 | 7 | 1000 |

In Invention Example 24 (for PPP-32) a very good and pronounced print-out image is observed, i.e., the exposed areas were dark blue as opposed to the light-green background color of the non-exposed areas. In Comparative Example 8 (for PPP-31) the IR-dye in the exposed areas are bleached resulting in a weak visual image.

Print Results

After exposure, the plates were mounted on an ABDick 360 printing press and a print job was started using Van Son 167 ink (trademark of VAN SON) and Rotamatic (available from UNIGRAFICA GmbH) as fountain liquid. A compressible rubber blanket was used and prints were made on 80 g paper. For both plates, positive printed images were observed.

Invention Example 25

Preparation of the Printing Plate Precursors PPP-33

Composition was prepared (pw=parts per weight; wt. %= weight percentage) by mixing the components as specified in table 12. The solution was coated onto electrochemically roughened and anodically oxidized aluminum sheet, the surface of which had been rendered hydrophilic by treatment with an aqueous solution of polyvinyl phosphonic acid (oxide weight 3 g/m$^2$) and was dried for 1 minute at 120° C. (circulation oven)

TABLE 12

Composition of the Photosensitive Layer

| Composition (g) | PPP-33 |
|---|---|
| KL 7177 (1) | 3.875 |
| CIR-03 | 0.2003 |
| Triazine BU1549 (2) | 6.0 |
| FST426R (3) | 1.875 |
| Edaplan LA411 (4) | 0.3375 |
| Dowanol PM (5) | 34.87 |
| Dry thickness (g/m$^2$) | 1.50 |

(1) KL 7177 is a solution containing 32.4 wt. % of a methylmethacrylate/methacrylic acid copolymer (ratio 4:1 by weight; acid number: 110 mg KOH/g) in 2-butanone (viscosity 105 mm$^2$/s at 25° C.)
(2) Triazine BU1549 is 2-[1,1'-biphenyl]-4-yl-4,6-bis(trichloromethyl)-1,3,5-triazine from Clariant
(3) FST426R is a solution in 2-butanone containing 88.2 wt. % of a reaction product from 1 mole of 2,2,4-trimethyl-hexamethylenediisocyanate and 2 moles of hydroxy-ethyl-methacrylate (viscosity 3.30 mm$^2$/s at 25° C.)
(4) Edaplan LA411 is a surfactant (1% solution in Dowanol PM ® trade mark of Dow Chemical Company) obtained from Munzing Chemie
(5) Dowanol PM is propyleneglycol monomethylether obtained from Dow Chemical On top of the photosensitive layer a solution in water with the composition as defined in Table 13 was coated and was dried at 110° C. for 2 minutes. The so-formed protective overcoat had a dry thickness of 2.0 g/m$^2$.

TABLE 13

Composition of Overcoat Solution

| Component | Parts by Weight (g) |
|---|---|
| partially hydrolyzed polyvinylalcohol (degree of hydrolysis 88%, viscosity 4 mPa · s in a solution of 4 wt. % at 20° C.). | 17.03 |
| partially hydrolyzed polyvinylalcohol (degree of hydrolysis 88%, viscosity 8 mPa · s in a solution of 4 wt. % at 20° C.). | 7.43 |
| fully hydrolyzed polyvinylalcohol (degree of hydrolysis 98%, viscosity 6 mPa · s in a solution of 4 wt. % at 20° C.). | 14.87 |
| Acticide LA1206 (1) | 0.26 |
| Metolat FC 355 (2) | 0.38 |
| IRD-004 | 3.42 |
| Lutensol A8 (90%) (3) | 0.032 |
| Water | 982.1 |

(1) Acticide LA1206 is a biocide, commercially available from Thor
(2) Metolat FC 355 is an ethoxylated ethylenediamine, commercially available from Munzing Chemie
(3) Lutensol A8 (90%) is a surface active agent, commercially available from BASF Image Formation After drying of the overcoat layer, the plates were imaged with a Creo Trendsetter IR laser (830 nm) at 275 mJ/cm$^2$. In Invention Example 25 (for PPP-33) a very good and pronounced print-out image is observed, i.e., the exposed areas were dark blue as opposed to the pale green background color of the non-exposed areas. This is also illustrated in Table 14 by the optical density, measured with a GretagMacbeth D19C densitometer, commercially available from Gretag-Macbeth A G, on the exposed and non-exposed areas, using the cyan setting (OD-cyan) and also the black setting (OD-black), and with the uncoated support of the plate as reference.

TABLE 14

Optical Density Values

| EXAMPLE number | OD-cyan non-exposed area | OD-cyan exposed area | OD-black non-exposed area | OD-black exposed area |
|---|---|---|---|---|
| Invention Example 25 | 0.83 | 1.24 | 0.37 | 0.68 |

Invention Examples 26 and 27

Preparation of the Printing Plate Precursors PPP-34 and 35

Compositions were prepared (pw=parts per weight; wt. %=weight percentage) by mixing the components as specified in Table 15. The solutions were coated onto electrochemically roughened and anodically oxidized aluminum sheets, the surface of which had been rendered hydrophilic by treatment with an aqueous solution of polyvinyl phosphonic acid (oxide weight 3 g/m$^2$) and was dried for 1 minute at 120° C. (circulation oven)

TABLE 15

Composition of the Photosensitive Layer

| Composition (g) | PPP-34 | PPP-35 |
|---|---|---|
| KL 7177 (1) | 3.750 | 3.750 |
| IRD-025 | 0.3438 | |
| IRD-024 | | 0.3438 |
| Triazine BU1549 (2) | 0.2063 | 0.2063 |
| FST426R (3) | 1.875 | 1.875 |
| Edaplan LA411 (4) | 0.3375 | 0.3375 |
| Dowanol PM (5) | 36.25 | 36.25 |
| Dry thickness (g/m$^2$) | 1.50 | 1.50 |

(1) to (5): see table 12

On top of the photosensitive layer a solution in water with the composition as defined in Table 16 was coated and was dried at 110° C. for 2 minutes. The so-formed protective overcoat had a dry thickness of 2.0 g/m$^2$.

TABLE 16

Composition of Overcoat Solution

| Component | Parts by Weight (g) |
|---|---|
| partially hydrolyzed polyvinylalcohol (degree of hydrolysis 88%, viscosity 4 mPa · s in a solution of 4 wt. % at 20° C.). | 17.03 |
| partially hydrolyzed polyvinylalcohol (degree of hydrolysis 88%, viscosity 8 mPa · s in a solution of 4 wt. % at 20° C.). | 7.43 |
| fully hydrolyzed polyvinylalcohol (degree of hydrolysis 98%, viscosity 6 mPa · s in a solution of 4 wt. % at 20° C.). | 14.87 |
| Acticide LA1206 (1) | 0.26 |
| Metolat FC 355 (2) | 0.38 |
| Lutensol A8 (90%) (3) | 0.032 |
| Water | 960 |

(1) to (3): see Table 13

Image Formation

After drying of the overcoat layer, the plates were imaged with a Creo Trendsetter IR laser (830 nm) at 275 mJ/cm$^2$. In Invention Example 26 (for PPP-34) and Invention Example 27 (for PPP-35) a very good and pronounced print-out image is observed, i.e., the exposed areas were dark blue as opposed to the green background color of the non-exposed areas. This is also illustrated in Table 17 by the optical density, measured with a GretagMacbeth D19C densitometer, commercially available from Gretag-Macbeth A G, on the exposed and non-exposed areas, using the cyan setting (OD-cyan) and also the black setting (OD-black), and with the uncoated support of the plate as reference.

TABLE 17

Optical Density Values

| EXAMPLE number | OD-cyan non-exposed area | OD-cyan exposed area | OD-black non-exposed area | OD-black exposed area |
|---|---|---|---|---|
| Invention Example 26 | 1.02 | 1.45 | 0.50 | 0.83 |
| Invention Example 27 | 0.92 | 1.52 | 0.45 | 0.94 |

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. A heat-sensitive imaging element comprising an IR dye wherein the IR dye has a structure according to Formula I:

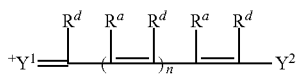

Formula I wherein $^+Y^1$=is represented by one of the following structures:

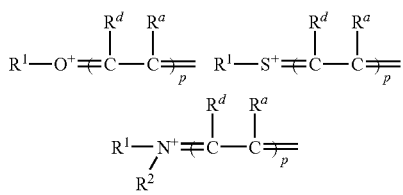

$Y^2$—is represented by one of the following structures:

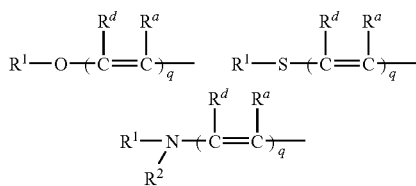

n is 0, 1, 2, or 3;
each of p and q is 0, 1, or 2;
$R^1$ and $R^2$ are independently an optionally substituted hydrocarbon group, or wherein two of the $R^1$, $R^2$, $R^d$, or $R^a$ groups together include the necessary atoms to form a cyclic structure;
at least one of the $R^d$ groups is selected from the list consisting of:
—(N=CR$^{17}$)$_a$—NR$^5$—CO—R$^4$,
—(N=CR$^{17}$)$_b$—NR$^5$—SO$_2$—R$^6$,
—(N=CR$^{17}$)$_c$—NR$^{11}$—SO—R$^{12}$,
—SO$_2$—NR$^{15}$R$^{16}$; and
—S—CH$_2$—CR$^7$(H)$_{1-d}$(R$^8$)$_d$—NR$^9$—COOR$^{18}$;
wherein
a, b, c, and d independently are 0 or 1;
$R^{17}$ is a hydrogen atom, an optionally substituted aliphatic hydrocarbon group, or an optionally substituted (hetero)aryl group, or wherein $R^{17}$ and $R^5$, $R^{17}$ and $R^{11}$ together include the necessary atoms to form a cyclic structure;
$R^4$ is —OR$^{10}$, —NR$^{13}$R$^{14}$, or —CF$_3$;
$R^{10}$ is an optionally substituted (hetero)aryl group or an optionally branched aliphatic hydrocarbon group;
$R^{13}$ and $R^{14}$ independently are a hydrogen atom, an optionally substituted aliphatic hydrocarbon group, or an optionally substituted (hetero)aryl group, or wherein $R^{13}$ and $R^{14}$ together include the necessary atoms to form a cyclic structure;
$R^6$ is an optionally substituted aliphatic hydrocarbon group or an optionally substituted (hetero)aryl group, —OR$^{10}$, —NR$^{13}$R$^{14}$, or —CF$_3$;
$R^5$ is a hydrogen atom, an optionally substituted aliphatic hydrocarbon group, a SO$_3^-$ group, a —COOR$^{18}$ group, or an optionally substituted (hetero)aryl group, or wherein $R^5$ together with at least one of $R^{10}$, $R^{13}$, and $R^{14}$ include the necessary atoms to form a cyclic structure;

$R^{11}$, $R^{15}$, and $R^{16}$ are independently a hydrogen atom, an optionally substituted aliphatic hydrocarbon group, or an optionally substituted (hetero)aryl group; or wherein $R^{15}$ and $R^{16}$ together include the necessary atoms to form a cyclic structure;
$R^{12}$ is an optionally substituted aliphatic hydrocarbon group or an optionally substituted (hetero)aryl group;
$R^7$ and $R^9$ independently are a hydrogen atom or an optionally substituted aliphatic hydrocarbon group;
$R^8$ is —COO$^-$ or —COOR$^{8'}$; wherein $R^{8'}$ is a hydrogen atom, an alkali metal cation, an ammonium ion, or a mono-, di-, tri- or tetra-alkyl ammonium ion;
$R^{18}$ is an optionally substituted (hetero)aryl group or an alpha-branched aliphatic hydrocarbon group;
$R^a$ and other $R^d$ groups are independently represented by a group selected from the list consisting of a hydrogen atom, a halogen atom, —R$^e$, —OR$^f$, —SR$^g$, and —NR$^u$R$^v$; wherein R$^e$, R$^f$, R$^g$, R$^u$, and R$^v$ independently are an optionally substituted aliphatic hydrocarbon group or an optionally substituted (hetero)aryl group; and
the IR dye further comprises one or more counter ions in order to obtain an electrically neutral molecule.

2. The IR dye according to claim 1, wherein the IR dye has the structure of Formula II, III, or IV;

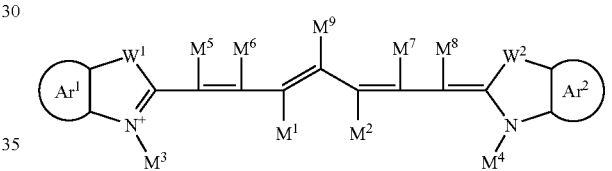

Formula II

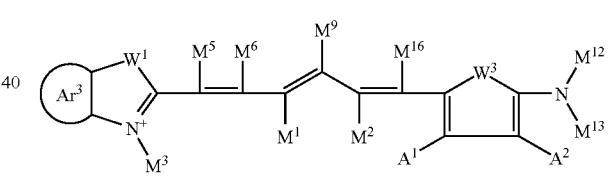

Formula III

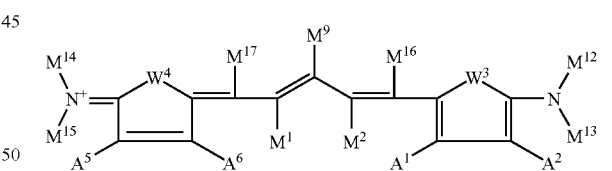

Formula IV wherein
Ar$^1$, Ar$^2$ and Ar$^3$ are independently an optionally substituted aromatic hydrocarbon group or an aromatic hydrocarbon group with an annulated benzene ring which is optionally substituted,
W$^1$ and W$^2$ are independently a sulphur atom or a —CM$^{10}$M$^{11}$ group wherein M$^{10}$ and M$^{11}$ are independently an optionally substituted aliphatic hydrocarbon group or an optionally substituted (hetero)aryl group, or wherein M$^{10}$ and M$^{11}$ together comprise the necessary atoms to form a cyclic structure,
M$^1$ and M$^2$ are independently a hydrogen atom, an optionally substituted aliphatic hydrocarbon group or wherein M$^1$ and M$^2$ together comprise the necessary atoms to form an optionally substituted cyclic structure, $M^3$ and $M^4$ are independently an optionally substituted aliphatic hydrocarbon group, $M^5$, $M^6$, $M^7$, $M^8$, $M^{16}$ and $M^{17}$ are independently a hydrogen atom, a halogen atom or an optionally substituted aliphatic hydrocarbon group, $W^3$ is a sulphur atom or a $-C(A^3)=C(A^4)$- group, $M^{12}$ and $M^{13}$ are independently an optionally substituted aliphatic hydrocarbon group or an optionally substituted (hetero)aryl group, or wherein two of the $M^{12}$, $M^{13}$, $A^2$ or $A^4$ together comprise the necessary atoms to form at least one cyclic structure, $W^4$ is a sulphur atom or a $-C(A^7)=C(A^8)$- group, $A^1$ to $A^8$ are independently a hydrogen atom, a halogen atom, an optionally substituted aliphatic hydrocarbon group or an optionally substituted (hetero)aryl group, or wherein each of $A^1$ and $A^2$, $A^3$ and $A^4$, $A^5$ and $A^6$, or, $A^7$ and $A^8$, together comprise the necessary atoms to form a cyclic structure, $M^{14}$ and $M^{15}$ are independently an optionally substituted aliphatic hydrocarbon group or an optionally substituted (hetero)aryl group, or wherein two of the $M^{14}$, $M^{15}$, $A^5$ or $A^7$ together comprise the necessary atoms to form at least one cyclic structure, $M^9$ is one of the $R^d$ groups; and the IR dye further comprises one or more counter ions in order to obtain an electrically neutral molecule.

3. The IR dye according to claim 2, wherein $M^1$ and $M^2$ together include the necessary atoms to form an optionally substituted 5-membered ring.

4. The IR dye according to claim 2, wherein the IR dye of Formula II, III, or IV has at least one anionic group or an acid group selected from the list consisting of $-CO_2H$, $-CONHSO_2R^h$, $-SO_2NHCOR^i$, $-SO_2NHSO_2R^j$, $-PO_3H_2$, $-OPO_3H_2$, $-OSO_3H$, $-SO_3H$, or $-S-SO_3H$ groups or their corresponding salts;

and $R^h$, $R^i$, and $R^j$ are independently an aryl or an alkyl group.

5. The IR dye according to claim 3, wherein the IR dye of Formula II, III, or IV has at least one anionic group or an acid group selected from the list consisting of $-CO_2H$, $-CONHSO_2R^h$, $-SO_2NHCOR^i$, $-SO_2NHSO_2R^j$, $-PO_3H_2$, $-OPO_3H_2$, $-OSO_3H$, $-SO_3H$, or $-S-SO_3H$ groups or their corresponding salts;

and $R^h$, $R^i$, and $R^j$ are independently an aryl or an alkyl group.

6. The IR dye according to claim 4, wherein each of the aliphatic hydrocarbon groups of $M^3$, $M^4$, or $M^{12}$ to $M^{15}$ of the IR dye is terminally substituted with at least one of the anionic groups or acid groups.

7. The IR dye according to claim 5, wherein each of the aliphatic hydrocarbon groups of $M^3$, $M^4$, or $M^{12}$ to $M^{15}$ of the IR dye is terminally substituted with at least one of the anionic groups or acid groups.

8. A heat-sensitive lithographic printing plate precursor comprising a support having a hydrophilic surface or which is provided with a hydrophilic layer, and a coating provided thereon, wherein the coating includes an IR dye according to Formula I:

Formula I

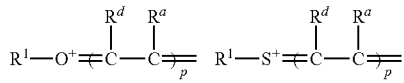

wherein $^+Y^1=$ is represented by one of the following structures:

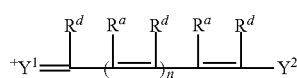

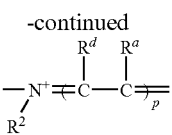

$Y^2-$ is represented by one of the following structures:

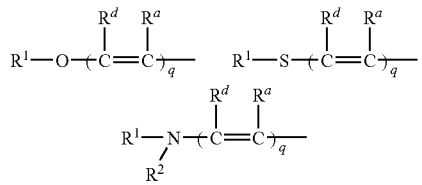

n is 0, 1, 2, or 3;

each of p and q is 0, 1, or 2;

$R^1$ and $R^2$ are independently an optionally substituted hydrocarbon group, or wherein two of the $R^1$, $R^2$, $R^d$, or $R^a$ groups together include the necessary atoms to form a cyclic structure;

at least one of the $R^d$ groups is selected from the list consisting of:

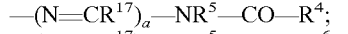
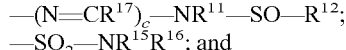
$-SO_2-NR^{15}R^{16}$; and
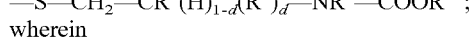

wherein a, b, c, and d independently are 0 or 1;

$R^{17}$ is a hydrogen atom, an optionally substituted aliphatic hydrocarbon group, or an optionally substituted (hetero)aryl group, or wherein $R^{17}$ and $R^5$, $R^{17}$ and $R^{11}$ together include the necessary atoms to form a cyclic structure;

$R^4$ is $-OR^{10}$, $-NR^{13}R^{14}$, or $-CF_3$;

$R^{10}$ is an optionally substituted (hetero)aryl group or an optionally branched aliphatic hydrocarbon group;

$R^{13}$ and $R^{14}$ independently are a hydrogen atom, an optionally substituted aliphatic hydrocarbon group, or an optionally substituted (hetero)aryl group, or wherein $R^{13}$ and $R^{14}$ together include the necessary atoms to form a cyclic structure;

$R^6$ is an optionally substituted aliphatic hydrocarbon group or an optionally substituted (hetero)aryl group, $-OR^{10}$, $-NR^{13}R^{14}$, or $-CF_3$;

$R^5$ is a hydrogen atom, an optionally substituted aliphatic hydrocarbon group, a $SO_3^-$ group, a $-COOR^{18}$ group, or an optionally substituted (hetero)aryl group, or wherein $R^5$ together with at least one of $R^{10}$, $R^{13}$, and $R^{14}$ include the necessary atoms to form a cyclic structure;

$R^{11}$, $R^{15}$, and $R^{16}$ are independently a hydrogen atom, an optionally substituted aliphatic hydrocarbon group, or an optionally substituted (hetero)aryl group; or wherein $R^{15}$ and $R^{16}$ together include the necessary atoms to form a cyclic structure;

$R^{12}$ is an optionally substituted aliphatic hydrocarbon group or an optionally substituted (hetero)aryl group;

$R^7$ and $R^9$ independently are a hydrogen atom or an optionally substituted aliphatic hydrocarbon group;

$R^8$ is $-COO^-$ or $-COOR^{8'}$; wherein $R^{8'}$ is a hydrogen atom, an alkali metal cation, an ammonium ion, or a mono-, di-, tri- or tetra-alkyl ammonium ion;

$R^{18}$ is an optionally substituted (hetero)aryl group or an alpha-branched aliphatic hydrocarbon group;

$R^a$ and other $R^d$ groups are independently represented by a group selected from the list consisting of a hydrogen atom, a halogen atom, —$R^e$, —$OR^f$, —$SR^g$, and —$NR^u R^v$; wherein $R^e$, $R^f$, $R^g$, $R^u$, and $R^v$ independently are an optionally substituted aliphatic hydrocarbon group or an optionally substituted (hetero)aryl group; and the IR dye further comprises one or more counter ions in order to obtain an electrically neutral molecule.

9. The heat-sensitive precursor according to claim 8, wherein the coating includes a photo-polymerizable composition.

10. The heat-sensitive precursor according to claim 8, wherein the coating includes thermoplastic polymer particles dispersed in a hydrophilic binder.

11. The heat-sensitive precursor according to claim 8, wherein the coating includes a switchable polymer which is capable of changing a polarity of the surface of the coating upon IR-radiation or heating from hydrophilic to hydrophobic or from hydrophobic to hydrophilic.

12. The heat-sensitive precursor according to claim 8, wherein the coating includes a polymer which is soluble in an alkaline solution, and a solubility inhibiting compound which reduces the solubility of the coating in the alkaline solution, and wherein, upon IR-radiation or heating, the coating has an increased solubility in the alkaline solution.

13. A method for making a lithographic printing plate comprising the steps of:
   providing the heat-sensitive lithographic printing plate precursor according to claim 8;
   image-wise exposing the precursor to IR-radiation or heat; and
   optionally developing the exposed precursor.

14. A method for making a lithographic printing plate comprising the steps of:
   providing the heat-sensitive lithographic printing plate precursor according to claim 9;
   image-wise exposing the precursor to IR-radiation or heat; and
   optionally developing the exposed precursor.

15. A method for making a lithographic printing plate comprising the steps of:
   providing the heat-sensitive lithographic printing plate precursor according to claim 10;
   image-wise exposing the precursor to IR-radiation or heat; and
   optionally developing the exposed precursor.

16. A method for making a lithographic printing plate comprising the steps of:
   providing the heat-sensitive lithographic printing plate precursor according to claim 11;
   image-wise exposing the precursor to IR-radiation or heat; and
   optionally developing the exposed precursor.

17. A method for making a lithographic printing plate comprising the steps of:
   providing the heat-sensitive lithographic printing plate precursor according to claim 12;
   image-wise exposing the precursor to IR-radiation or heat; and
   optionally developing the exposed precursor.

18. A method for making a lithographic printing plate comprising the steps of:
   providing the heat-sensitive lithographic printing plate precursor according to claim 9;
   image-wise exposing the precursor to IR-radiation or heat;
   mounting the exposed precursor on a printing press; and
   developing the precursor by supplying ink and/or fountain solution to the precursor.

19. A method for making a lithographic printing plate comprising the steps of:
   providing the heat-sensitive lithographic printing plate precursor according to claim 10;
   image-wise exposing the precursor to IR-radiation or heat;
   mounting the exposed precursor on a printing press; and
   developing the precursor by supplying ink and/or fountain solution to the precursor.

* * * * *